United States Patent
Apostolides

(10) Patent No.: US 9,523,296 B2
(45) Date of Patent: Dec. 20, 2016

(54) VALVE ASSEMBLY FOR MACHINE FLUID OPERATIONS

(71) Applicant: RPM Industries, LLC, Washington, PA (US)

(72) Inventor: John K. Apostolides, Pittsburgh, PA (US)

(73) Assignee: RPM INDUSTRIES, LLC, Washington, PA (US)

( * ) Notice: Subject to any disclaimer, the term of this patent is extended or adjusted under 35 U.S.C. 154(b) by 128 days.

(21) Appl. No.: 14/206,417

(22) Filed: Mar. 12, 2014

(65) Prior Publication Data

US 2014/0290761 A1    Oct. 2, 2014

Related U.S. Application Data

(60) Provisional application No. 61/852,287, filed on Mar. 15, 2013.

(51) Int. Cl.

| | |
|---|---|
| F16K 17/02 | (2006.01) |
| F01M 11/04 | (2006.01) |
| F16K 11/044 | (2006.01) |
| F16K 17/04 | (2006.01) |
| F15B 21/00 | (2006.01) |
| F16N 21/02 | (2006.01) |
| F16N 21/04 | (2006.01) |
| F16N 39/06 | (2006.01) |
| F01M 1/12 | (2006.01) |
| F16N 37/00 | (2006.01) |

(52) U.S. Cl.
CPC ......... *F01M 11/0408* (2013.01); *F15B 21/005* (2013.01); *F16K 11/044* (2013.01); *F16K 17/0473* (2013.01); *F01M 11/0458* (2013.01); *F01M 2001/123* (2013.01); *F16N 21/02* (2013.01); *F16N 21/04* (2013.01); *F16N 39/06* (2013.01); *F16N 2037/006* (2013.01); *Y10T 137/7837* (2015.04)

(58) Field of Classification Search
CPC .. F01M 11/0408; F15B 21/005; F16K 11/044; F16K 17/0473; Y10T 137/86879; Y10T 137/8667; Y10T 137/2564
See application file for complete search history.

(56) References Cited

U.S. PATENT DOCUMENTS

| | | | |
|---|---|---|---|
| 2,792,912 A | 5/1957 | Kangas | |
| 2,876,797 A | * 3/1959 | Edman | F15B 13/04 137/625.69 |
| 4,502,431 A | 3/1985 | Lulich | |

(Continued)

OTHER PUBLICATIONS

International Search Report and Written Opinion of the International Searching Authority for International Application No. PCT/US14/24586 mailed Jul. 10, 2014.

(Continued)

*Primary Examiner* — Craig Schneider
*Assistant Examiner* — Kevin Barss
(74) *Attorney, Agent, or Firm* — K&L Gates LLP

(57) ABSTRACT

Various embodiments of valve assemblies are provided for use in connection with the fluid systems of machines such as engine-powered machines. The valve assemblies may be used for performing fluid refill operations, fluid evacuation operations, fluid purge operations, and other types of fluid operations in connection with machine maintenance.

21 Claims, 60 Drawing Sheets

(56) References Cited

U.S. PATENT DOCUMENTS

| | | | |
|---|---|---|---|
| 4,541,457 A | 9/1985 | Blenkush | |
| 4,552,333 A | 11/1985 | Niemi | |
| 4,583,711 A | 4/1986 | Johnson | |
| 4,977,978 A | 12/1990 | Batrice | |
| 5,074,332 A | 12/1991 | Jones | |
| 5,149,053 A | 9/1992 | Galli | |
| 5,257,678 A | 11/1993 | Stokes | |
| 5,413,309 A | 5/1995 | Giesler | |
| 5,526,782 A | 6/1996 | Bedi et al. | |
| 5,944,055 A | 8/1999 | Dicky | |
| 6,112,855 A | 9/2000 | Camacho et al. | |
| 6,202,790 B1 | 3/2001 | Oligmueller | |
| 6,216,732 B1* | 4/2001 | Apostolides | F01M 11/0408 123/196 S |
| 6,302,167 B1 | 10/2001 | Hollub | |
| 6,988,506 B1* | 1/2006 | Apostolides | F01M 11/04 137/13 |
| 2004/0045609 A1* | 3/2004 | Apostolides | F01M 11/0408 137/560 |
| 2004/0211470 A1* | 10/2004 | Apostolides | F01M 11/0408 137/565.11 |
| 2005/0173004 A1* | 8/2005 | Apostolides | F01M 11/0408 137/512 |
| 2009/0001306 A1* | 1/2009 | Deneux | F16K 5/0668 251/213 |
| 2011/0272036 A1* | 11/2011 | Vanderveen | F16K 11/0704 137/13 |
| 2013/0327729 A1* | 12/2013 | Apostolides | F17D 1/14 210/805 |
| 2013/0330205 A1* | 12/2013 | Apostolides | F01M 5/025 417/12 |
| 2014/0202554 A1* | 7/2014 | Apostolides | F01M 11/0408 137/15.04 |
| 2014/0297045 A1* | 10/2014 | Apostolides | F04B 49/00 700/282 |
| 2014/0309794 A1* | 10/2014 | Apostolides | G01L 7/00 700/282 |
| 2015/0308304 A1* | 10/2015 | Apostolides | F01M 1/16 417/3 |

OTHER PUBLICATIONS

International Preliminary Report on Patentability for International Application No. PCT/US14/24586 issued Sep. 15, 2015.

* cited by examiner

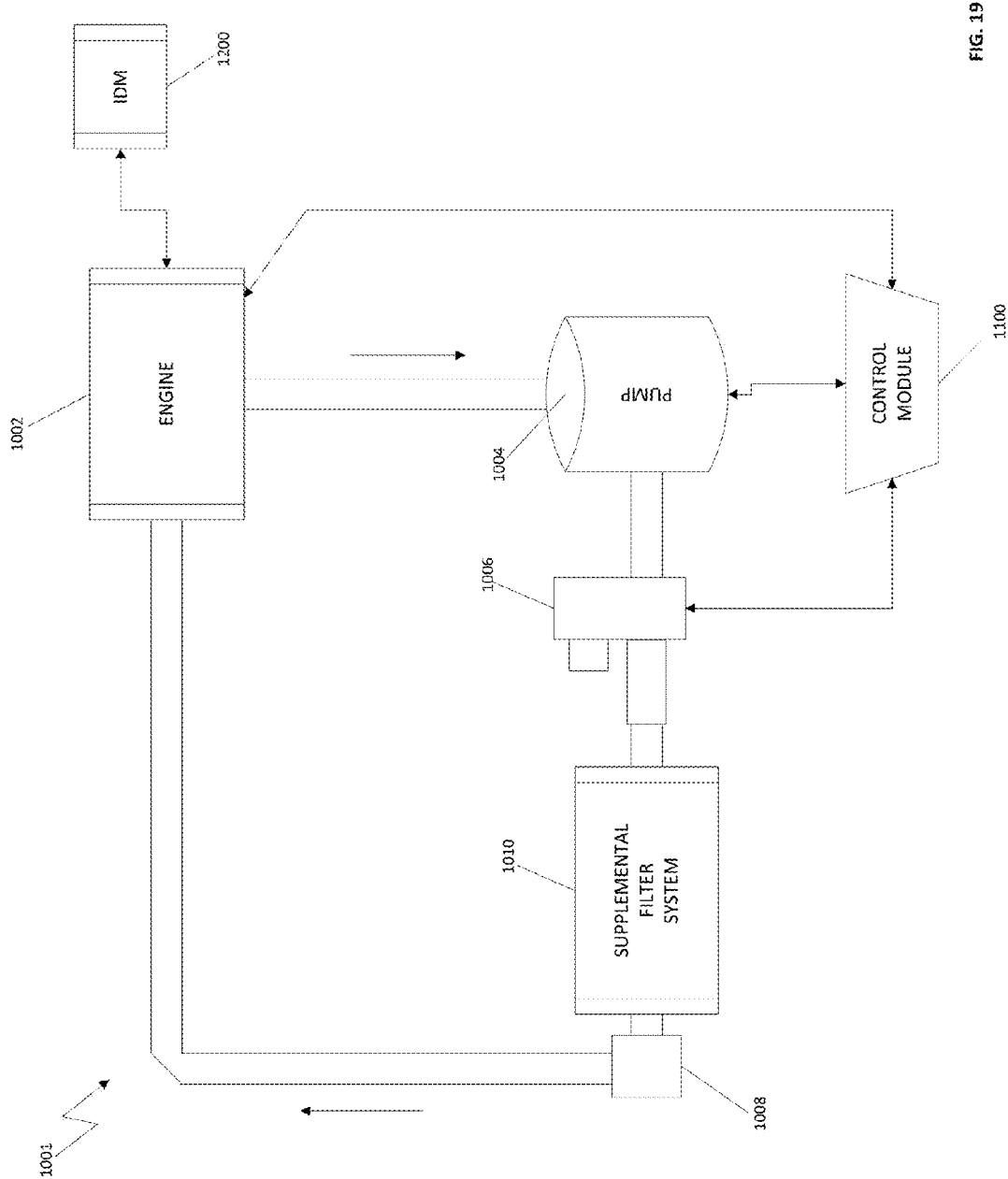

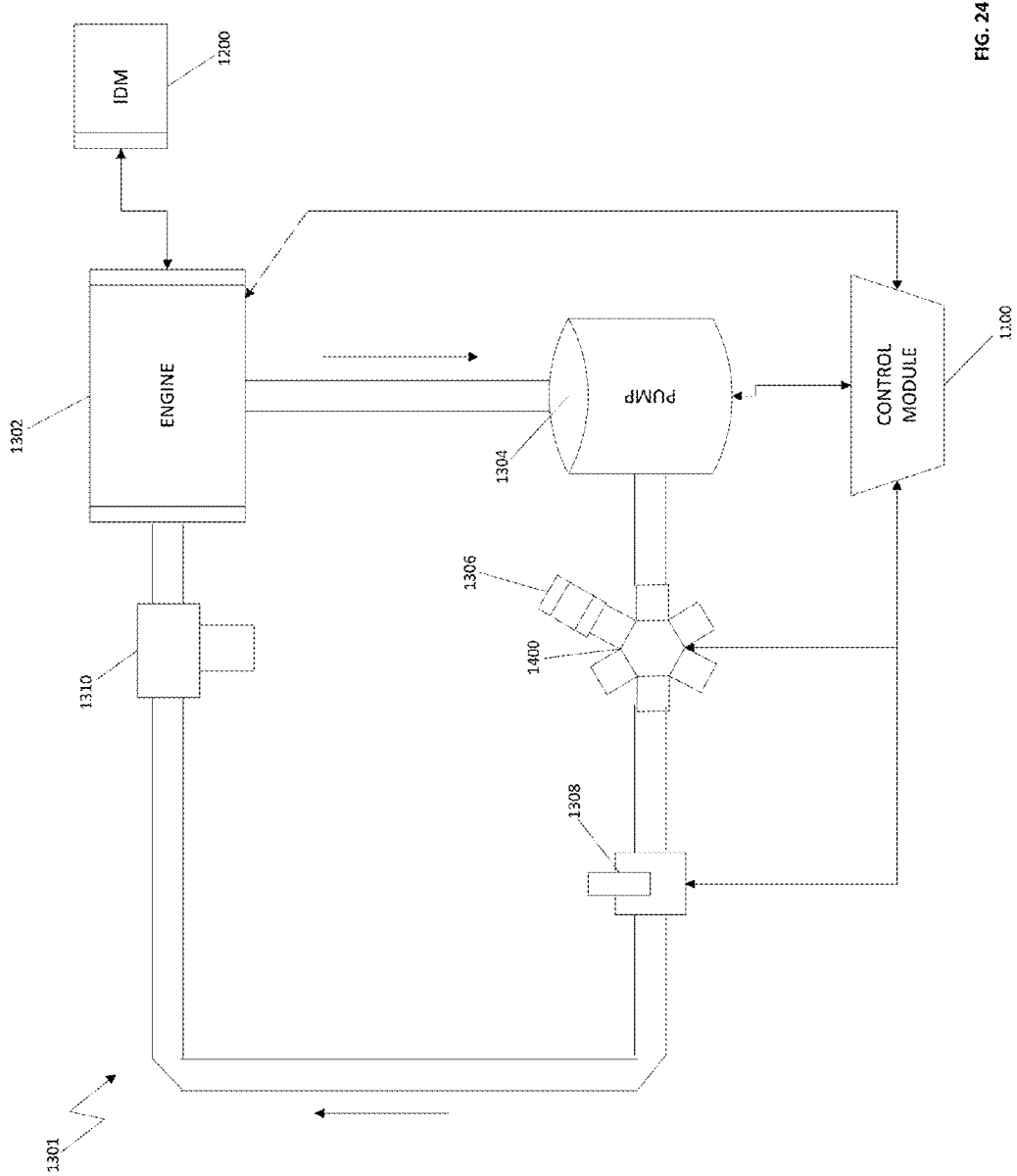

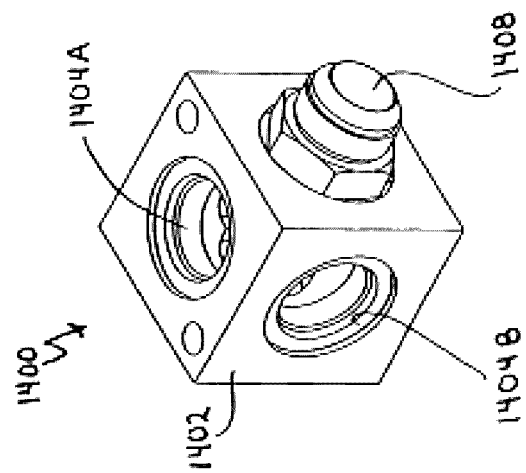
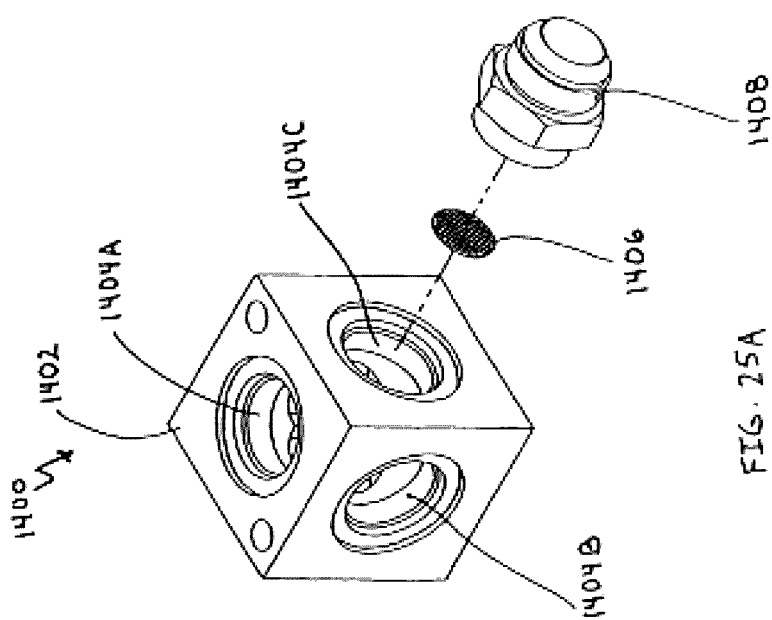

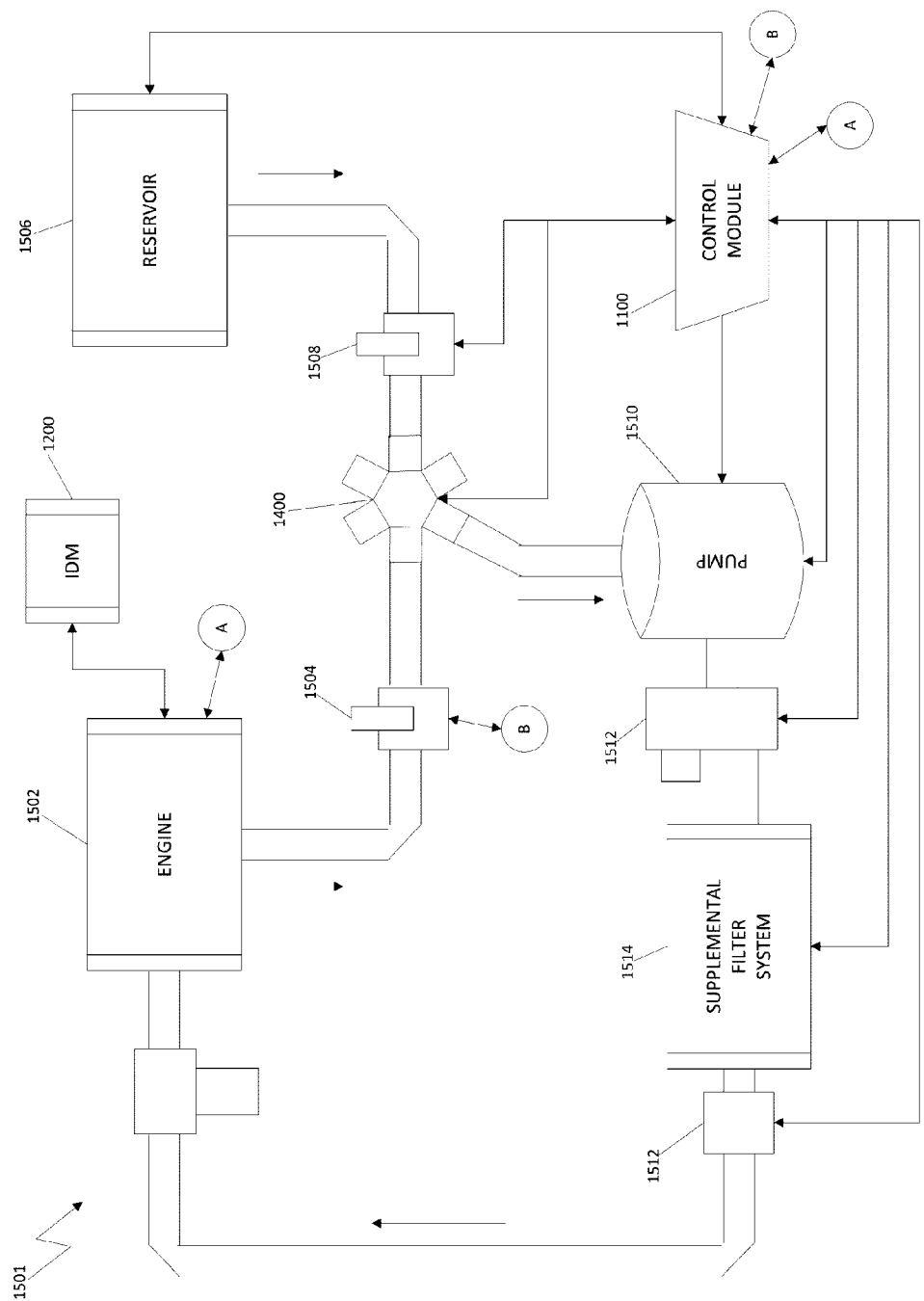

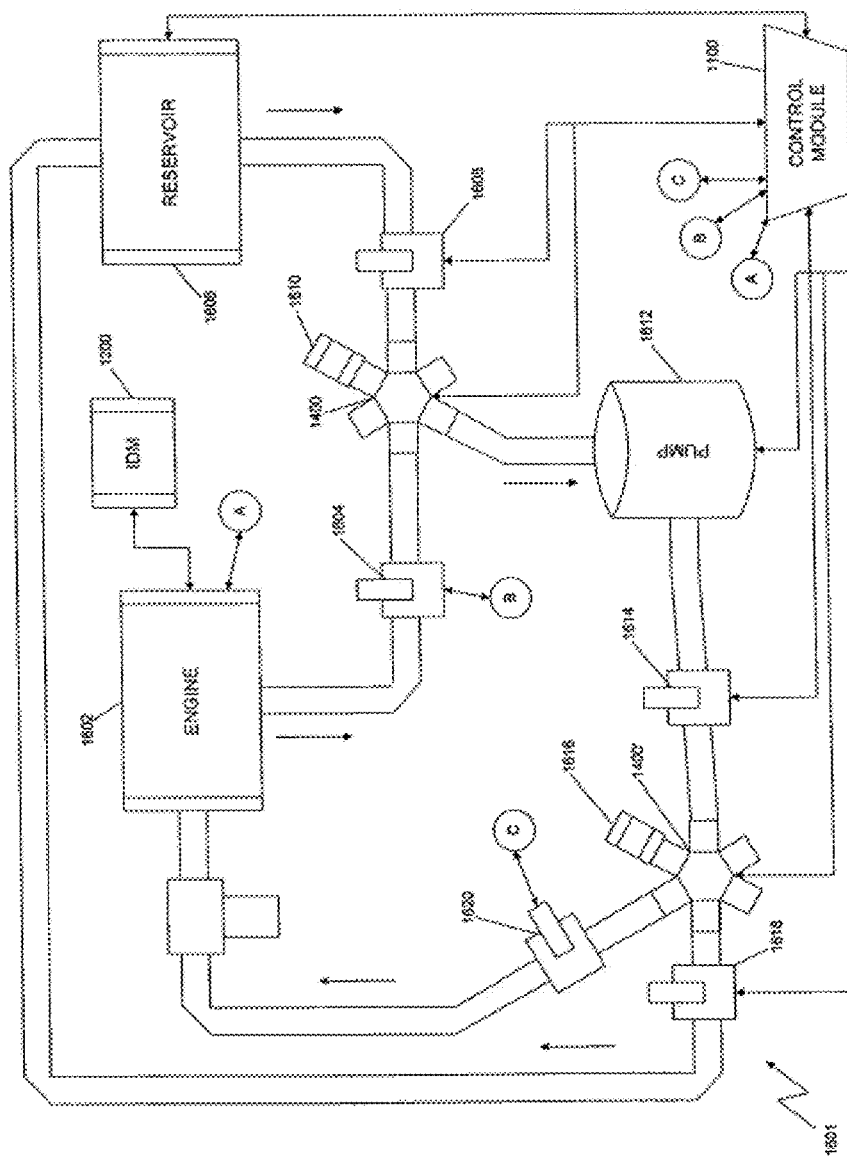

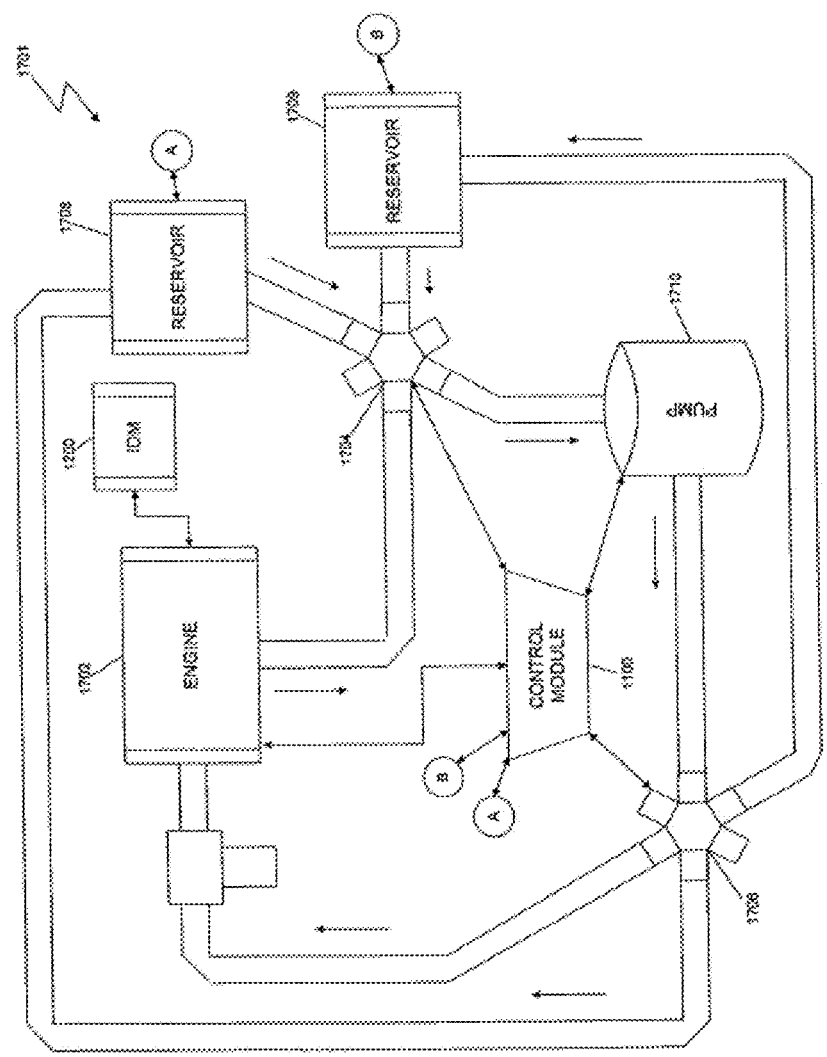

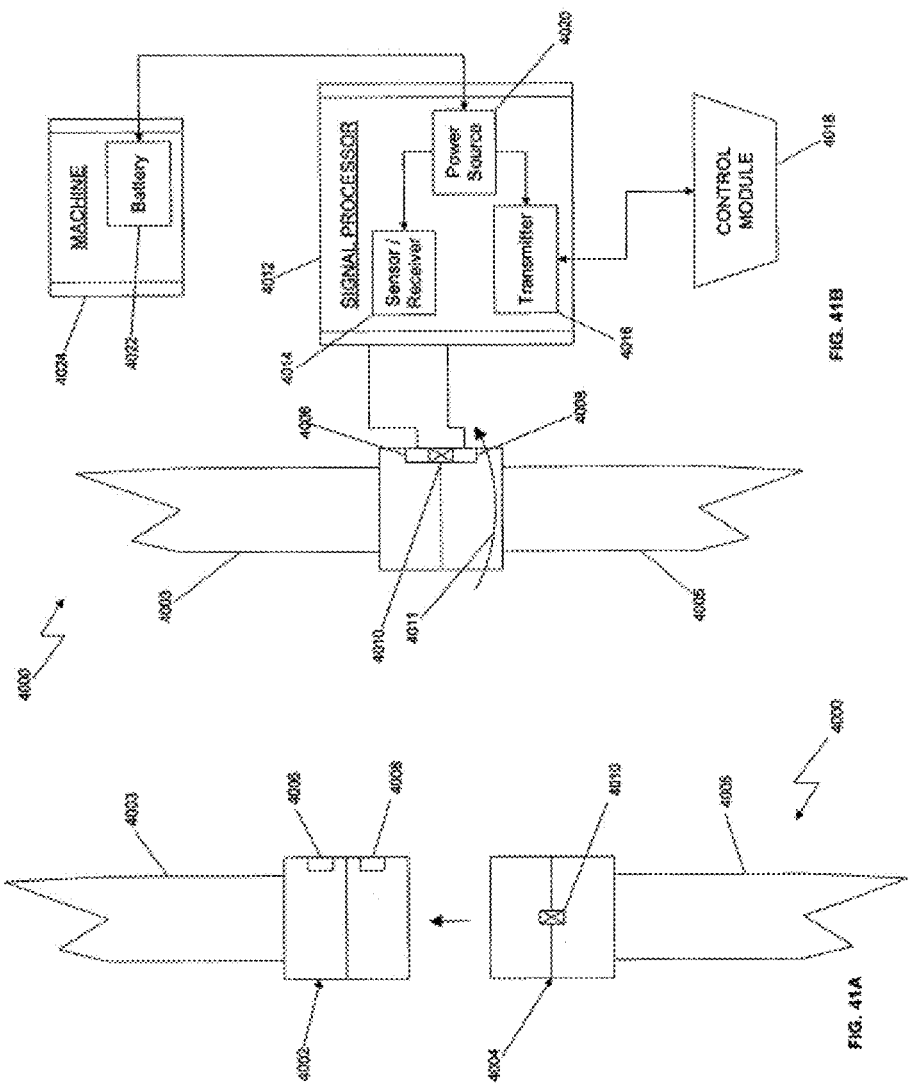

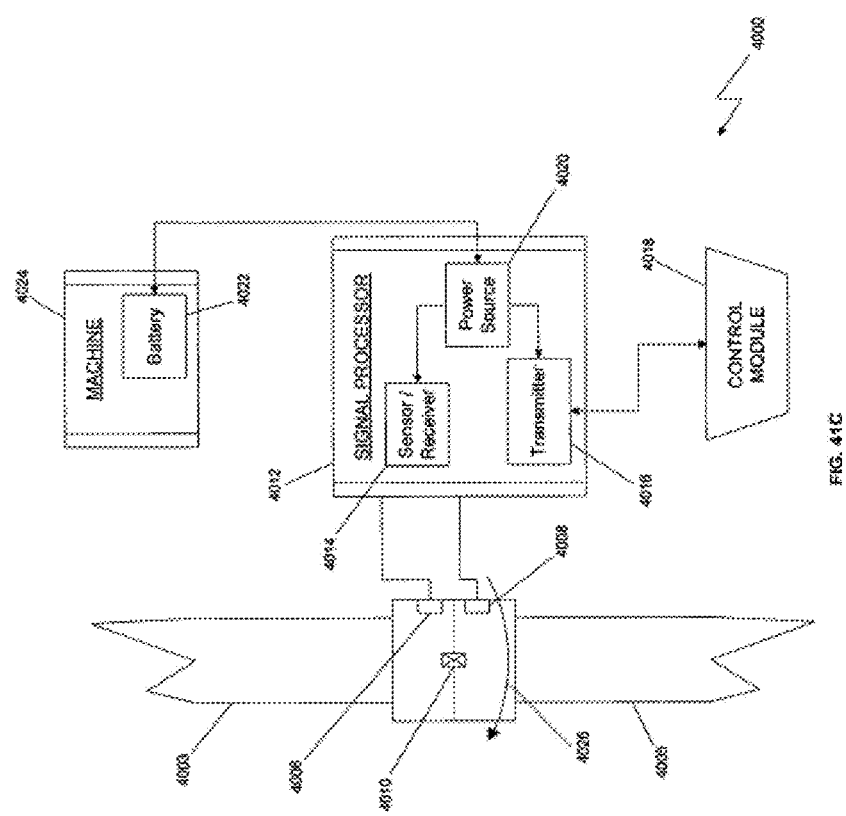

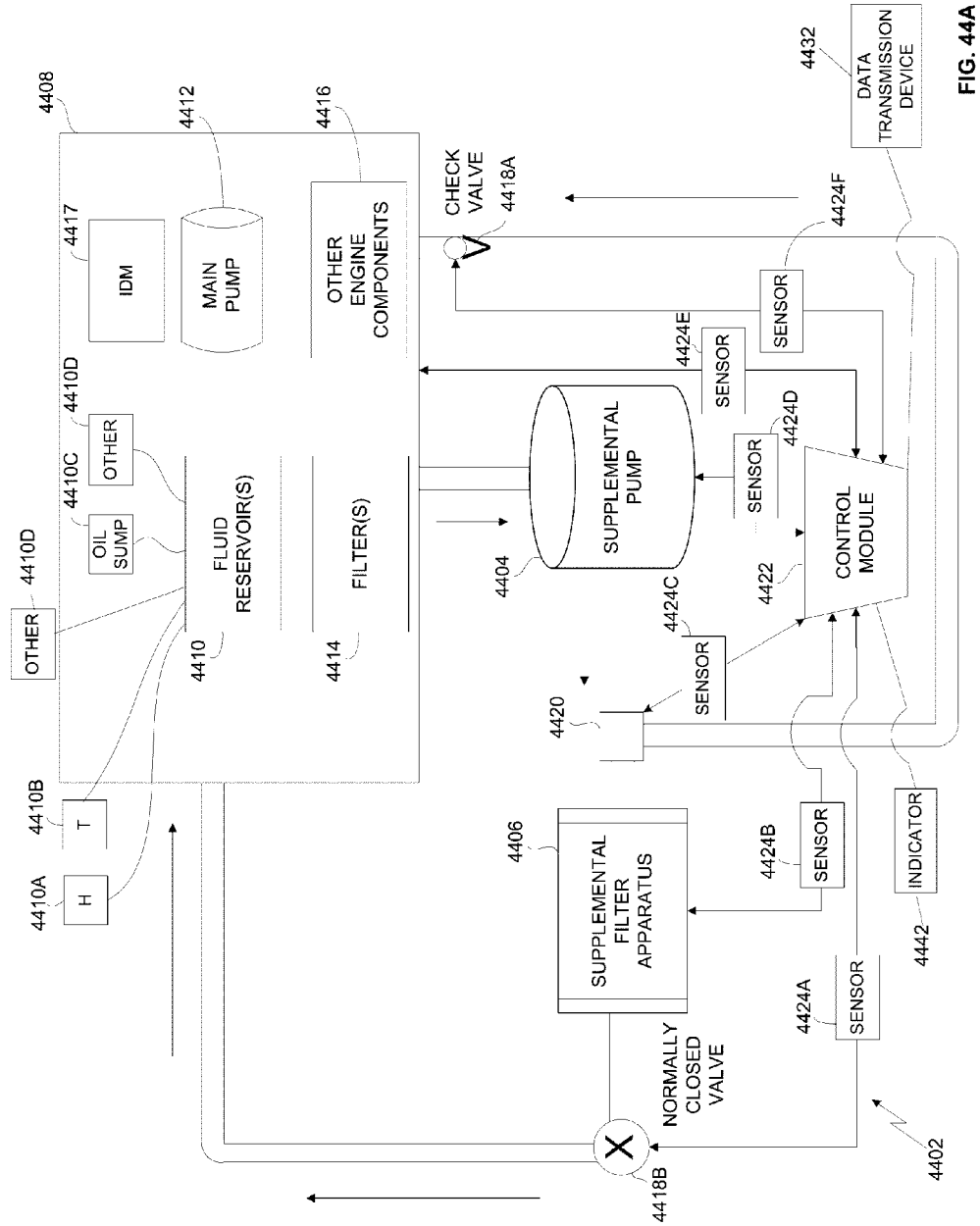

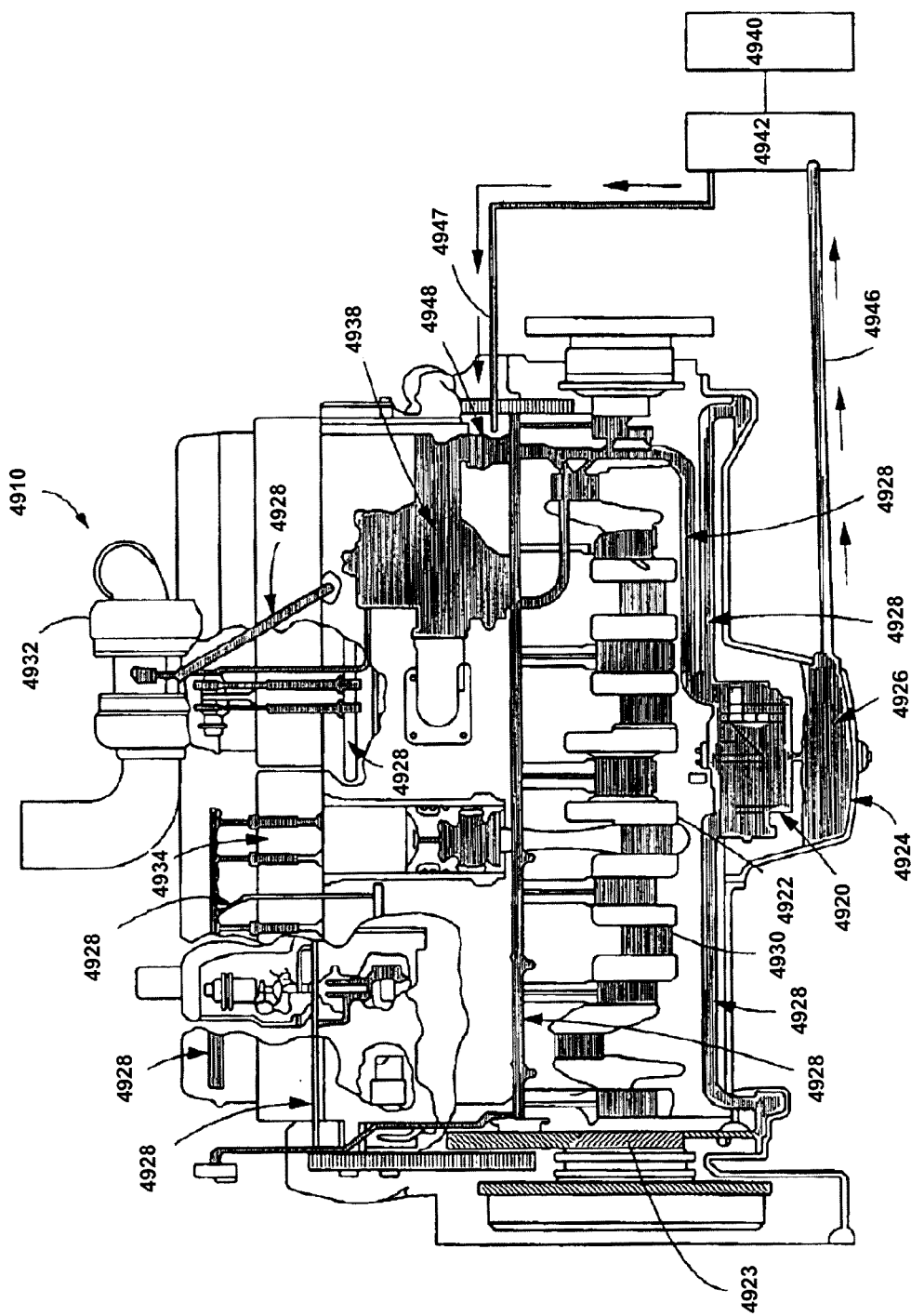

VALVE ASSEMBLY FOR MACHINE FLUID OPERATIONS

BACKGROUND

Machines such as large-capacity diesel engine systems used in connection with construction equipment, earth-moving equipment, transportation equipment (e.g., locomotives) and the like, are often implemented in adverse operating conditions. Typical operating conditions for such equipment can require extensive maintenance, repair and overhaul work to sustain the equipment and its components, including the engine systems. As a consequence of adverse equipment operating conditions, certain equipment components may be exhausted long before the expected end of their useful lives. This component exhaustion can occur despite efforts to ensure proper component installation and maintenance, including periodic maintenance of equipment oil supply and lubrication systems, for example. Extensive and premature wear of large-capacity diesel engines, for example, can be caused by a combination of factors, including inadequate lubrication of components prior to engine ignition, failure to adhere to prescribed maintenance schedules, failure to collect and analyze data associated with equipment operation, system malfunction, general misuse of the equipment, and other factors.

Methods and systems for data collection and analysis are therefore needed that can extend the useful life of equipment components. Component movement and interaction during various periods of equipment operation can impact the continued effective operation and useful life expectancy of the engine system. In connection with operation and/or maintenance of the engine system during such periods, important data such as, for example, temperature, oil pressure, time to evacuate an oil sump, and historical data regarding previous engine ignition cycles can be collected and analyzed. Conventional equipment methods and systems, however, typically do not collect and analyze data during various stages of machine operation to assist in operation or maintenance of the machine and its components.

In addition, in the context of performing machine maintenance, there is often a need for performing multiple evacuations and/or refills of fluid receptacles. Such fluid receptacles may include, for example and without limitation, oil sumps, transmission fluid reservoirs, fuel tanks, waste-receiving receptacles, hydraulic fluid reservoirs, and other like receptacles associated with machine operation and maintenance. In many situations, such fluid evacuation and fluid refill processes may not be timed and/or sequenced to maximize performance of maintenance on a machine. Furthermore, data crucial to scheduling maintenance and monitoring performance issues with machines are often neither collected nor analyzed during fluid evacuations, fluid refills, or other fluid processing activities.

Many industrial machines and equipment have requirements for fluid exchanges. Examples of these fluid exchanges include changing the oil in motors and engines or hydraulic fluid in presses and lifting equipment. Countless other examples exist, but what is generally common to these machines or equipment is the fact that the outlet port is inconveniently located. Typically this is the result of having to remove the fluid from a sump or drainage point that is located at the bottom of the machine to utilize gravity flow.

The tasks of removing and refilling machine fluids may be difficult or time consuming because of the usually inconvenient location of the fittings required to perform these fluid operations. Some machines, however, may include fluid circulation pumps that are installed and applied in locations that are external to the machine. Also, some equipment may be provided with one or more internally or externally located pre-lubrication devices that permit oil or fluid to commence circulation prior to the activation of the primary equipment or engine on which the pre-lubrication device is installed. Illustrative of such devices is the pre-lubrication device shown in U.S. Pat. No. 4,502,431, which is incorporated herein by reference, and which is typically fitted to a diesel engine used in power equipment, trucks and/or heavy equipment.

Furthermore, in certain off-road heavy equipment, reservoirs containing fluids may contain scores of gallons of fluid, which can consume unacceptably long periods of time to drain and refill. For example, in some equipment, an engine oil sump or reservoir may contain up to 150 gallons of oil; a transmission sump may contain up to 100 gallons of transmission fluid; and a separate reservoir of hydraulic fluid to power hydraulic functions may contain up to 500 gallons of hydraulic fluid. Downtime costs for relatively large machines and other pieces of equipment can be substantial. Accordingly, if downtime for maintenance in such machines can be minimized, then substantial economic benefits often result. In addition, there are numerous comparatively smaller devices and motors for which access to fluid discharge ports is difficult to reach or in which the fluid must be assisted for removal. Examples include marine engines and the like. In some small-sized pieces of equipment, the engine must be inverted to remove oil, for example, or other fluids. For example, see U.S. Pat. Nos. 5,526,782; 5,257,678; and, 4,977,978.

Thus, what are needed are improved methods and systems for performing fluid maintenance functions, such as fluid evacuation and refill processes, for example, in connection with machine operation and maintenance. What are also needed are enhanced methods and systems for sequencing and timing fluid operations, while collecting, storing and/or analyzing data pertinent to the performance and results of such fluid transfer operations.

BRIEF DESCRIPTION OF THE FIGURES

FIG. 19 includes a schematic diagram illustrating one embodiment of a fluid system configured for performing one or more fluid processes in accordance with the present systems and methods;

FIG. 20 includes a schematic diagram displaying one embodiment of a control module and various embodiments of data devices configured for use in accordance with various embodiments of the present systems and methods;

FIG. 24 includes a schematic diagram illustrating one embodiment of a fluid system configured for performing one or more fluid processes in accordance with the present systems and methods;

FIG. 25A includes an exploded, isometric view of one illustrative embodiment of a junction block assembly structured for use in accordance with various embodiments of the present systems and methods;

FIG. 25B includes an isometric view of the junction block assembly of FIG. 23A;

FIG. 26 includes a schematic diagram illustrating one embodiment of a fluid system configured for performing one or more fluid processes in accordance with the present systems and methods;

FIG. 27 includes a schematic diagram illustrating one embodiment of a fluid system configured for performing one or more fluid processes in accordance with the present systems and methods;

FIG. 28 includes a schematic diagram illustrating one embodiment of a fluid system configured for performing one or more fluid processes in accordance with the present systems and methods;

FIG. 41A through 41C illustrate various modes of operation for a schematically represented connection/disconnection detection system provided in accordance with various embodiments of the present invention;

FIGS. 44A and 44B schematically illustrate alternative embodiments of an example of a fluid filtration apparatus structured in accordance with various embodiments of the invention;

FIG. 49 is a side view in partially schematic form of an engine that may be employed in connection with various embodiments of the invention, with portions broken away or not shown for convenience of disclosure;

DESCRIPTION

Figure 1:
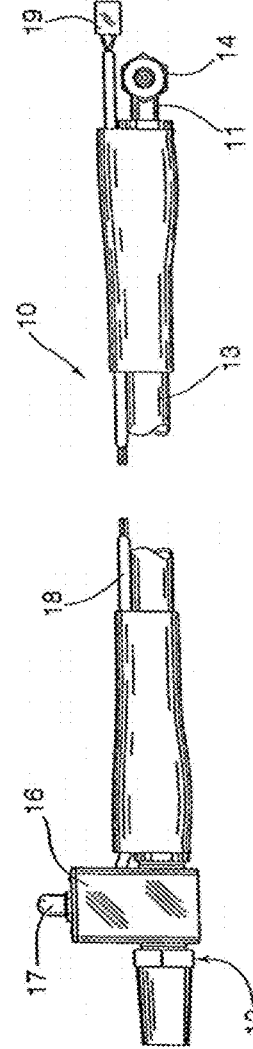
FIG. 1 is a side elevation view of one embodiment of a single-reservoir conduit system.

The term "machine" as applied herein may include any equipment suitable for use in accordance with the present methods and systems. Examples of "machines" as applied herein can include, without limitation, a lubrication system, engines, diesel engines, large-scale diesel engines, motors, rotating equipment, generators, aircraft engines, emergency machines, emergency generators, compressors, equipment that includes a machine (e.g., such as mining equipment, construction equipment, marine equipment, aircraft, and the like), and other like machines. In various portions of the disclosure herein, the example of an "engine" is employed for convenience of disclosure in describing various embodiments and aspects of the present systems and methods. It can be appreciated by those skilled in the art, however, that such use of "engine" as one example of a type of machine is intended merely for said convenience of disclosure and is not intended to limit the scope of application of the present systems and methods.

The term "evacuation" as applied to the systems and methods disclosed herein may include evacuation of any portion of a fluid of a machine, a receptacle, a reservoir, or other like fluid-retaining system or apparatus. Similarly, the term "refill" as applied to the systems and methods disclosed herein may include refill of any portion of the fluid capacity of a machine, receptacle, reservoir, or other like fluid-retaining system or apparatus.

The term "valve system" as applied to the systems and methods disclosed herein may include any combination of valves, pipes, disconnects, adapters and other like structural components configured for performing one or more fluid refill and/or fluid evacuation processes. Examples of valves included within a valve system may include, without limitation, single-position valves, multi-position valves (e.g., such as junction block assemblies or five-way control valves), and other types of valves with or without electronic control for actuating the various possible open/closed positions of such valves. The "multi-position valve" expression, as applied herein, can include a unitary valve mechanism (e.g., a single junction block assembly), or a reasonable combination of a unitary valve mechanism and other valve components.

Where suitable and applicable to the various embodiments of the present systems and methods discussed herein, it can be appreciated that various components, structures, elements, and other configurations may be applied or installed in a location considered external or internal to the operation of a particular machine. In applicable portions herein where the use of pumps and/or supplemental pumps is disclosed, for example, such pumps may be positioned, installed, or operated as internal components of a machine and/or as externally positioned components that assist, or otherwise operate in conjunction with, the functions of the machine.

As used herein, the term "subsequent" or variations thereof (e.g., "subsequently") as used with respect to performance of process or method steps is not intended to exclude other potential process or method steps from occurring or being performed between steps that are considered "subsequent" with respect to each other. For example, as applied herein, if step Y occurs "subsequent to" step X, then the intended meaning of "subsequent to" is that step Y occurs at some point in time after step X occurs, but other steps may occur in the time period that elapses between the occurrence of step X and step Y. In like fashion, the term "prior" or variations thereof (e.g., "prior to") as used with respect to performance of process or method steps described herein is not intended to exclude other potential process or method steps from occurring or being performed between steps that are considered "prior to" with respect to each other.

As employed herein, the term "type" or "kind" used with regard to various fluids discussed herein is intended to distinguish different types or kinds of fluids between/among each other. For example, oil is considered one "type" of fluid, transmission fluid is considered another, different "type" of fluid, and hydraulic fluid is considered another, different "type" of fluid. It should be noted, for example, that a used amount of a "type" of fluid is not considered different with respect to a clean or fresh fluid of the same "type" (e.g., clean oil used in a fluid refill or replacement process for a machine is not considered a different "type" of fluid with respect to the used oil drained from the machine during a fluid evacuation process).

Figure 2:
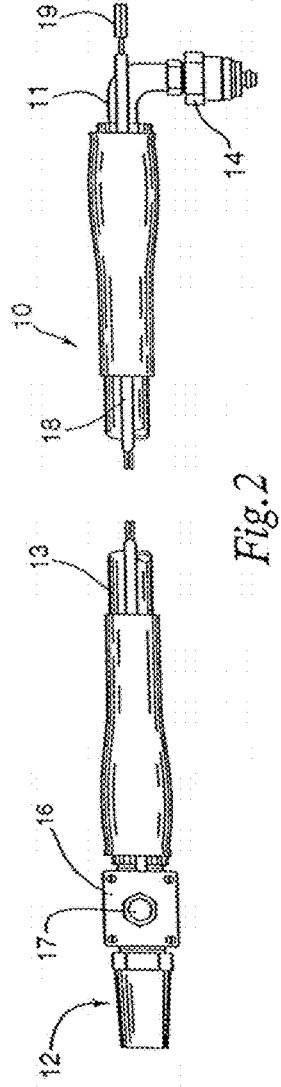
FIG. 2 is a plan view of the embodiment shown in FIG. 1 showing a coupling.

Referring now to FIGS. 1 and 2, a portable fluid transfer conduit 10 is shown having an inlet port 11 and outlet port 12. Flexibly extending between inlet and outlet ports 11 and 12 is flexible tubing 13. In various embodiments of the present systems and methods, the tubing 13 may be made from a natural or synthetic rubber material, braided stainless steel or polymeric extruded material such as polyethylene or styrene.

Figure 5:
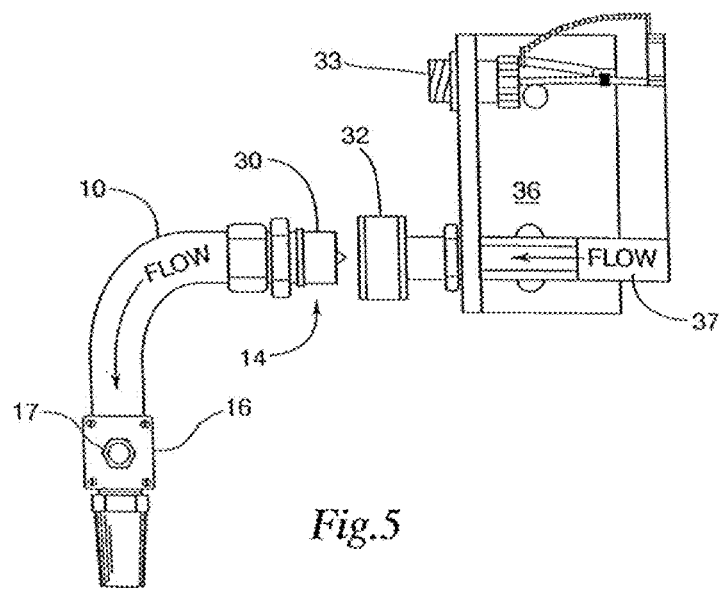
FIGS. 5 and 6 are two views of one embodiment of a coupling for use with various embodiments of the present systems and methods.
Figure 6:
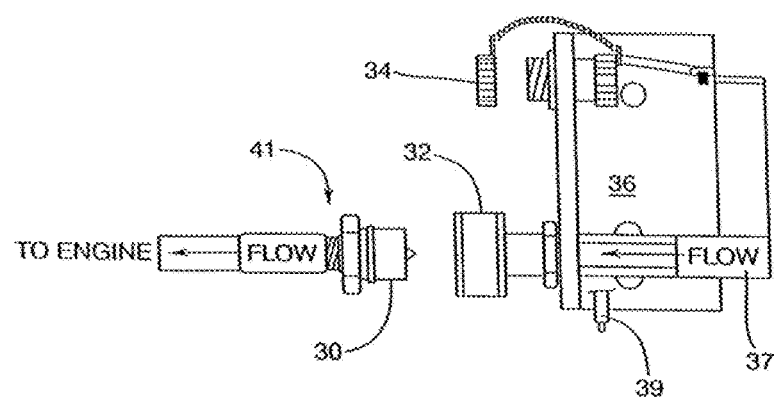

A coupling 14 is attached to the inlet 11. As shown, the coupling 14 is the male mateable end of a quick disconnect coupling more clearly shown in FIGS. 5 and 6. Alternatively, coupling 14 can be any type of fitting such as a screw in or a bayonet type coupling. In one embodiment, a fitting is adapted to the outlet of the fluid source. On devices such as a pre-lubrication pump similar to that shown in U.S. Pat. No. 4,502,431, for example, a bypass or connector means can be inserted on the pressure side of the pump to divert the oil from the engine to the fluid transfer conduit 10. An example is disclosed in the discussion of FIGS. 5 and 6 presented herein.

Positioned adjacent outlet port 12 is flow control means 16. Flow control means comprises, in one embodiment, an electric or mechanical valve for controlling the flow of fluid through the conduit activated by switch 17. This embodiment is useful where the fluid source does not incorporate a pump means and/or the fluid is gravity transferred. On the other hand, in the case where means such as a pre-lubrication device is used, flow control means 16 is preferably a pass through conduit having switch 17 sealably mounted thereon. Switch 17 is electrically connected by conductor 18 to electrical connector 19, which is adapted to connect with the pump circuit to activate the pump and control the flow of fluid. Where flow control means 16 comprises an electric valve, conductor 18 and connector 19 are typically connected to a source of electrical power such as a battery terminal, a magnetic switch, relay contacts or other electro-mechanical means for activating the pumping means.

To drain a fluid such as oil or hydraulic oil, for example, from a machine or other piece of equipment involves connecting coupling 14 to the outlet of the pump and initiating the pump through activation of flow control switch 17 or by use of gravity. It can be appreciated that in situations where a pre-lubrication pump is used, a valve is not usually required. The outlet port of fluid transfer conduit 10 is positioned at a remote and convenient location to discharge the fluid into a waste-receiving receptacle. Such waste-receiving receptacles are generally known in the art and may commonly comprise barrels or service vehicles, for example, or other receptacles or reservoirs adapted to receive and transport waste oil or other contaminated vehicle fluids.

Figure 3:
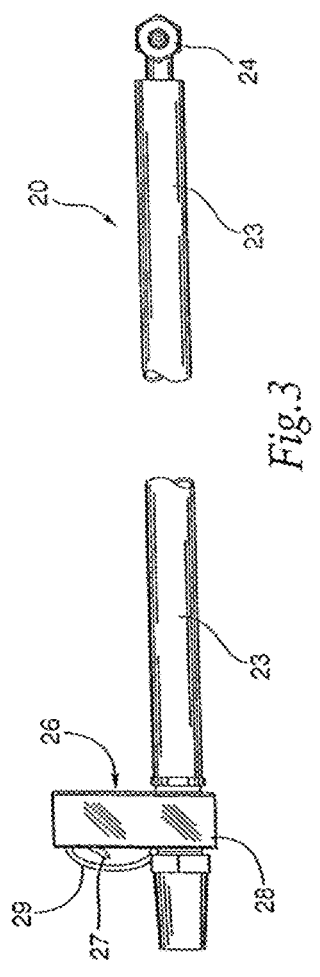
FIG. 3 is a plan view of a pump integrally included in a flow control means.
Figure 4:
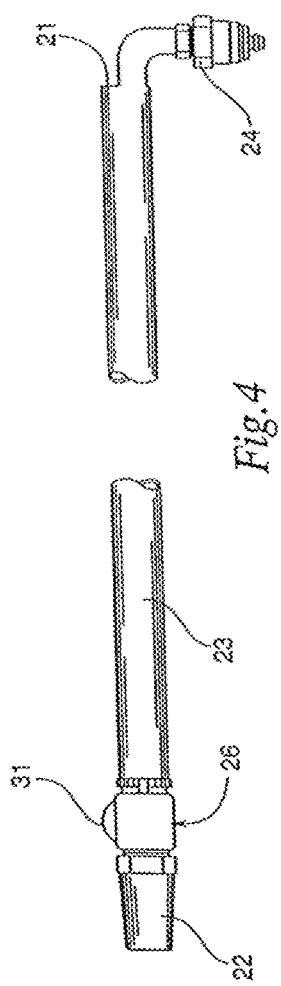
FIG. 4 is a side elevation of the embodiment shown in FIG. 3.

In one embodiment shown in FIGS. 3 and 4, fluid transfer conduit 20 comprises a conduit 23 having an inlet port 21 and an outlet port 22. Inlet port 21 includes a coupling 24, preferably a mateable coupling as shown in FIGS. 5 and 6. In this operational example, flow control means 26 comprises a small suction, diaphragm, piston or reciprocating pump 28 and may include therein a battery pack. Flow control means 16 includes an activator switch 27 in the form of a "trigger switch" having a guard 29 and grip means 31 to facilitate holding the discharge end of the fluid transfer conduit 20. It can be appreciated that in applications where a relatively long transfer conduit is applied such as, for example, a transfer conduit of 20 to 30 feet in length, the pump 28 can be located adjacent to, or in close proximity to, the coupling means 14.

Many types of small portable pumps suitable for use as the pump 28 are commercially available. A number of pumps are better suited for heavier or more viscous fluids but are not capable of operating with battery power. In such cases, a power cable such as conductor 18 and connector 19 can be used in addition to the various embodiments described herein. Typically, the electrical power required to operate the pump 28 can be supplied by a vehicle storage battery or an AC pump can be connected to an AC outlet as a power source. In general, smaller pump means are suitable and applicable in the consumer market, and the comparatively larger pump means are applicable to the industrial market.

Referring now to FIGS. 5 and 6, examples of coupling means 14, 41 for use with various embodiments of the present systems and methods are shown. Coupling means 14, 41 are adaptable, for example, to fluid transfer conduit embodiments shown with respect to FIG. 1 and FIG. 3. Coupling means 41 connects to the engine oil port (not shown), whereas coupling means 14 is attached to conduit 10. Such coupling means are well known in the art and comprise a male quick connector fitting 30 and a female mateable quick connector fitting 32. Also shown is an electrical receptor 33 for receiving electrical connector 19. In various embodiments, it is also possible to include a sensing means on the coupling means 14, 41 to indicate that the sump is dry and to signal for shut down of the pump. A cap 34 is shown for protecting receptor 33 between periods of use. As shown in the embodiments of FIGS. 5 and 6, receptor 33 and fitting 32 are mounted on a bracket 36 that is connected to a source of fluid 37, such as a pre-lubrication pump, for example (not shown). In this embodiment, the fitting 32 is connected on the output or high-pressure side of the fluid source system. In application to a pre-lubrication system, for example, the fitting 32 is interposed in the high-pressure pump discharge line between the pump and an engine or other machine.

Referring now to FIG. 6, one embodiment of a sampling port 39 is shown that can be used to sample oil in a pre-lubrication system where the pre-lubrication pumps flows through portion 37. It can be appreciated that this embodiment has the advantage of being able to provide a live sample of oil, or other fluid used in this embodiment, without requiring the engine or other machine to be in a fully operational state.

Figure 7:
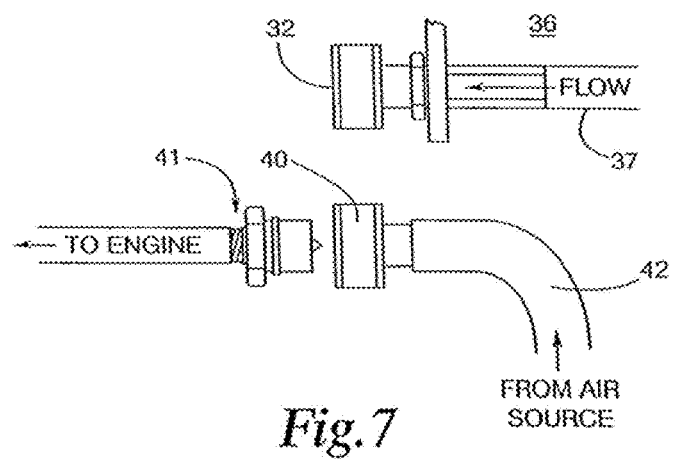
FIG. 7 is diagrammatic view of one embodiment of a conduit, and a coupling for oil purges.

As shown in the illustrative embodiment of FIG. 7, an additional fitting 40 is attached to an external air supply 42. In one aspect, the fitting 40 is a female fitting adapted to couple to an air supply (not shown). By attaching an air source to the fitting 40 prior to or during the removal of oil from the engine, oil resident in the channels can be removed to the sump and the oil in the filter system can be at least partially or substantially removed to facilitate removal of the filter. In many embodiments that employ such an air supply, it may be desirable to have the source of air at a pressure from about 90 to 150 pounds per square inch, for example.

It has been discovered that a vehicle or other equipment having, for example, an engine reservoir 105, hydraulic fluid reservoir 107 and a transmission fluid reservoir 109, may be more efficiently serviced and risks of environmental contamination may be reduced, if the various service locations for such reservoirs are in relatively close proximity. For example, and without limitation, if the service locations for such reservoirs are within about 3 to 10 feet from each other, service can usually be accomplished by relatively few technicians and within an acceptable amount of time. Also, the risks from environmental contamination caused, for example, by spillage when several lines and fluid containers are disconnected and connected, can be reduced if such close proximity of service locations is provided.

Figure 8:
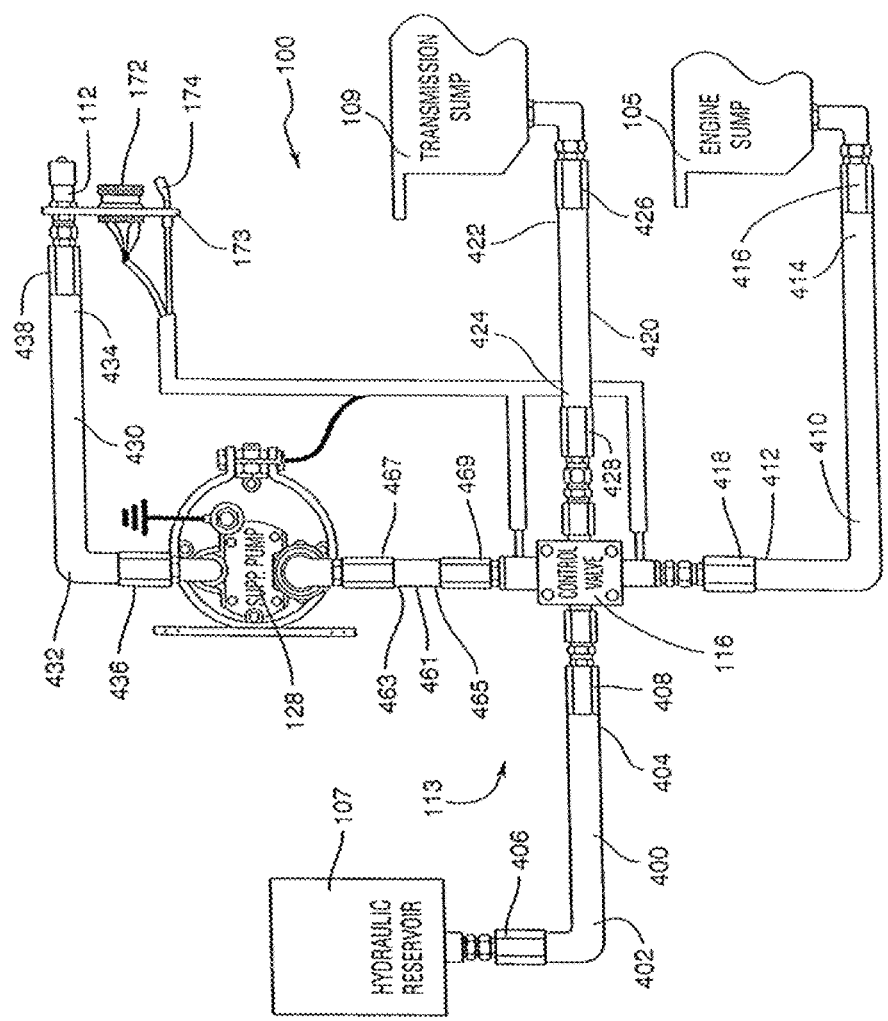
FIG. 8 is a diagrammatic view of one embodiment of a multiple-reservoir conduit system.

FIG. 8 illustrates one embodiment for a single-pump multiple reservoir conduit system 100, which may be used, for example, to evacuate the engine reservoir 105, the hydraulic reservoir 107 and the transmission or other fluid reservoir 109 of a machine through a quick connect port 112 that may be mounted on a bracket 173 or to an evacuation port 153 in a control panel 150 (see discussion herein). A pump 128, and each of the reservoirs 105, 107 and 109 are connected to a control valve 116 through a network of conduits 113. In one embodiment, the pump 128 may be a dedicated evacuation pump, for example, or may be an engine pre-lubrication pump, for example. The network of conduits includes a first conduit 400 connected to the hydraulic reservoir 107 at a first end 402 by a first coupling 406, and to the control valve 116 at a second end 404 by a second coupling 408. Similarly, a second conduit 410 is connected at a first end 414 to the engine reservoir 105 by a first coupling 416, and to the control valve 116 at a second end 412 by a second coupling 418. A third conduit 420 is connected at a first end 422 to the transmission reservoir 109 by a first coupling 426, and to the control valve 116 at a second end 424 by a second coupling 428. A fourth conduit 430 is connected to the pump 128 at a first end 432 by a first coupling 436 and to the outlet port 112 at a second end 434 by a second coupling 438. A fifth conduit 461 is connected to the pump 128 at a first end 463 by a first coupling 467 and to the control valve 116 at a second end 465 by a second coupling 469.

In one example embodiment, the control valve 116 is a three-position, four-port directional valve, which controls the connection of the pump 128 with each of the conduits 410, 400 and 420 leading to the reservoirs 105, 107 and 109, respectively. In one aspect, the control valve 116 has one default position, which is the engine sump 105 position. The control valve 116 and the pump 128 may be operated from a remote bracket 173 by an electrical evacuator switch attached to a connector 172, and a toggle selector switch 174, respectively.

As will be appreciated, in the operation of the system of FIG. 8, the control valve 116 determines which of the reservoirs 105, 107 or 109 will be in fluid communication with the pump 128 through the conduit network 113. Specifically, the selector switch 174 determines the position of the control valve 116. The switch connected at the connector 172 serves as the on-off switch for the pump 128, and may be mounted on the bracket 173 or may be mounted on a tethered switch connected to connector 172. In operation, the selector switch 174 controls the position of the control valve 116 to determine which reservoir 105, 107 or 109 is evacuated. When the switch connected to connector 172 is energized, the pump 128 is energized, thereby providing negative pressure on line 461 and, in turn, to the control valve 116. The fluid in the reservoir 105, 107 or 109 fluidly coupled to the control valve 116 is drawn into line 461, through pump 128, through line 430 and to coupling 112 for discharge into a suitable receptacle and/or into a fluid line for further processing.

Figure 9:
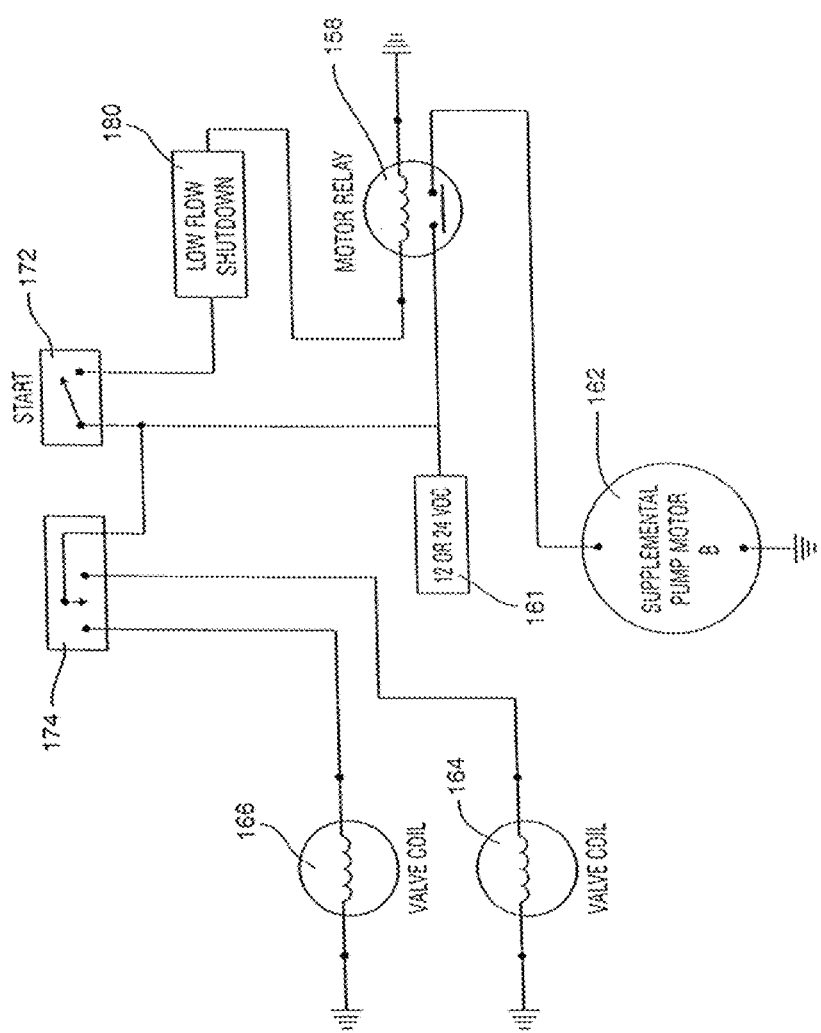
FIG. 9 is an electrical schematic diagram for one embodiment of the system of FIG. 8.

FIG. 9 shows one illustrative embodiment of the electrical circuitry for the embodiment of the single-pump, multiple reservoir system of FIG. 8. A relay switch 158 is connected to the motor 162 of the pump 128 to start and stop the pump motor 162 when the start switch 172 is activated to provide power from a direct current source, for example, or other suitable power source. In one aspect, the relay switch 158 stops the motor when a low flow condition is detected in any of the conduits 400, 410, and 420 during evacuation by the sensor 180. The control valve 116 is electrically operated through two solenoids 164 and 166 connected to a selector switch 174. The selector switch 174 is also connected to the start switch 172. In one embodiment, the start switch 172 includes a single-pole, normally open switch, and the selector switch 174 includes a single-pole double-throw switch.

Although three reservoirs are shown in the embodiment illustrated in FIG. 8, the number of reservoirs is not limited to three. For embodiments with N reservoirs, for example, there are N reservoir conduits connecting each reservoir with the control valve, such as the conduits 400, 410 and 420 of FIG. 8. A pump conduit, such as conduit 461, for example, connects the control valve 116 to the pump 128, and an outlet conduit, such as conduit 430, for example, connects the pump 128 to the outlet port 112. It can be appreciated that, for N reservoirs, the control valve 116 has one default position and N−1 selector activated positions.

Figure 10:
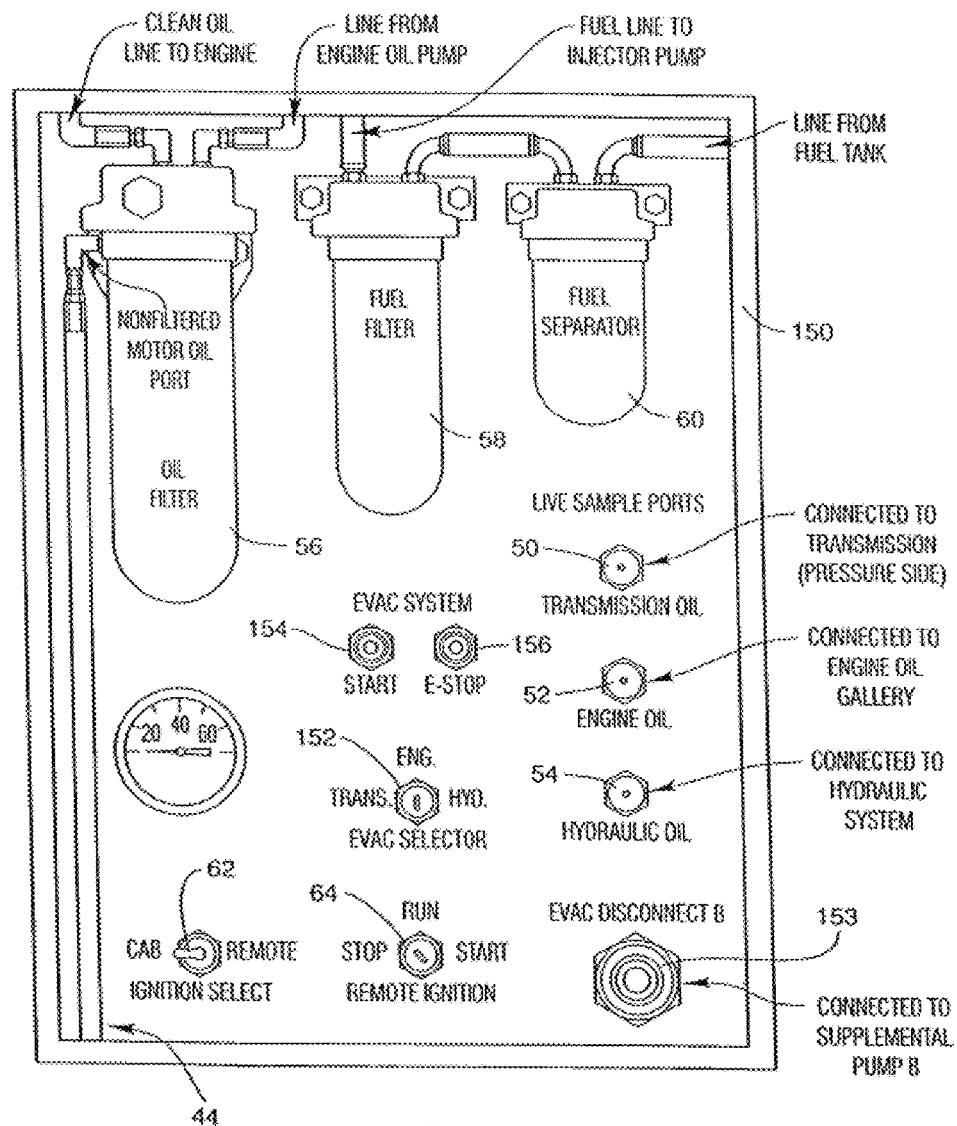
FIG. 10 is an elevation view of one embodiment of a service panel for a fluid evacuation system.

The control valve 116 may also be operated from a centralized location, such as a service panel. An embodiment of a remote single service panel 150 for a single pump, which includes switches for the actuation of the pump 128 and the control valve 116 in addition to switches for ignition and ports for sampling engine, transmission and hydraulic fluids, is shown in FIG. 10. A selector switch 152 on the service panel 150 is connected to the control valve 116 to enable an operator to select the reservoir to be evacuated. A switch for controlling evacuation 154, an emergency evacuation stop switch 156, and an evacuation connect port 153 (coupled, for example, to the line 430) for connecting/disconnecting the pump 128 may also be mounted on the service panel 150. Additionally, a transmission oil sampling port 50, an engine oil sampling port 52, and a hydraulic oil sampling port 54 may be mounted on the service panel 150 for with the transmission, engine and hydraulic reservoirs respectively. The service panel 150 may also include an oil filter 56 having an oil inlet line 44, transmission oil filter, a fuel filter 58, a fuel separator 60, hydraulic oil filter, a remote ignition selector 62 and an ignition switch 64. Thus, service locations, such as control panel 150, may be provided for virtually all machine, vehicle, and/or engine fluid service needs.

Figure 11:
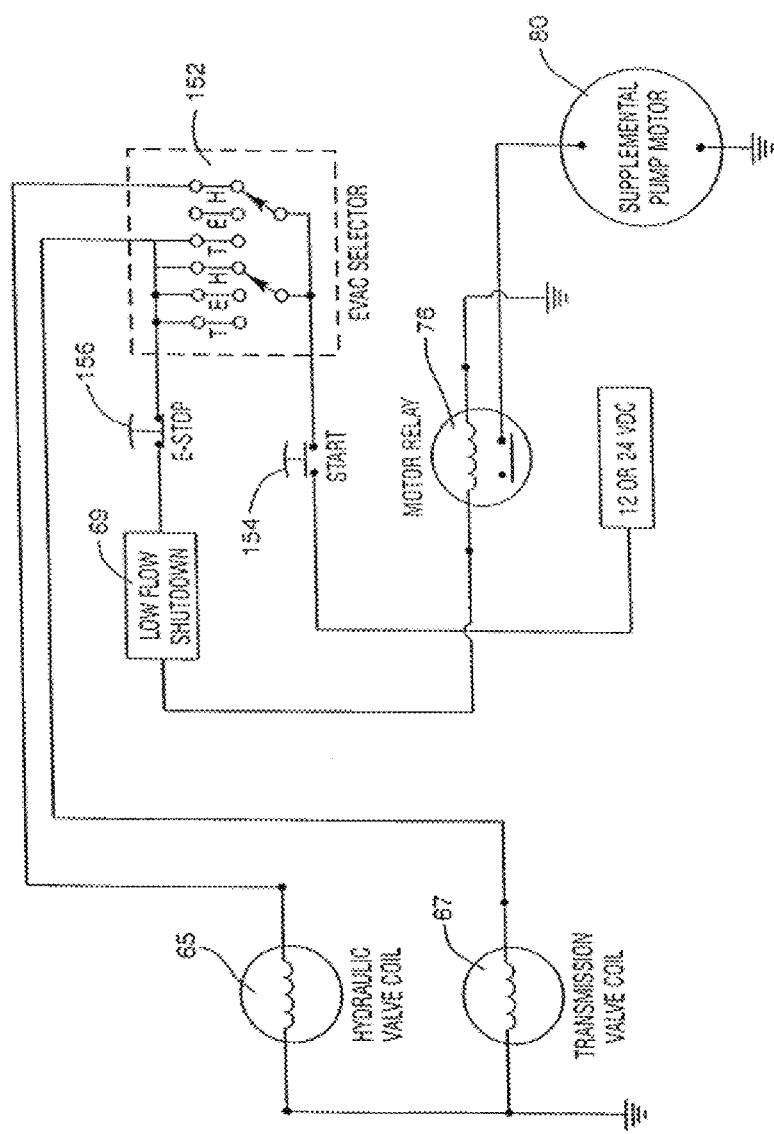
FIG. 11 is an electrical schematic for one embodiment of the system of FIG. 10.

An embodiment of the electrical diagram for the service panel of FIG. 10 is shown in FIG. 11. A motor relay 76 is connected to the pump motor 80 connected to pump 128 to start and stop the pump motor 80 when the start 154 and emergency stop 156 switches, respectively, are operated. The relay switch 76 stops the motor when a low flow condition is detected by sensor 69 during evacuation. The evacuation selector switch 152, which is electrically connected to the start switch 154 and to the emergency stop switch 156, enables the selective evacuation of the hydraulic reservoir 107 or transmission reservoir 109 through the operation of a hydraulic reservoir solenoid valve coil 65 and a transmission reservoir solenoid valve coil 67, respectively. The default position in FIG. 11 is the evacuation of the engine reservoir 105, but it will be appreciated that any of the reservoirs may be chosen as the default position, and that the number of reservoirs may not be limited to three.

Figure 12:
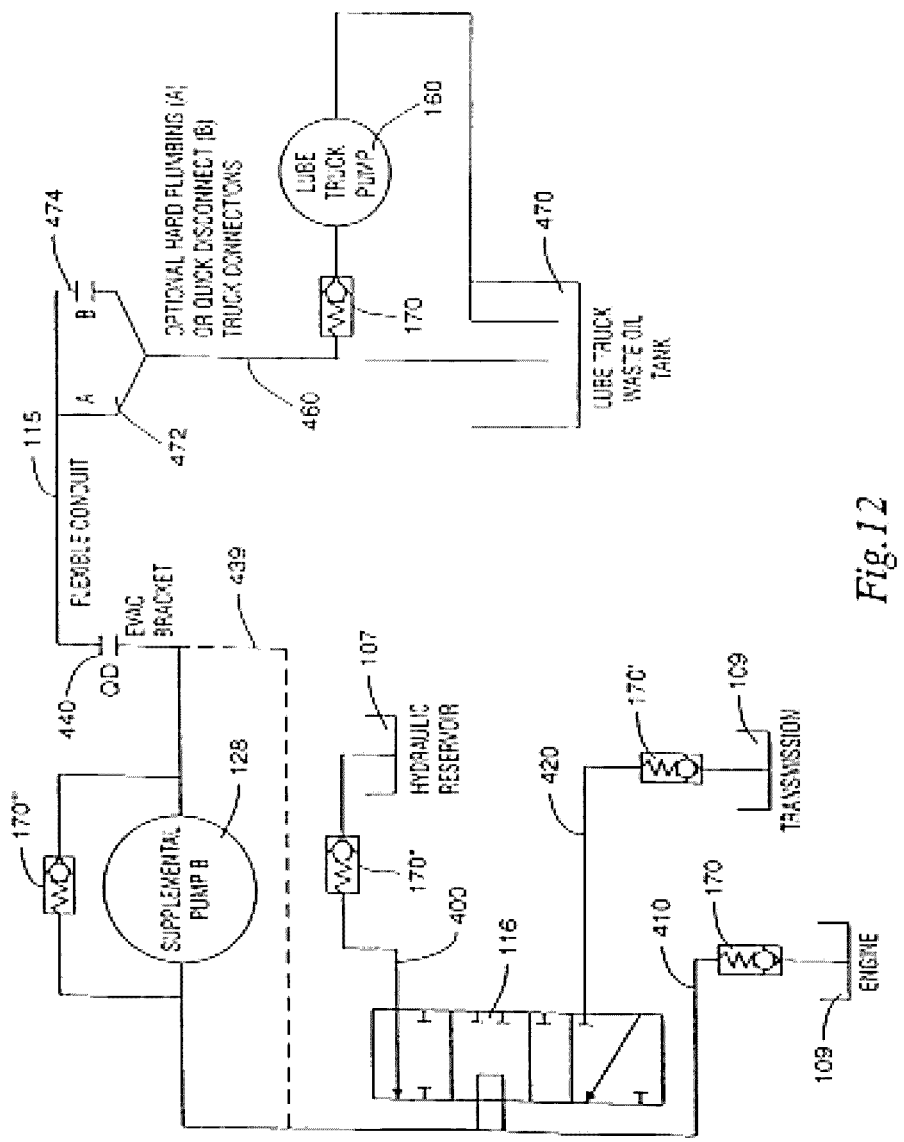
FIG. 12 is a hydraulic schematic diagram of one embodiment of a fluid evacuation system.

As shown in FIG. 12, each of the lines 410, 420 and 400 may also be coupled to a corresponding check valve 170, 170' or 170", respectively, to allow flow in one direction only as well as a check valve 170'" around pump 128. Optionally, a line 439 (shown in dotted lines) may be provided with appropriate valving around the pump 128, which is connected to a quick disconnect coupling 440. In this embodiment, the truck pump 160 of a lubrication evacuation truck may be used to evacuate fluids. The truck pump 160 evacuates through permanent line 472 or quick disconnect line 474 to a truck waste tank 470. If pump 128 is used and the truck pump 160 is not used, a conduit 460 may be connected by application of appropriate valving through the permanent line 472 or the quick disconnect 474 to the lubrication truck waste tank 470.

Figure 15:
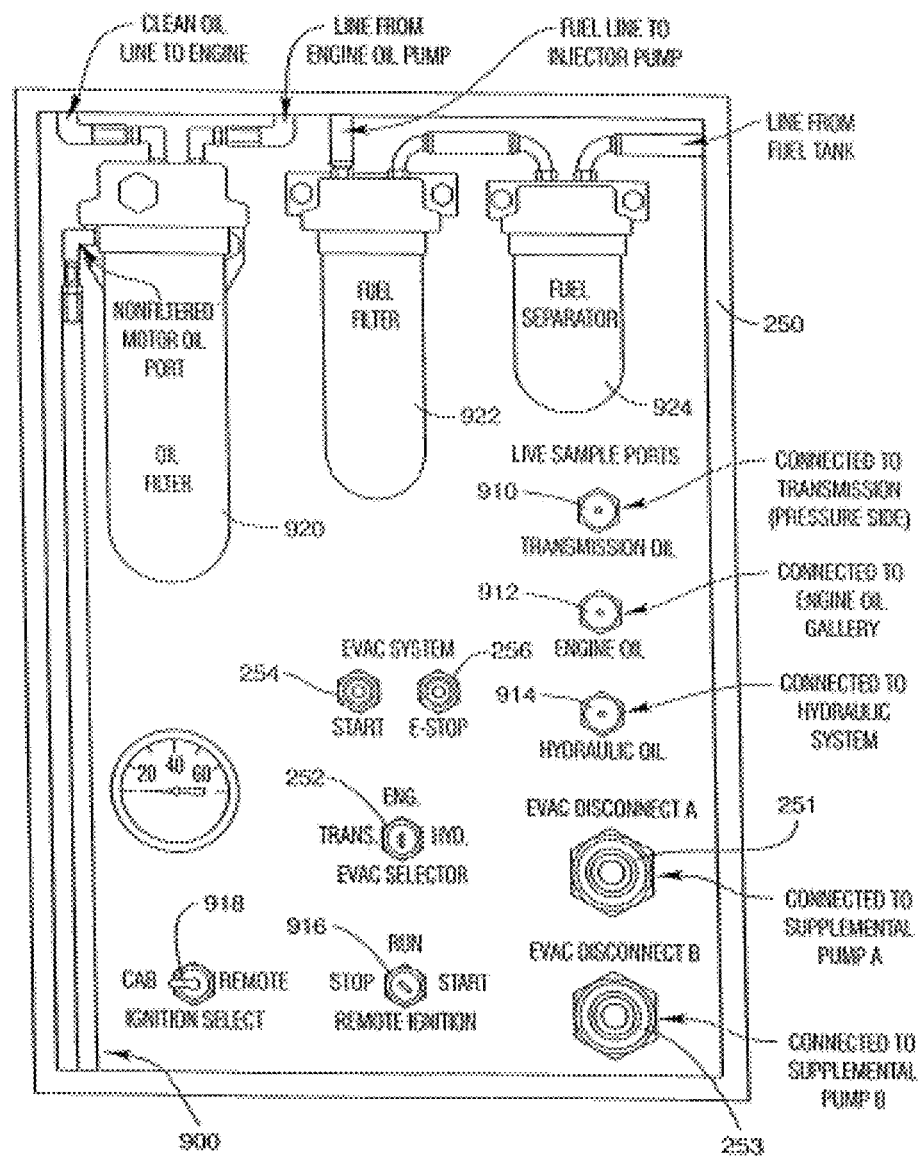
FIG. 15 is an elevation view of one embodiment of a control panel for a fluid evacuation system.
Figure 16:
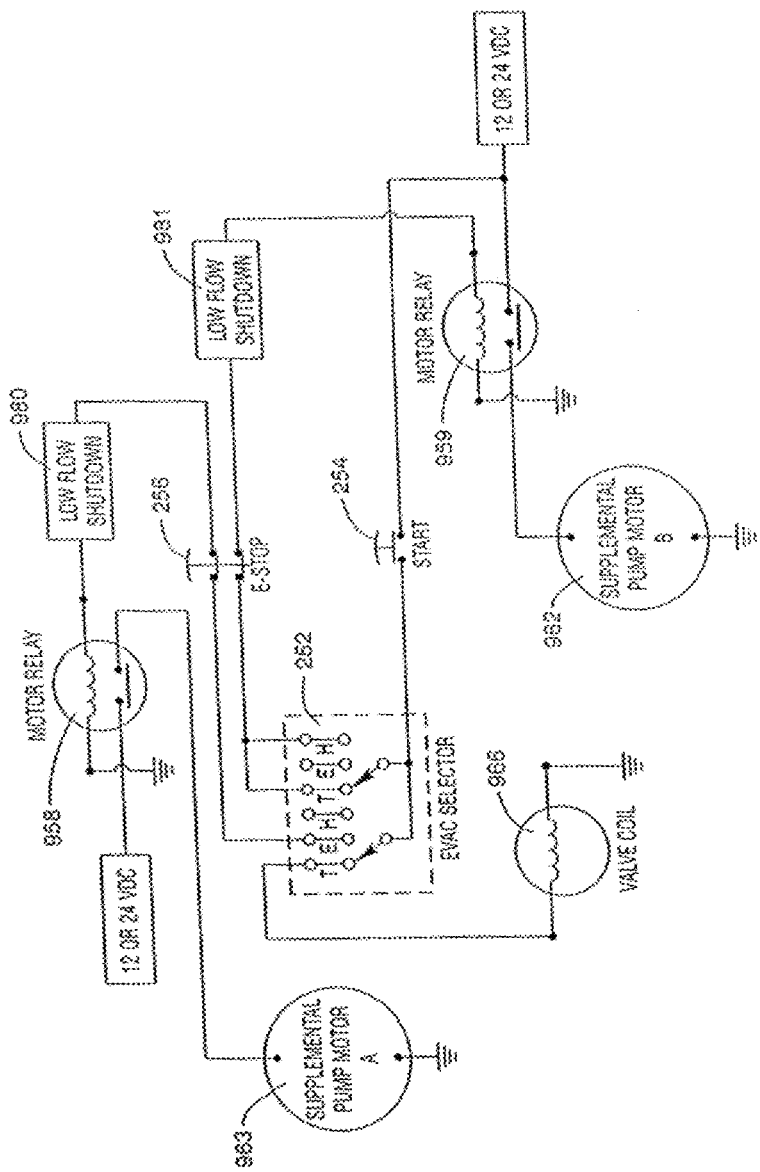
FIG. 16 is an electrical diagram for one embodiment of the system of FIG. 15.
Figure 17:
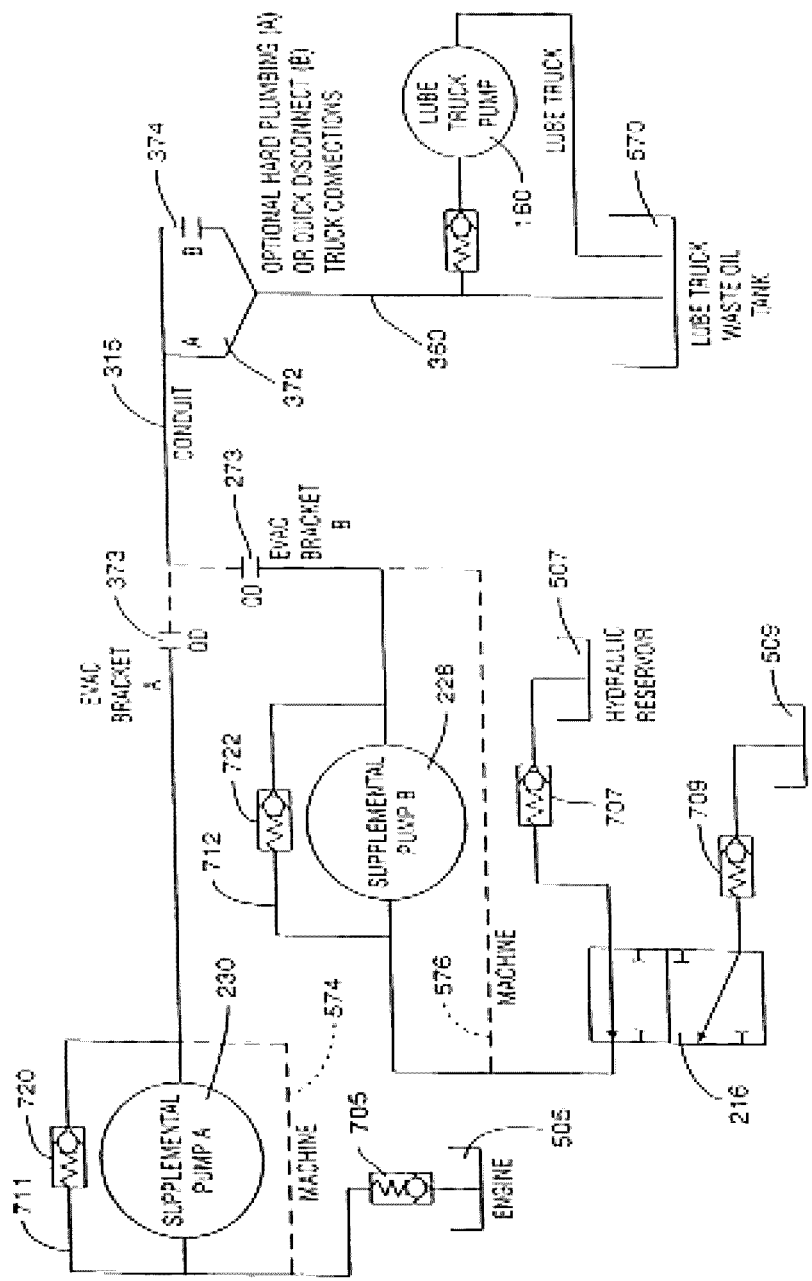
FIG. 17 is a hydraulic schematic diagram of one embodiment of a multiple pump fluid evacuation system.

FIGS. 13 through 17 illustrate embodiments for a dual-pump multiple reservoir conduit system 200 including a first pump 230 in fluid communication with an engine reservoir 505, and a second pump 228 in fluid communication with a hydraulic reservoir 507 and a transmission reservoir 509. However, it will be appreciated that more pumps may be used or the pumps may be connected to different reservoirs within the spirit and scope of the invention. In this embodiment, the first pump 230 evacuates the engine oil through a first outlet port 312 operated with an electrical switch connected to a connector 372 on a remote bracket 373 or mounted on a service panel 250. A first conduit 520 is connected to the engine reservoir 505 at a first end 522 by a first coupling 524, and to the first pump 230 at a second end 526 by a second coupling 528. A second conduit 530 is connected at a first end 532 to the first pump 230 by a first coupling 534, and to the first outlet port 312 at a second end 536 by a second coupling 538. The outlet port 312 may be connected to a conduit to provide for pre-lubrication of the engine. Alternatively, the second conduit 530 may also be fluidically connected to a coupling 251 in a control panel 250, discussed below. The second pump 228 is connected to a control valve 616 and evacuates fluid from the transmission reservoir 509 or the hydraulic reservoir 407 to a second outlet port 212 by operating the selector switch 274 and an evacuation switch connected to connector 272 which, together with the outlet port 212, may be mounted on a second bracket 273. The second pump 228 and each of the reservoirs 507, 509 are connected to a control valve 616 through of a network of conduits 513. The network of conduits 513 includes a first network conduit 540, which is connected at a first end 542 to the hydraulic reservoir 507 by a first coupling 546, and to the control valve 616 at a second end 544 by a second coupling 548. A second network conduit 550 is connected at a first end 554 to the transmission reservoir 509 by a first coupling 558, and to the valve 616 at a second end 552 by a second coupling 556. A third network conduit 580 is connected to the pump 228 at a first end 582 by a first coupling 586 and to the outlet port 212 at a second end 584 by a second quick coupling 588. Alternatively, the conduit 580 may be fluidically connected to a coupling 253 on the control panel 250. A fourth network conduit 590 is connected to the second pump 228 at a first end 592 by a first coupling 596 and to the control valve 616 at a second end 594 by a second quick coupling 598. A flexible conduit 315 may be used connect the outlet ports 312 or 212 to a waste oil container or to a port of a lubrication truck leading to a waste oil tank 570 on the lube truck, as shown in FIG. 17. The control valve 616 provides for the selective evacuation of the transmission 509 or hydraulic reservoir 507.

Figure 13:
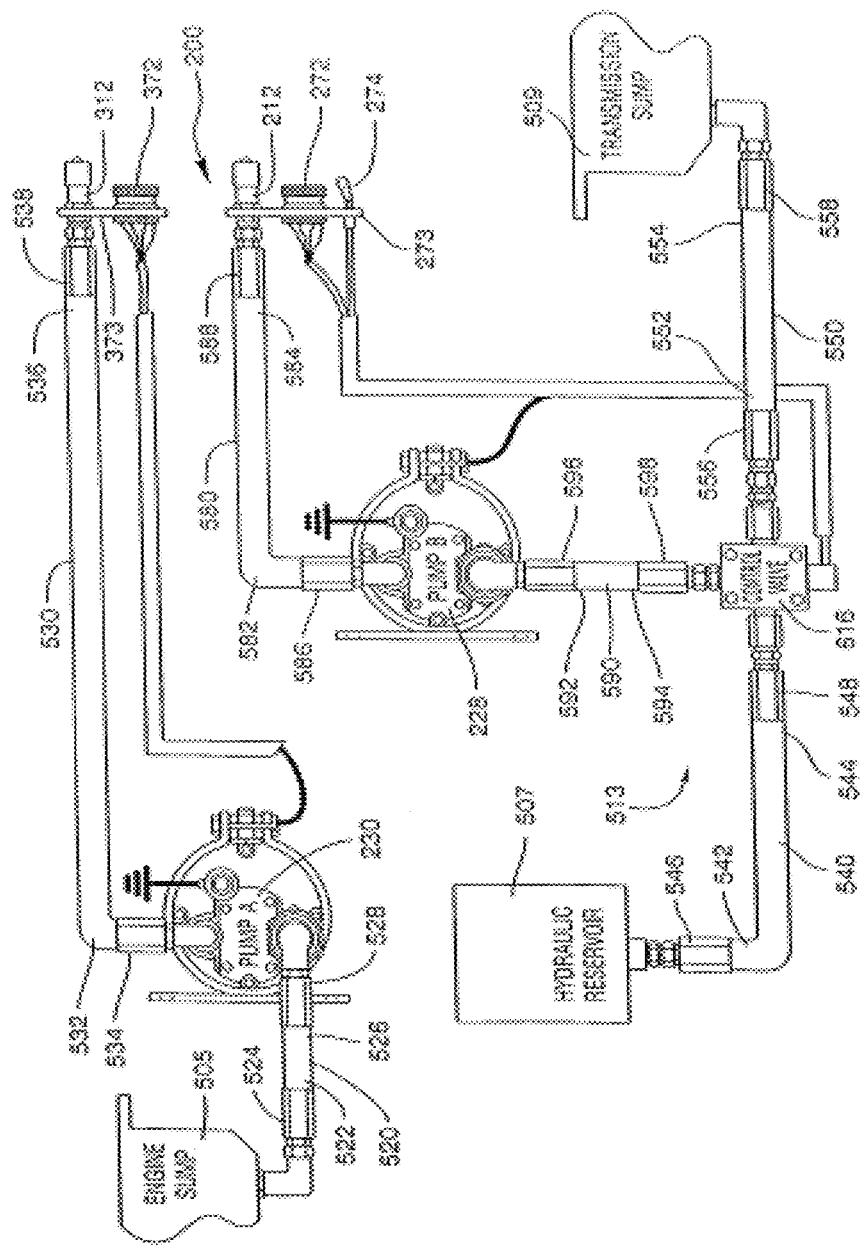
FIG. 13 is a diagrammatic view of one embodiment of a dual-pump multiple-reservoir conduit system.
Figure 14:
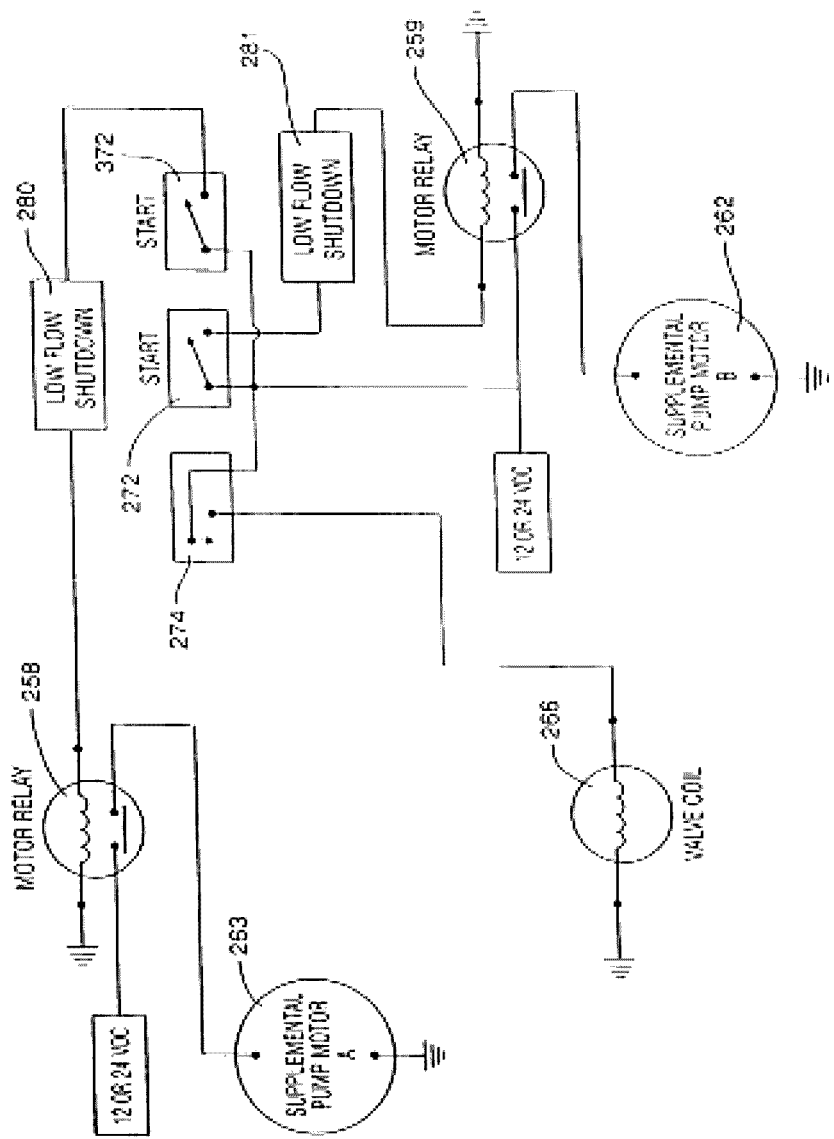
FIG. 14 is an electrical schematic diagram for one embodiment of the system of FIG. 13.

FIG. 14 illustrates an electrical diagram for an embodiment of a dual-pump multiple reservoir evacuation system illustrated in FIG. 13. Each pump motor 263 and 262 is connected to a corresponding relay switch 258 and 259, and each relay switch is powered, for example, by a portable source of 12V or 24V DC current. First and second motor relay switches 258, 259 are connected to a first and second normally open start switches 372 and 272. Between each relay and the corresponding start switch, low flow sensors 280 and 281, respectively, may be activated to intervene and stop the corresponding motor when a low flow condition is detected. A source of electric current is connected to the second relay switch 259, to the selector switch 274 and to the start switch 372 and 272. A two-position control valve 216 controls flow to the hydraulic reservoir 507 and the transmission reservoir 509, and is shown with a hydraulic reservoir as the default position, although any of the reservoirs may be the default reservoir.

It will be appreciated that the number of conduits connected to the first and second pumps need not be limited to a total of three. For example, the first pump 230 may be connected to $N_1$ reservoirs and the second pump 228 may be connected to $N_2$ reservoirs for a total number of $N=N_1+N_2$. FIG. 13 illustrates a first example of an embodiment where $N_1$ is equal to 1 and $N_2$ is equal to 2. In a second example of the same embodiment, $N_1$ is still equal to 1, but $N_2$ is a number greater that 2. In the second example, the control valve 616 is connected to $N_2$ reservoir conduits, such as conduits 540 and 550. In both examples, the second pump is connected to the control valve 616 with pump conduit 590, and to the second outlet 212 with outlet conduit 580.

An embodiment for a remote service panel 250 including controls for a dual-pump multiple reservoir evacuation system is shown in FIG. 15. It includes start 254 and stop 256 switches, a selector switch 252 and evacuation disconnect ports 251, 253 for the first pump 230 and second pump 228. A line 900 connected to the unfiltered side of the engine oil filter head may also be connected to a pressure-regulated air supply to purge the engine of used oil before adding replacement oil through the same port. On the same service panel sample ports 910, 912, 914 for the transmission, engine and hydraulic fluid reservoirs respectively may be mounted, as well as a remote ignition selector 918 and a remote ignition switch 916.

An embodiment of an electrical diagram for the panel of FIG. 15 is shown in FIG. 16. The pump motors 963 and 962 for the pumps 230 and 228, respectively, are connected to corresponding relay switches 958 and 959, respectively, and each relay switch is powered, for example, by a source of 12V or 24V DC current. The first and second motor relay switches 958, 959 are connected to the selector switch 252 and a normally closed emergency stop switch 256. Between each relay and the emergency stop switch 256, low flow sensors 280 and 281, respectively, intervene to stop the respective motor when a low flow condition is detected. The selector switch 252 is connected to a valve coil 966 and a normally open start switch 254. In FIG. 16, electrical wiring for the transmission reservoir is depicted in the selector switch 254, corresponding to contact points including the letter "T" designation. For clarity of disclosure, some wiring for the hydraulic and engine reservoirs, corresponding to contact points "H" and "E" of the selector switch 966, has been omitted.

FIG. 17 illustrates a hydraulic diagram for an embodiment of a dual-pump multiple reservoir evacuation system. The first and second pumps 230 and 228 evacuate fluid from each of the selected reservoirs to ports 312 and 212, which may be mounted on brackets 373 and 273, respectively, or to the connectors 251 and 253 on the control panel 250. The flow from each reservoir 505, 507 and 509 may be controlled in one-way direction by check valves downstream from each reservoir. Check valves 705, 707 and 709 are connected downstream from the engine reservoir 505, the hydraulic reservoir 507 and the transmission reservoir 509 respectively. Check valves 720 and 722 are also mounted on bypass pipes 711 and 712, respectively, bypassing the first pump 230 and the second pump 228, respectively. A control valve 216, controls flow to the transmission reservoir 509 and to the hydraulic reservoir 507, and is shown with default position to the hydraulic reservoir 507. The discharge from bracket couplings 212 and 312 or control panel connectors 251 and 253 may be coupled to a discharge container or to a conduit 315 mounted on a lube truck. In that case, evacuated fluid passes through properly valved line 360 around lube truck pump 160 and directly into reservoir 570. Alternatively, it will be appreciated that the pumps 230 and 228 may be bypassed by lines 574 and 576, respectively, and appropriate valving provided in order that evacuation suction may be provided by the pump 160 on the lube truck. That discharge may then pass directly to the lube truck reservoir 570 via, for example, a fixed line 372, a quick connection line 374, a flexible conduit, or another suitable fluid system configuration.

Figure 18:
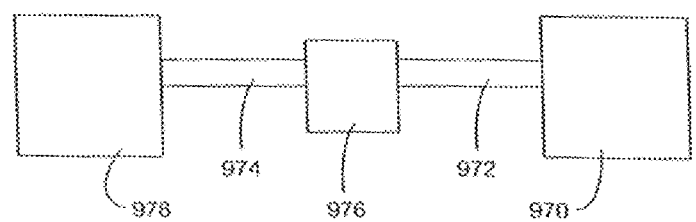
FIG. 18 is a schematic diagram showing one embodiment of a replacement fluid conduit system.
Figure 2D:
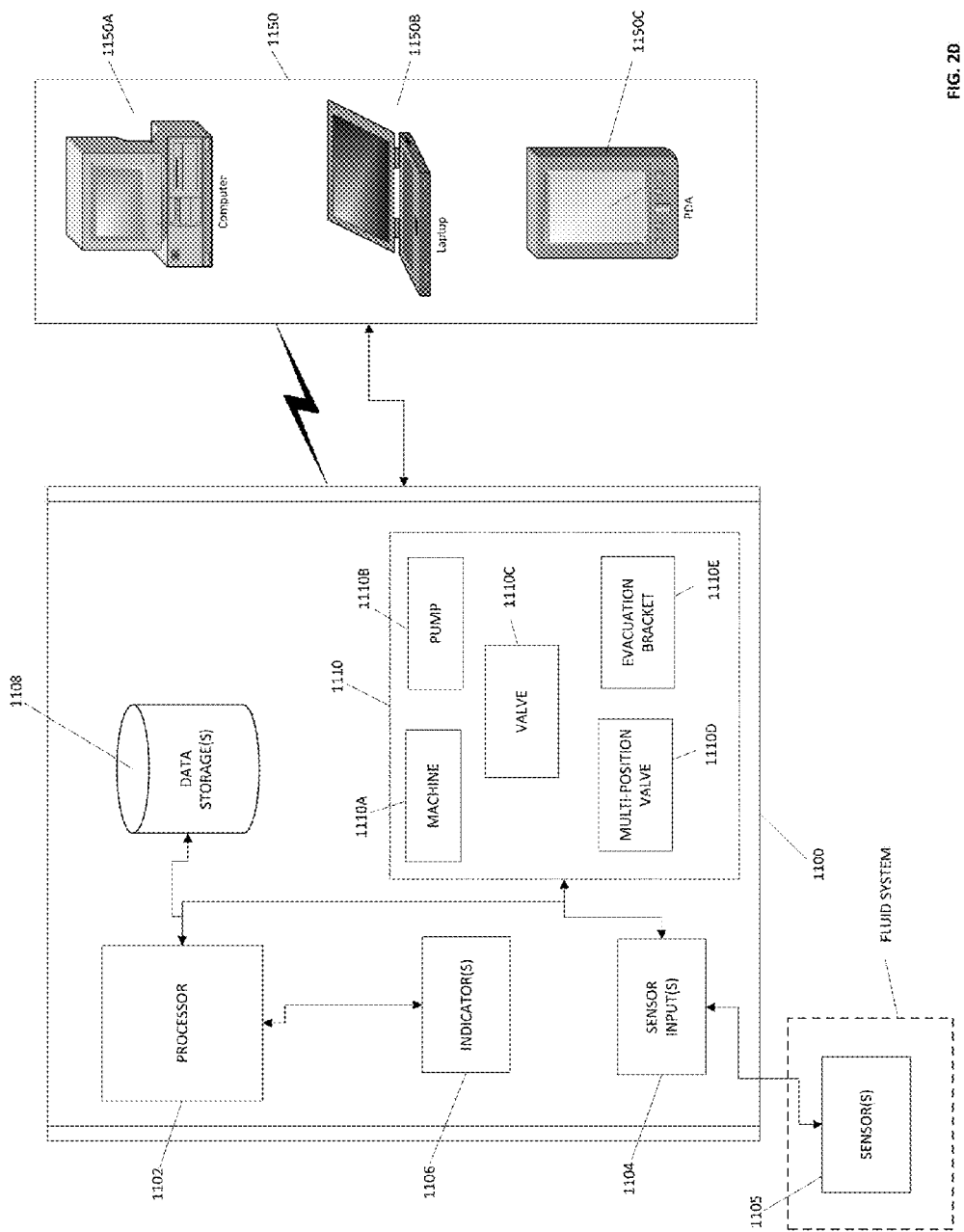

Either single-pump multiple reservoir system (as described in connection with FIGS. 8 through 12) or the dual-pump multiple reservoir systems (as described in connection with FIGS. 13 through 17) may be used to remove fluid from any of the reservoirs on a machine or vehicle, by attaching evacuation conduits to the reservoirs as shown in the respective figures, operating the control valve to select a reservoir and actuating the pump to pump fluid from the selected reservoir to an outlet port for discharge. Additionally, after draining a selected reservoir, replacement fluid may be admitted into the appropriate cavity as shown schematically in FIG. 18, by attaching to a conduit 972 connected to the unfiltered side of the fluid system (e.g., to the cavity's filter head 970), and a replacement fluid conduit 974, by means of a coupling 976. The coupling 976 is connected to a replacement fluid source 978. For example, engine oil can be input into line 44 in the embodiment in FIG. 10 or into line 900 in the embodiment in FIG. 15, in each case before the oil filter head. It can be appreciated that the fluid cavities corresponding to the other reservoirs discussed herein can also be refilled by inputting replacement fluid on the unfiltered side of the respective filters of such fluid cavities.

Referring now to FIG. 19, one embodiment of a fluid system 1001 including a machine (wherein the machine in this example embodiment is an engine 1002) connected to a pump 1004 is shown. In one aspect of this embodiment, the pump 1004 may be a supplemental pump or engine pre-lubrication pump, for example, and/or may be installed and operated at a local location or a remote location with respect to the position and operation of the engine 1002. The pump 1004 is configured for fluid communication and operation in association with an evacuation bracket 1006. Based on the mode of operation of the engine 1002, a fluid circuit may be completed or interrupted by a quick disconnect 1008. During a fluid evacuation procedure, for example, the evacuation bracket 1006 can be used, in association with the operation of the pump 1004, to evacuate various fluids from the engine 1002. In addition, in the embodiment of FIG. 19 and in various embodiments of the present systems and methods described herein, a control module 1100 can be operatively associated with various components of the fluid system 1001. Also, an internal data module 1200 can be operatively associated with the engine 1002 for receiving, storing and/or processing data related to functions performed within the fluid system 1001. In another aspect, a supplemental filter system 1010 may be operatively installed in association with the evacuation bracket 1006 and the quick disconnect 1008, for example. In various aspects of the present systems and methods, the supplemental filter system 1010 may be, for example, a fine filtration system as that term is understood in the art.

Referring now to FIG. 20, in one illustrative embodiment, the control module 1100 includes various components for controlling and monitoring a fluid system, as well as for monitoring, collecting and analyzing data associated with various fluid system and method embodiments described herein. The control module 1100 includes a processor 1102 for executing various commands within, and directing the function of, the various components of the control module 1100. One or more sensor inputs 1104 can be provided in the control module 1100 for receiving and processing data communicated from one or more sensors 1105 installed within a fluid system. Sensors 1105 applicable to operation of a machine can include, without limitation, sensors to detect temperature, sensors to detect pressure, sensors to detect voltage, sensors to detect current, sensors to detect contaminants, sensors to detect cycle time, flow sensors and/or other sensors suitable for detecting various conditions experienced by the machine during the various stages of operation of the machine. In addition, one or more indicators 1106 can be provided within the control module 1100 for providing alerts or notifications of conditions detected and communicated to the control module 1100. Such indicators 1106 can be conventional audio, visual, or audiovisual indications of a condition detected within a fluid system. The control module 1100 may also include one or more data storage media 1108 for storing, retrieving and/or reporting data communicated to the control module 1100. Data stored within the data storage media 1108 may include a variety of data collected from the condition of the fluid system including, for example and without limitation, oil condition, particle count of contaminants, cycle time data for time to evacuate or time to refill a given reservoir, fluid receptacle or other fluid storage/retention medium.

The control module 1100 further includes one or more controls 1110 for permitting manipulation of various elements of a fluid system and/or for receiving and processing data communicated from a fluid system. Machine controls 1110A can be provided for controlling various aspects of an engine, for example, such as ignition, pre-lubrication operations, initiating a fluid evacuation process, initiating a fluid refill process, and various other machine operations. Pump controls 1110B can be provided for controlling the action of a pump or supplemental pump operatively associated with a fluid system, such as the fluid system of a machine, for example. One or more valve controls 1110C can be provided to actuate the position (e.g., open, closed, or other position) of one or more valves included within a fluid system. In addition, one or more multi-position valve controls 1110D can be provided to operate a multi-way valve (e.g., a five-way valve), or another multi-position valve apparatus or system such as a junction block assembly, for example (described hereinafter). In addition, evacuation bracket controls 1110E can be provided for the particular function of one or more evacuation brackets included within, or introduced into, a fluid system.

It can be appreciated that any portion of the above-described controls 1110 may be manually actuated by a machine operator, for example, or automatically actuated as part of execution of instructions stored on a computer-readable medium, for example. In one illustrative example, the pump controls 1110B may be operatively associated automatically with manual actuation of the machine controls 1110A, such as in the event of a pre-lubrication process initiated during ignition of an engine, for example.

In addition, in various embodiments described herein, it can be appreciated that the controls 1110 need not be located within the same location such as included within the same service panel, for example, or other like centralized location. It can be further appreciated that the controls 1110 may be operatively associated with a machine, a fluid system, a valve system, or other component of the present embodiments by one or more wireline and/or wireless communication methods or systems. Thus, in various embodiments described herein, it can be seen that the controls 1110 may be considered clustered for a particular application of the present embodiments while not necessarily being physically located in a single, centralized location such as installed on a service panel, for example.

Data can be communicated to the control module 1100 to and/or from a fluid system through a variety of methods and systems. In various embodiments disclosed herein, data may be communicated, for example, by a wireline connection, communicated by satellite communications, cellular communications, infrared and/or communicated in accordance with a protocol such as IEEE 802.11, for example, or other wireless or radio frequency communication protocol among other similar types of communication methods and systems. As shown in FIG. 20, one or more data devices 1150 can be employed in operative association with the control module 1100 for the purpose of receiving, processing, inputting and/or storing data and/or for cooperating with the control module 1100 to control, monitor or otherwise manipulate one or more components included within a fluid system. Examples of data devices 1150 include, for example and without limitation, personal computers 1150A, laptops 1150B, and personal digital assistants (PDA's) 1150C, and other data devices suitable for executing instructions on one or more computer-readable media.

Various types of sensors 1105 can be employed in various embodiments of the present systems and methods to detect one or more conditions of a fluid system. For example, the sensors 1105 can detect one or more of the following conditions within a fluid system: engine oil pressure, oil temperature in the engine, amount of current drawn by a pre-lubrication circuit, presence of contaminants (such as oil contaminants, for example) in the engine, amount of time that has elapsed for performance of one or more cycles of various engine operations (i.e., cycle time) such as pre-lubrication operations, fluid evacuation operations, fluid refill operations, fluid flow rates, and others. One example of a sensor 1105 that may be used in accordance with various embodiments of the present systems and methods is a contamination sensor marketed under the "LUBRIGARD" trade designation (Lubrigard Limited, United Kingdom, North America, Europe). A contamination sensor can provide information regarding oxidation products, water, glycol, metallic wear particles, and/or other contaminants that may be present in the engine oil, hydraulic oil, gearbox oil, transmission oil, compressor oil and/or other fluids used in various machines. In various aspects of the present methods and systems, the contamination sensor may be employed during one or more fluid processes, for example, such as a fluid evacuation process or a fluid refill process.

It can be appreciated that the control module 1100 can receive and store data associated with activation and deactivation of various components of a fluid system and operation of a machine, such as an engine, for example, included within the fluid system. Cycle time, for example, can be calculated from analysis of collected data to provide an indication of elapsed time for completing evacuation and/or refill operations. For a given oil temperature or temperature range (e.g., as can be detected and communicated by a temperature sensor), an average cycle time, for example, can be calculated through analysis of two or more collected cycle times. In one aspect, the present methods and systems can determine whether the most recently elapsed cycle time deviates from a nominal average cycle time, or range of cycle times, for a given oil temperature or temperature range. In addition, factors may be known such as the type and viscosity of fluids (e.g., such as oil) used in connection with operation of the machine. An unacceptable deviation from a nominal cycle time, or range of times, can result in recording a fault in a data storage medium 1108 of the control module 1100. It can be appreciated that many other types of fault conditions may detected, analyzed and recorded in connection with practice of the present systems and methods. In other illustrative examples, conditions associated with battery voltage, current, and/or the presence of contaminants in the machine, for example, may be detected, analyzed, and one or more fault conditions recorded by the control module 1100.

Figure 21:
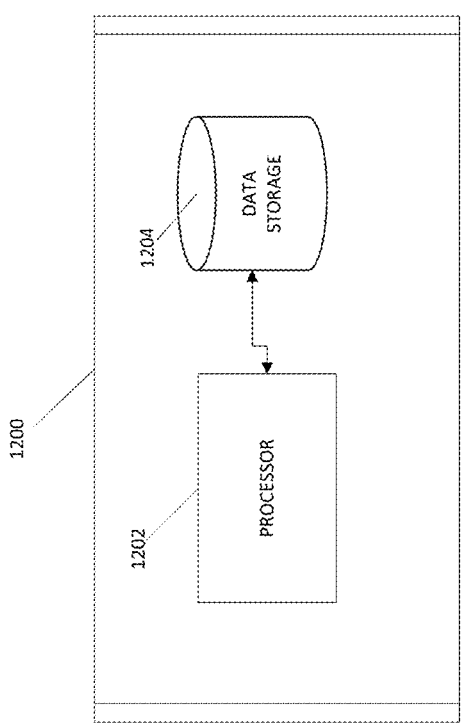
FIG. 21 includes a schematic diagram illustrating one embodiment of an internal data module configured for use in accordance with various embodiments of the present systems and methods.

Referring now to FIG. 21, in various embodiments of the present methods and systems, data collected from fluid system operation can be stored on an internal data module 1200 installed on or near a machine. The internal data module 1200 can include a processor 1202 with an operatively associated memory 1204. In one aspect, the internal data module 1200 can be a "one-shot" circuit, as that term is understood by those skilled in the art. The internal data module 1200 can be configured to receive and store data related to various conditions of a fluid system, a machine, a valve, a pump, or other components of a fluid system. In one embodiment, the internal data module 1200 can store data in the memory 1204 prior to engine ignition and then transfer the stored data to the control module 1100, for example, or another computer system, once engine ignition is initiated. In another embodiment, the internal data module 1200 can store condition data for subsequent download to the control module 1100 or another suitable computer system. In various embodiments, the internal data module 1200 can be configured for use in performing data collection and storage functions when the control module 1100 is not otherwise active (e.g., during various machine service operations). In this manner, the internal data module 1200 can be employed to store data corresponding to the electrical events associated with an oil change, for example, or another type of fluid evacuation or refill procedure and can transmit data related to the procedure to the control module 1100. In various embodiments, the internal data module 1200 can be a stand-alone, discrete module, or can be configured for full or partial integration into the operation of the control module 1100.

Collected and analyzed data, as well as recorded fault events, can be stored in association with the control module 1100, the internal data module 1200, and/or at a remote location. In various embodiments of the present methods and systems, the control module 1100 and/or the internal data module 1200 can be configured for operation as integral components of a machine or as remote components not installed locally on the machine. The collected and analyzed information can be stored in one or more of the data storage media 1108 of the control module 1100, or on another conventional storage suitable for use in connection with the control module 1100. The information can also be stored externally with respect to a machine and its components. As shown in FIG. 20, data can be transmitted wirelessly by a radio frequency communication or by a wireline connection from the control module 1100 to one or more data devices 1150. The personal digital assistant 1150C, for example, may be configured and employed as a computer system for receiving and processing data collected from the control module 1100 during fluid evacuation and fluid refill processes.

In one illustrative example, information related to an oil change event, such as the time duration of the oil change, for example, and other engine conditions can be recorded and processed in connection with operation of the control module 1100 and/or the internal data module 1200 and/or their operatively associated storage medium or media. The date and time of the oil change event, for example, can also be recorded for one or more such oil changes. Analysis of the data may assume that a substantially constant volume of oil at a given temperature evacuates from, or refills into, the engine lubrication system in a consistent and repeatable amount of time. A calculation can be made that considers the amount of time needed for an oil change at a given temperature (as detected by an oil temperature sensor, for example), and other factors such as the type and viscosity of the oil. Using this calculation, the amount of oil evacuated from, or refilled into, the engine can be calculated. While the example of an engine is employed herein, it can be appreciated that the principles of the present methods and systems described herein can be readily applied, for example, to hydraulic fluid reservoirs, transmission fluid reservoirs, and a variety of other types of fluid reservoirs. The calculated evacuated/refilled oil amount can be compared against a nominal value for the sump capacity. If the calculated amount is greater than or less than the nominal value or tolerance range for such calculations, this information can be recorded as a fault for further investigation and/or maintenance. In one embodiment, the fault recorded can be recorded electronically, such as in association with operation of the control module 1100. One or more notifications can be generated for an operator of the engine by use of the indicators 1106, for example, to advise the operator that a fault has been recorded by the system. In application to various embodiments described herein, the notification can take the form of an audible signal, a visual or text signal, or some reasonable combination of such signals.

Figure 22:
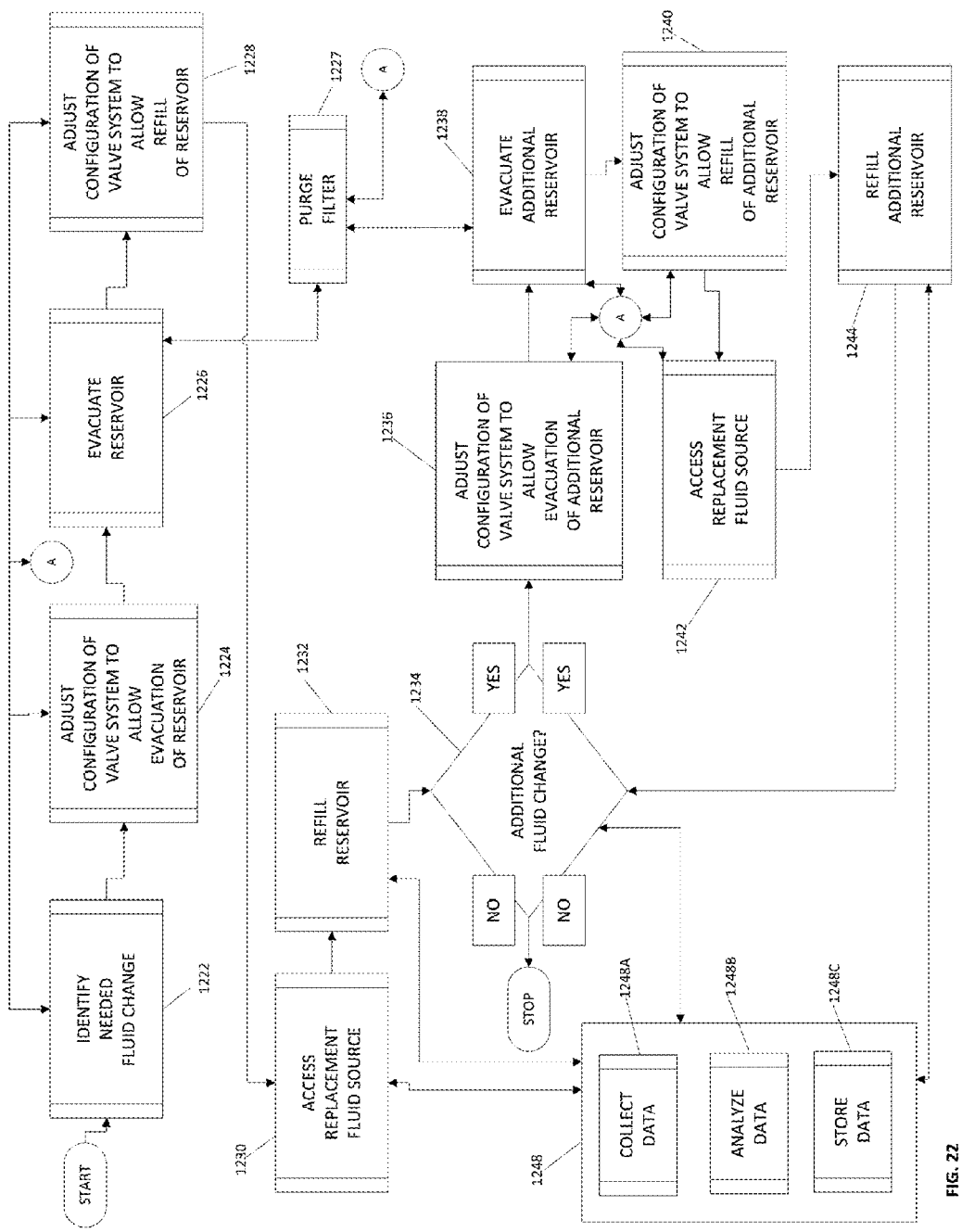
FIG. 22 includes a process flow diagram illustrating one method embodiment provided in accordance with the present systems and methods.

Referring now to FIG. 22, one embodiment of a method for performing multiple fluid evacuation and refill processes is shown. In step 1222, a need for a fluid change is identified, such as a fluid change in the fluid reservoir of a machine, for example. Identification of fluid change needs/desires and subsequent functions performed in the fluid system can be controlled in connection with a control module (in accordance with the above discussion). In step 1224, the configuration of a valve system included within a fluid system can be adjusted to permit a fluid evacuation process to be performed in operative association with the identified fluid reservoir. It can be appreciated that adjustments to configuration of the valve system performed in step 1224 can be facilitated in an automated manner such as by operative association of the fluid system with the control module 1100, for example, by a manual operator adjustment, or some reasonable combination of automated and manual processes. The identified fluid reservoir is evacuated in step 1226. In optional step 1227, which can be performed prior to the evacuation process of step 1226, a conventional purge procedure can be performed on a fluid system associated with the reservoir to remove waste fluids, to resist spillage of fluids, to resist environmental contamination potentially caused by waste fluids, and/or to promote safety of an operator, for example, or other personnel by resisting contact between waste fluids (and potentially harmful components of waste fluids) and the operator. In one aspect, the purge procedure of step 1227 can be performed prior to performance of a subsequent fluid refill process, for example, for the reservoir. In one illustrative embodiment, the purge procedure can include an air purge procedure, for example. In step 1228 the valve system can be configured to permit a fluid refill process to be performed in connection with the identified fluid reservoir. In step 1230, a fluid replacement source is accessed, and the identified fluid reservoir is refilled in step 1232. In one aspect of the present methods and systems, it can be appreciated that the refill procedure of step 1232 can be performed by delivering the refill fluid pre-filter with respect to the identified fluid reservoir.

In step 1234, a determination is made as to whether an additional fluid change process is required or desired. If it is determined that an additional reservoir does require a fluid change, then the valve system is configured in step 1236 to permit a fluid evacuation process to occur for the additionally identified reservoir, which additionally identified reservoir can include a fluid which is similar or dissimilar with respect to the fluid of the first identified reservoir. It can be appreciated that adjustments to the valve system performed in step 1236 can be facilitated in an automated manner such as by operative association of the fluid system with the control module 1100, for example, by a manual operator adjustment, or some reasonable combination of automated and manual processes. In step 1238, fluid within the additional reservoir is evacuated. In optional step 1227 (also described above), which can be performed prior to the evacuation process of step 1238, a conventional purge procedure can be performed on a fluid system associated with the reservoir to remove waste fluids, to resist spillage of fluids, to resist environmental contamination potentially caused by waste fluids, and/or to promote safety of an operator, for example, or other personnel by resisting contact between waste fluids (and potentially harmful components of waste fluids) and the operator. In one aspect, the purge procedure of step 1227 can be performed prior to performance of a subsequent fluid refill process, for example, for the reservoir. In step 1240, the valve system can be configured to permit a fluid refill process for the additional reservoir. In step 1242, a fluid replacement source is accessed, and the additional reservoir is refilled with fluid in step 1244 to the unfiltered side of the fluid system. In one aspect of the present methods and systems, it can be appreciated that the refill procedure of step 1244 can be performed by delivering the refill fluid pre-filter with respect to the additional reservoir. The process can then return to step 1234 to identify additional reservoirs for which fluid changes may be needed or desired. It can be seen that the method shown in FIG. 22 permits multiple fluids to be evacuated and/or refilled for multiple reservoirs associated with a machine, from potentially multiple fluid replacement sources or reservoirs, in an automated or substantially automated manner.

In various embodiments of the present methods and systems, data can be collected, stored and/or analyzed for multiple reservoirs connected with, or operatively associated with, a machine. Referring again to FIG. 22, a control module or other data device (as described hereinabove), for example, can be employed in step 1248 to collect data 1248A, store data 1248B, and/or analyze data 1248C in accordance with one or more of the process steps shown in FIG. 22, as well as other steps performed in connection with operation and/or maintenance functions of a machine. In one example aspect, it can be seen that the control module can be applied in step 1248 to collect and analyze time-stamp information associated with an event such as an evacuation/refill process performed in connection with an oil reservoir, for example. In other aspects of the present methods and systems, it can be appreciated that many types of data can be collected, analyzed, and/or stored in connection with the function of multiple reservoirs. Data such as current valve position, valve type, and/or reservoir type, for example, can be collected in connection with performance of an evacuation/refill procedure for a first reservoir. A further evacuation/refill procedure, or another process step, can then be initiated for the first reservoir or for an additionally identified reservoir. Likewise, data such as current valve position, valve type, reservoir type, for example, can be collected in association with the evacuation/refill procedure for the additionally identified reservoir, for example, or another process step.

Figure 23:
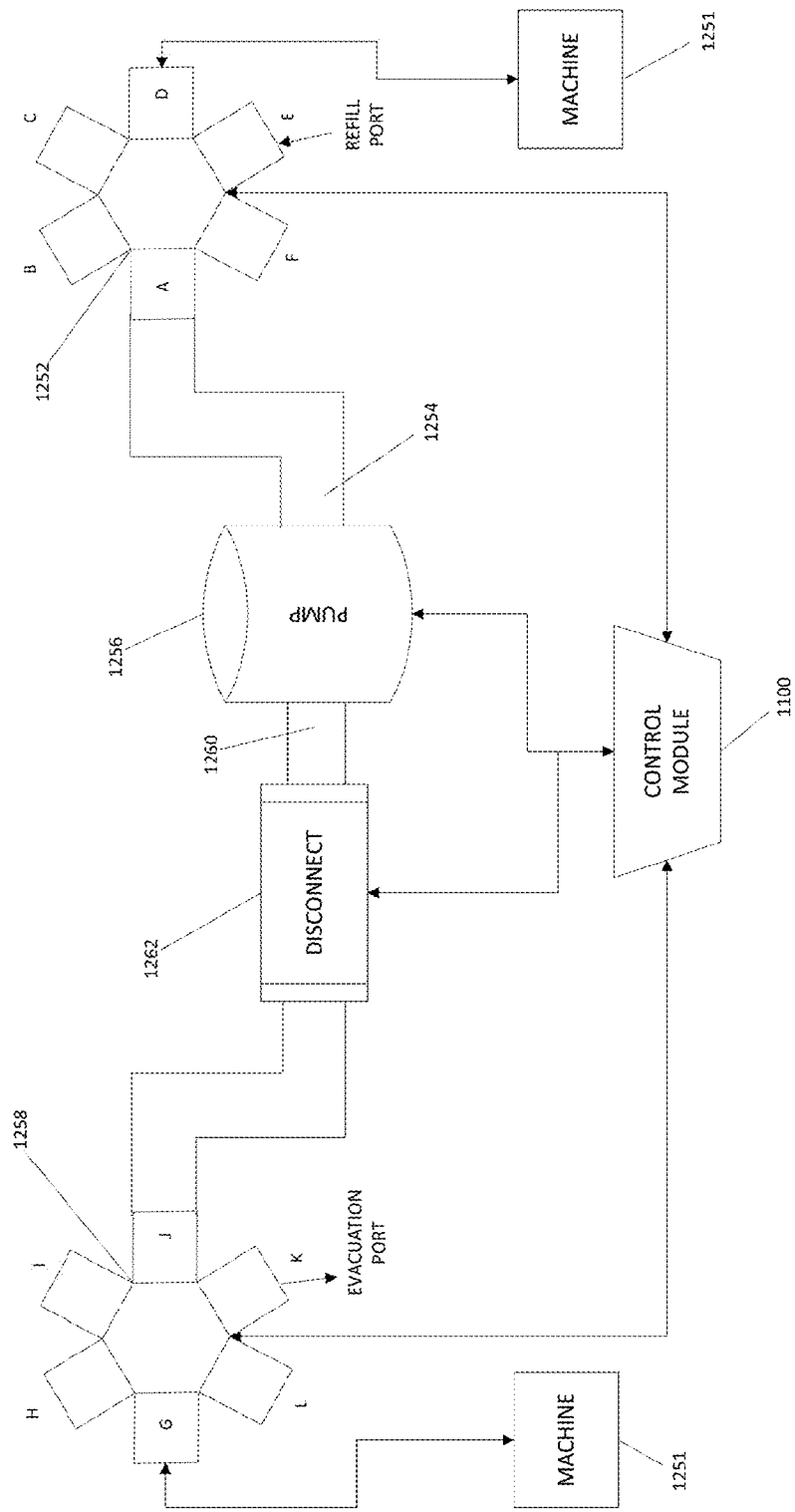
FIG. 23 includes a schematic diagram of one system embodiment provided in accordance with the present systems and methods.

Referring now to FIG. 23, one embodiment of a system for performing multiple fluid evacuation and fluid refill processes is shown in schematic form. A first junction block assembly 1252 having a plurality of ports (represented by positions A, B, C, D, E and F) is connected through conventional piping or hydraulic hoses, for example, to the suction side 1254 of a pump 1256. A second junction block assembly 1258 having a plurality of ports (represented by positions G, H, I, J, K and L) is also connected through conventional piping or hydraulic hoses, for example, to the pressure side 1260 of the pump 1256. In one aspect, the system may include a disconnect 1262, such as a quick disconnect and bracket assembly, for example, in the piping. In various aspects of the system, a control module 1100 can be operatively associated with various control, sensing, and monitoring functions performed in association with operation of the system. It can be appreciated that the junction block assemblies 1252,1258 are shown merely for purposes of illustration. One or both of the junction block assemblies 1252,1258 could be replaced with other multi-position valves, for example, or other suitable types of valves. It can be further appreciated that the system shown in FIG. 23 can be configured to perform multiple fluid refill and/or fluid evacuation processes in connection with one or more machine reservoirs, one or more fluid replacement sources, and/or one or more waste-receiving receptacles.

In one operational example of the valve system of FIG. 23 (which valve system includes the first and second junction block assemblies 1252,1258), ports D and G can be connected through piping to a machine 1251 such as a machine engine, for example. Port E can be configured to be a refill port that permits fluid to be introduced to the valve system such as from a fluid replacement source, for example. Port K can be configured as an evacuation port that permits fluid to be evacuated through the second junction block assembly 1258 from the machine 1251, which evacuation may be facilitated by a quick disconnect and bracket assembly, for example. Port A is in fluid communication with the pump 1256 on the suction side 1254 of the pump 1256, and Port J is in fluid communication with the pump 1256 on the pressure side 1260 of the pump 1256.

In a first configuration of the illustrative valve system of FIG. 23, all ports of the first junction block assembly 1252 are closed except for port A, which is in communication with the suction side 1254 of the pump 1256, and port D, which is in an open position and in communication with the machine 1251. In addition, all ports of the second junction block assembly 1258 are closed except for port J, which is in communication with the pressure side 1260 of the pump 1256, and port K, which is in an open position in this configuration. The pump 1256 can be activated to evacuate fluid from the machine 1251 as drawn through the piping and through port D, through port A, through the pump 1256, through port J, and ultimately through port K. Once the fluid evacuation process is completed, all ports of the first and second junction block assemblies 1252,1258 can be closed, except for the refill port E and ports A, J and G. The pump 1256 can be activated to draw fluid from port E through the piping and through port A, through the pump 1256, through port J, and through port G into the machine 1251. Based on this operational example, it can be seen how opening and closing various ports in various configurations of the valve system permits multiple evacuation and refill processes to be performed from multiple fluid replacement sources to multiple machine reservoirs in a variety of sequences. It can also be seen that a common evacuation point (e.g., port K) can be provided for various fluid processes that are performed by use of the valve system. In addition, it can be appreciated that different types of fluids (e.g., without limitation, engine oil, transmission fluid, hydraulic fluid, coolants, and other machine fluids) can be alternately and/or sequentially evacuated/refilled in connection with the various embodiments of the present methods and systems.

Various aspects of the following disclosure include operational examples for the various system and method embodiments described herein. It can be appreciated that such operational examples are provided merely for convenience of disclosure, and that no particular aspect or aspects of these operational examples are intended to limit the scope of application of the present systems and methods.

Referring now to FIGS. 24, 25A and 25B, a fluid system 1301 is provided including an engine 1302 and a pump 1304 operatively connected to a junction block assembly 1400. As shown in FIGS. 25A and 25B, the junction block assembly 1400 includes a substantially cube-shaped body 1402 having a plurality of ports, such as ports 1404A, 1404B, 1404C, for example, formed therein. The junction block assembly 1400 can include any conventional material suitable for use in connection with the various fluid evacuation and refill processes described herein such as, for example and without limitation, aluminum, stainless steel, and other like materials. In the embodiment shown, the junction block assembly 1400 may possess a plurality of ports up to six ports, for example.

In one embodiment of the junction block assembly 1400, one or more screens 1406 may be inserted between the body 1402 and one or more adapter fittings 1408 structured to be received, such as threadedly received, for example, into the junction block assembly 1400. It can be appreciated that one or more of the screens 1406 can be positioned within the junction block assembly 1400 and/or more generally at any suitable location within the fluid systems described herein. In one embodiment, one or more of the screens 1406 may be formed as an integral assembly with one or more of the adapter fittings 1408. In one aspect of such an integral arrangement, the screen 1406 can be positioned at a common location at which particles and other contaminants present in a fluid system may be trapped, inspected and/or removed from the fluid system. In other aspects, the screens 1406 and/or adapter fittings 1408 may be installed in conjunction with other components of a fluid system such as a pump, for example.

In one illustrative fluid system embodiment, the screen 1406 can be positioned in the junction block assembly 1400 at a common outlet port of the junction block assembly 1400, wherein during operation of the fluid system the common outlet port is in fluid communication with the suction side or inlet port of a pump. In this embodiment, one or more fluids received into the junction block assembly 1400 from one or more fluid reservoirs can each be filtered by the screen 1406 positioned within the common outlet port of the junction block assembly 1400.

In one aspect of the present embodiments, the adapter fitting 1408 can include a permanent or removably insertable plug that resists fluid from entering or exiting the particular port of the junction block assembly 1400 in which the adapter fitting 1408 is installed. In another aspect, the adapter fitting can include a magnetic plug, for example, to attract and capture ferrous materials, for example, and other particles or contaminants susceptible to magnetic attraction to the magnetic plug. It can be seen that, in a fluid system, a junction block assembly 1400 including an adapter fitting 1408 having a magnetic plug can be employed as a central or common location at which particles or contaminants present in the fluid system can be trapped, collected, inspected and/or analyzed. In one embodiment in which the magnetic plug is removably insertable from the junction block assembly, the magnetic plug can assist the junction block assembly 1400 in becoming a material/debris trap that allows for periodic inspections, for example, for detecting metal particles, for example, that may indicate damage, or the potential for damage, occurring in the reservoir or a related machine system.

Figure 25C:
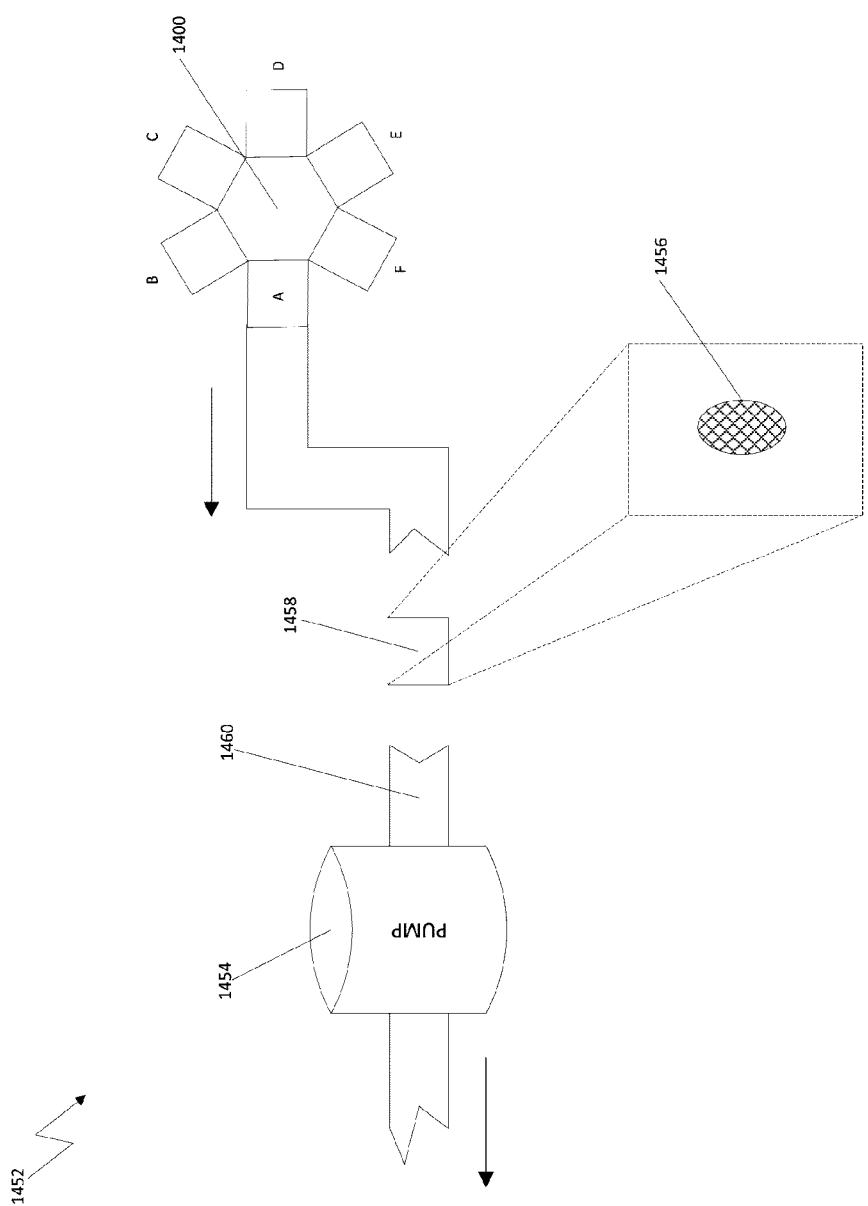
FIG. 25C includes a schematic diagram illustrating one embodiment of a fluid system including a junction block assembly, a screen and a pump installed within the fluid system.

Referring now to FIG. 25C, one example illustration of an embodiment a portion of a fluid system 1452 provided in accordance with the present methods and systems is shown. The fluid system 1452 includes a pump 1454 in fluid communication with a junction block assembly 1400. In addition, a screen 1456 is positioned within a section of piping 1458 located between the pump 1454 and the junction block assembly 1400 on a suction side 1460 of the pump 1454. In other aspects, it can be appreciated that the screen 1456 can be positioned to function at a variety of locations within the fluid system 1452 or other fluid systems. In the embodiment shown, it can be seen that the screen 1456 may act as a common location for collecting, trapping, and/or filtering particles, debris and/or contaminants flowing through the fluid system 1452. During operation of the pump 1454 within the filter system 1452, for example, particles, debris and/or contaminants are drawn from various other portions (not shown) of the fluid system 1452 through the section of piping 1458 including the screen 1456 to trap, collect, and/or filter those particles, debris, and/or contaminants, before fluid is permitted to flow to the suction side 1460 of the pump 1454 to be drawn into the pump 1454.

Referring again to FIG. 24, the junction block assembly 1400 can be connected to a fluid evacuation/refill port 1306 that permits fluids to exit (during a fluid evacuation process) or enter (during a fluid refill process) the fluid system 1301. During an evacuation process, valve 1308 is actuated (such as by operation of a machine control 1110A of the control module 1100, for example, or by manual operation) to a closed position, and the pump 1304 is activated to evacuate fluid from the engine 1302 through the port 1306 connected to the junction block assembly 1400. It can be seen that the junction block assembly 1400 is appropriately positioned/actuated to permit fluid to flow from the pump 1304 to the port 1306 during the evacuation procedure. During a refill procedure, the valve 1308 can be moved to an open position, and the junction block assembly 1400 can be appropriately positioned/actuated to permit fluid to flow from a reservoir and/or other apparatus (not shown) attached to the port 1306 to refill one or more fluid reservoirs via unfiltered or pre-filtered passages, for example, or other receptacles of the engine 1302.

In various embodiments described herein, a conventional filter 1310 can be provided in association with a component such as an engine, for example, to filter contaminants or other particles that pass through the fluid system 1301 during the refill procedure and/or during normal operation of the engine 1302. It can be appreciated that the type and/or configuration of conventional filters installed within or in association with the components of the fluid system 1301 can be provided in a variety of ways as will be evident to those skilled in the art.

The control module 1100 and the internal data module 1200 interact with the fluid system 1301, and more generally other fluid systems described hereinafter, as previously discussed hereinabove with reference to FIGS. 20 and 21. For convenience of disclosure, specific interaction and operation of the control module 1100 and the internal data module 1200 with fluid system embodiments described hereinafter are generally not described in detail, because such embodiments would be understood by those skilled in the art.

Referring now to FIG. 26, in another embodiment of the present systems and methods, a fluid system 1501 is provided in which an engine 1502 is connected to a junction block assembly 1400 through a valve 1504. A reservoir 1506 is also connected to the junction block assembly 1400 through a valve 1508. In addition, a pump 1510 is connected to the junction block assembly 1400, and the pump 1510 is also connected to an evacuation bracket and quick disconnect assembly 1512 in accordance with such assemblies as previously described hereinabove. In one operational example of this embodiment, a fluid evacuation process may be performed by opening valve 1504 and closing valve 1508 to evacuate fluid from the engine 1502 through an evacuation port of the junction block assembly 1400. In one aspect, the fluid evacuation procedure can be performed by the operation of the pump 1510 to remove fluid from the engine 1502 through the evacuation bracket and quick disconnect assembly 1512. The engine 1502 can then be refilled by connecting a fluid replacement source, for example, or another reservoir to the evacuation bracket and quick disconnect assembly 1512. The reservoir 1506 can be evacuated by closing the valve 1504, opening the valve 1508, adjusting the positions of the various ports of the junction block assembly 1400, and operating the pump 1510 to evacuate fluid from the reservoir 1506 through the evacuation bracket and quick disconnect assembly 1512. In various embodiments of the present systems and methods, the reservoir 1506 may contain, for example and without limitation, transmission fluid, hydraulic fluid, lubricants such as oil, water, or another fluid used in addition to the operation of the engine 1502 and/or the overall function of the fluid system 1501. In another aspect, a supplemental filter system 1514 may be operatively associated with the evacuation bracket and quick disconnect assembly 1512. In various aspects, the supplemental filter system 1514 may be, for example, a fine filtration system as that term is understood in the art.

Referring now to FIG. 27, in various embodiments of the present systems and methods, a fluid system 1601 is provided in which an engine 1602 is connected to a first junction block assembly 1400 through a valve 1604. A reservoir 1606 is also connected to the junction block assembly 1400 through a valve 1608. The junction block assembly 1400 also includes an evacuation/refill port 1610 structured for receiving fluids introduced into the fluid system 1601, such as during a refill process, for example. In addition, a pump 1612 is connected to the first junction block assembly 1400, and the pump 1612 is also connected to a second junction block assembly 1400' through an optional valve 1614. The second junction block assembly 1400' includes an evacuation/refill port 1616 for removing/introducing fluids into the fluid system 1601, such as by an evacuation process or by a refill process, for example. In addition, the reservoir 1606 includes a fluid connection through a valve 1618 to the second junction block assembly 1400', and the engine 1602 also includes a fluid connection to the second junction block assembly 1400' through a valve 1620. It can be appreciated by those skilled in the art that the fluid system 1601 permits a variety of combinations for performing evacuation and/or refill processes. The positions of the valves 1604,1608,1614,1618 and 1620, in operative interaction with the actuation of the first and second junction block assemblies 1400,1400' provide this variety of combinations for introducing or removing fluids, respectively and where applicable, through the ports 1610,1616.

In one aspect of an example of a fluid evacuation process, the engine 1602 can be identified for performance of one or more fluid refill/evacuation processes. Fluid can be evacuated from the engine 1602, for example, by opening valves 1604,1614, closing valves 1608,1618,1620, adjusting the positions of ports associated with the first and second junction block assemblies 1400,1400' (e.g., closing off ports not employed in a given fluid process, and other like adjustments), and activating the pump 1612 to draw fluid through the refill/evacuation port 1616. A subsequent refill process can be performed for the engine 1602 by closing valves 1604,1608,1618, opening valves 1614,1620, adjusting the appropriate positions of the ports of the first and second junction block assemblies 1400,1400' (e.g., closing off ports not employed in a given fluid process, and other like adjustments), and activating the pump 1612 to refill fluid into the engine 1602 by drawing the fluid from the evacuation/refill port 1610, through the pump 1612, to the engine 1602. It can be appreciated that the fluid employed for the fluid refill process for the engine 1602 can be drawn from one or more fluid replacement sources (not shown) operatively connected to the evacuation/refill port 1610 of the first junction block assembly 1400. In one aspect, the type of fluid drawn from the engine 1602 during the fluid evacuation process is of the same type as the fluid refilled into the engine 1602 during the fluid refill process.

In other steps of this operational example, the reservoir 1606 can be identified for a fluid evacuation/refill process. The valves 1604,1618,1620 can be closed, the positions of the ports of the first and second junction block assemblies 1400,1400' can be adjusted (e.g., closing off ports not employed in a given fluid process, and other like adjustments), valves 1608,1614 can be opened, and the action of the pump 1612 can be employed to draw fluid from the reservoir 1606 through the evacuation/refill port 1616 of the second junction block assembly 1400'. In a subsequent fluid refill process, valves 1604,1608,1620 can be closed, valves 1614,1618 can be opened, and the pump 1612 can be employed to draw fluid through the evacuation/refill port 1610 of the first junction block assembly 1400 into the reservoir 1606 in the refill process. It can be appreciated that the fluid employed in the fluid refill process can be drawn from one or more fluid replacement sources (not shown) operatively associated with the evacuation/refill port 1610 of the first junction block assembly 1400. In one aspect, the type of fluid drawn from the reservoir 1606 during the fluid evacuation process is of the same type as the fluid refilled into the reservoir 1606 during the fluid refill process. In various embodiments of the present systems and methods, the reservoir 1606 may contain, for example and without limitation, transmission fluid, hydraulic fluid, lubricants such as oil, water, or another fluid used in addition to the operation of the engine 1602 and/or the overall function of the fluid system 1601.

It can be appreciated that pumps employed in connection with the various fluid systems described herein can be "on-board" or "off-board" with respect to a machine that operates in connection with the fluid system. For example, in one illustrative embodiment, an "off-board" pump could be applied in connection with the evacuation/refill port 1610 with the appropriate configuration of the valve system of the fluid system of FIG. 27 to perform one or more fluid evacuation/refill processes.

Referring now to FIG. 28, in various embodiments of the present systems and methods, a fluid system 1701 is provided in which an engine 1702 is connected to both a first multi-position valve 1704 and a second multi-position valve 1706. One or more reservoirs 1708,1709 are also fluidically connected to each of the first and second multi-position valves 1704,1706. In addition, a pump 1710 is provided to facilitate one or more evacuation processes in connection with fluids contained with the engine 1702 and/or the reservoirs 1708,1709. In various embodiments of the present systems and methods, the reservoirs 1708,1709 may contain, for example and without limitation, transmission fluid, hydraulic fluid, lubricants such as oil, water, or another fluid used in addition to the operation of the engine 1702 and/or the overall function of the fluid system 1701. In one aspect of the operation of the fluid system 1701, each of the multi-position valves 1704,1706 is actuated/positioned to permit the action of the pump 1710 to evacuate and refill fluids from the engine 1702 and the reservoirs 1708,1709, in a sequence determined by an operator, for example, or by an automated determination by the control module 1100, for example.

In one aspect of an operational example, the engine 1702 can be identified for performance of one or more fluid evacuation/refill processes. In a fluid evacuation process, appropriate ports of the multi-position valves 1704,1706 are actuated, in conjunction with activation of the pump 1710, to draw fluid from the engine 1702 through the multi-position valve 1704, through the pump 1710, and through a selected port of the multi-position valve 1706 serving as an evacuation port. It can be appreciated that a waste-receiving receptacle, for example (not shown), may be operatively associated with the selected evacuation port of the multi-position valve 1706 to receive and/or store fluid evacuated from the engine 1702. In a subsequent fluid refill process, appropriate ports of the multi-position valves 1704,1706 are actuated, in conjunction with activation of the pump 1710, to draw fluid from a selected port of the multi-position valve 1704 serving as a refill port, through the pump 1710, through the multi-position valve 1706, and to the engine 1702. It can be appreciated that a fluid replacement source, for example (not shown), may be operatively associated with the selected refill port of the multi-position valve 1704 to provide a source for fluid introduced into the fluid system 1701 and used for the refill process for the engine 1702.

In another aspect of this operational example, the reservoir 1708 can be identified for performance of one or more fluid refill/evacuation processes. In a fluid evacuation process, appropriate ports of the multi-position valves 1704,1706 are actuated, in conjunction with activation of the pump 1710, to draw fluid from the reservoir 1708 through the multi-position valve 1704, through the pump 1710, and through a selected port of the multi-position valve 1706 serving as an evacuation port. It can be appreciated that a waste-receiving receptacle, for example (not shown), may be operatively associated with the selected evacuation port of the multi-position valve 1706 to receive and/or store fluid evacuated from the reservoir 1708. In a subsequent fluid refill process, appropriate ports of the multi-position valves 1704,1706 are actuated, in conjunction with activation of the pump 1710, to draw fluid from a selected port of the multi-position valve 1704 serving as a refill port, through the pump 1710, through the multi-position valve 1706, and to the reservoir 1708. It can be appreciated that a fluid replacement source, for example (not shown), may be operatively associated with the selected refill port of the multi-position valve 1704 to provide a source for fluid introduced into the fluid system 1701 and used for the refill process for the reservoir 1708.

In another aspect of this operational example, the reservoir 1709 can be identified for performance of one or more fluid refill/evacuation processes. In a fluid evacuation process, appropriate ports of the multi-position valves 1704, 1706 are actuated, in conjunction with activation of the pump 1710, to draw fluid from the reservoir 1709 through the multi-position valve 1704, through the pump 1710, and through a selected port of the multi-position valve 1706 serving as an evacuation port. It can be appreciated that a waste-receiving receptacle, for example (not shown), may be operatively associated with the selected evacuation port of the multi-position valve 1706 to receive and/or store fluid evacuated from the reservoir 1709. In a subsequent fluid refill process, appropriate ports of the multi-position valves 1704,1706 are actuated, in conjunction with activation of the pump 1710, to draw fluid from a selected port of the multi-position valve 1704 serving as a refill port, through the pump 1710, through the multi-position valve 1706, and to the reservoir 1709. It can be appreciated that a fluid replacement source, for example (not shown), may be operatively associated with the selected refill port of the multi-position valve 1704 to provide a source for fluid introduced into the fluid system 1701 and used for the refill process for the reservoir 1709.

It is readily apparent to those skilled in the art that, in accordance with various aspects of the present method and system embodiments, engines, reservoirs and other like receptacles can be first evacuated and subsequently refilled in a manner that permits a pump not to encounter a refill fluid (e.g., a "clean" fluid) of a certain type, until the pump has processed an evacuated fluid (e.g., a "dirty" fluid) of the same type as the refill fluid. It can be seen that this sequence of fluid evacuation/refill processes can reduce the degree of cross-contamination for components or other elements of a fluid system that may be caused by a mixture of different types of fluids.

Figure 29:
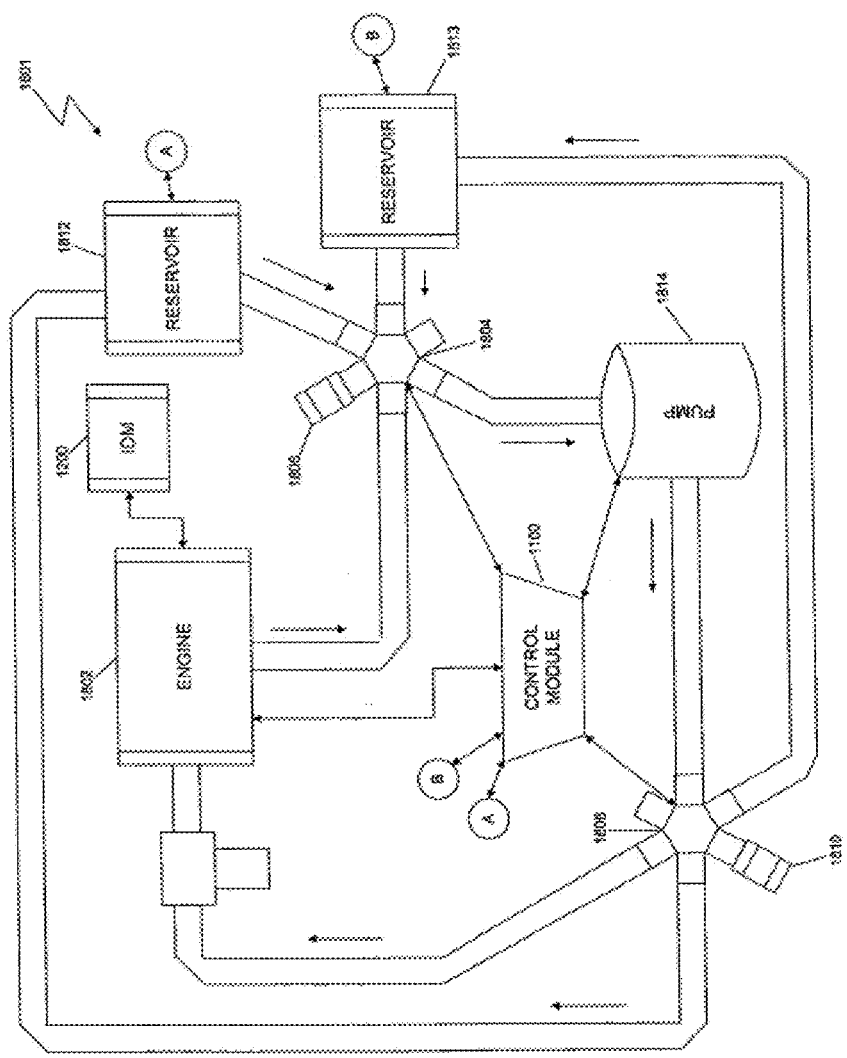
FIG. 29 includes a schematic diagram illustrating one embodiment of a fluid system configured for performing one or more fluid processes in accordance with the present systems and methods.

Referring now to FIG. 29, in various embodiments of the present systems and methods, a fluid system 1801 is provided in which an engine 1802 is connected to both a first multi-position valve 1804 having a refill port 1806 and a second multi-position valve 1808 having an evacuation port 1810. A reservoir 1812 is also fluidly connected to each of the first and second multi-position valves 1804,1808. In addition, a pump 1814 is provided to facilitate one or more evacuation and/or refill processes in connection with fluids contained with the engine 1802 and/or the reservoir 1812. In another aspect, an additional reservoir 1813 is connected between the first multi-position valve 1804 and the second multi-position valve 1806. In various embodiments of the present systems and methods, the reservoirs 1812,1813 may contain, for example and without limitation, transmission fluid, hydraulic fluid, lubricants such as oil, water, or another fluid used in addition to the operation of the engine 1802 and/or the overall function of the fluid system 1801.

In one example aspect of the operation of the fluid system 1801 shown in FIG. 29, the multi-position valves 1804,1808 are actuated/positioned to permit the action of the pump 1814 to remove fluid from the reservoir 1812. Then, in this operational example, the multi-position valves 1804,1808 can be actuated/positioned to perform a fluid refill process for the reservoir 1812. Thereafter, the engine 1802 can be evacuated and then refilled in sequence once the fluid processes involving the reservoir 1812 have been completed.

In accordance with previous discussion hereinabove, it can be appreciated that the operative association of the fluid system 1801, for example, with the control module 1100 permits a variety of sequences and combinations of evacuation and refill processes. Such sequencing can be facilitated by the control module 1100 through a combination of manual and/or automated processes executed in conjunction with the operation of the control module 1100. It can be seen that such sequencing of evacuation and/or refill operations can be applied to various previously discussed embodiments of the present systems and methods, as well as embodiments discussed hereinafter.

Figure 30:
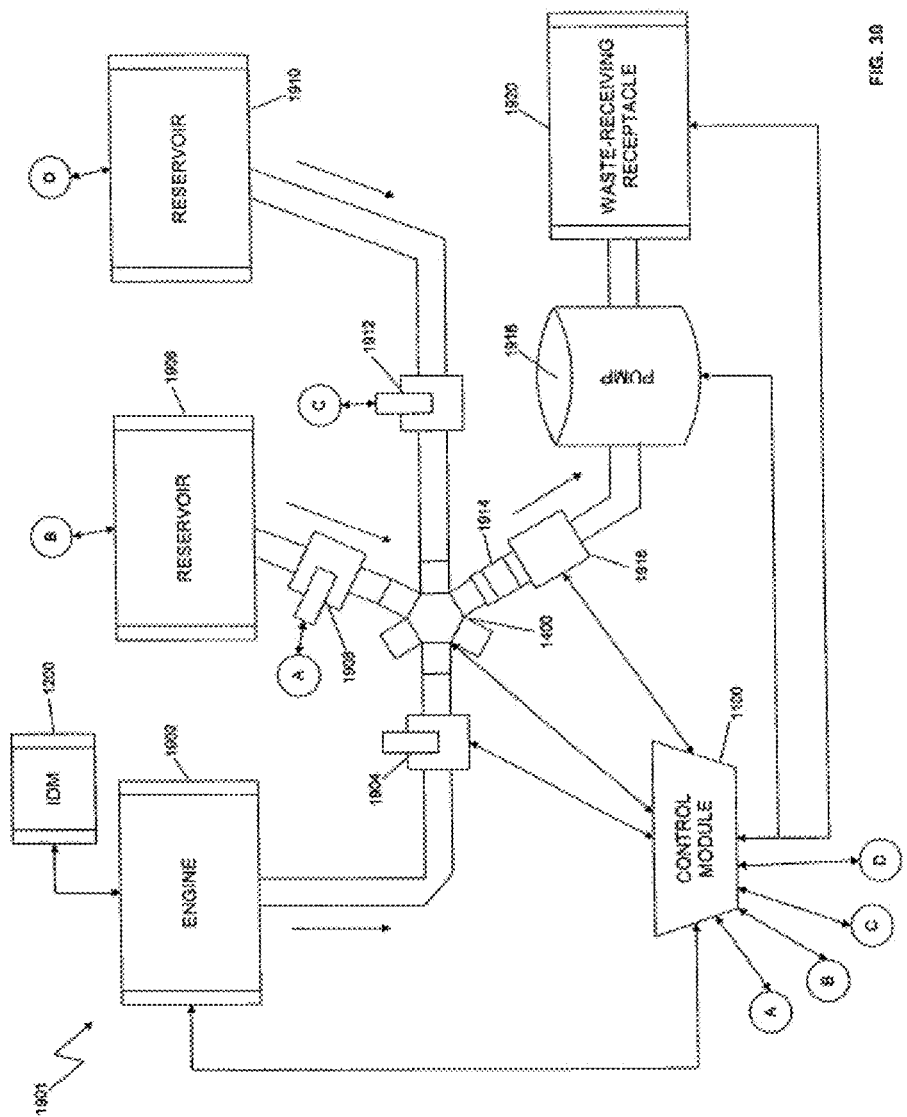
FIG. 30 includes a schematic diagram illustrating one embodiment of a fluid system configured for performing one or more fluid processes in accordance with the present systems and methods.

Referring now to FIG. 30, in various embodiments of the present systems and methods, a fluid system 1901 is provided in which an engine 1902 is connected to a junction block assembly 1400 through a valve 1904. A first reservoir 1906 is also connected to the junction block assembly 1400 through a valve 1908. In addition, a second reservoir 1910 is connected to the junction block assembly 1400 through a valve 1912. The junction block assembly 1400 includes an evacuation port 1914 structured to fluidically connect with a quick disconnect 1916. In operation of the fluid system 1901, the quick disconnect 1916 establishes fluid connection between the junction block assembly 1400 and a pump 1918. In addition, a waste-receiving receptacle 1920 is connected to the pump 1918. In an example fluid evacuation process, the respective positions of the valves 1904,1908,1912, the actuation/position of the junction block assembly 1400, the connection of the quick disconnect 1916 to the evacuation port 1914, and the operation of the pump 1918 work in conjunction to perform a fluid evacuation process for each of the engine 1902 and the first and second reservoirs 1906, 1910. For example, it can be seen that such a fluid evacuation process results in fluid flowing from the engine 1902 into the waste-receiving receptacle 1920. It can be appreciated that the functions of the control module 1100, working in association with the various components of the fluid system 1901, can result in evacuating fluids, and subsequently refilling fluids, for one or more of the engine 1902 and the reservoirs 1906,1910 in a sequential manner. In various embodiments of the present systems and methods, the reservoirs 1906,1910 may contain, for example and without limitation, transmission fluid, hydraulic fluid, lubricants such as oil, water, or another fluid used in addition to the operation of the engine 1902 and/or the overall function of the fluid system 1901.

Figure 31:
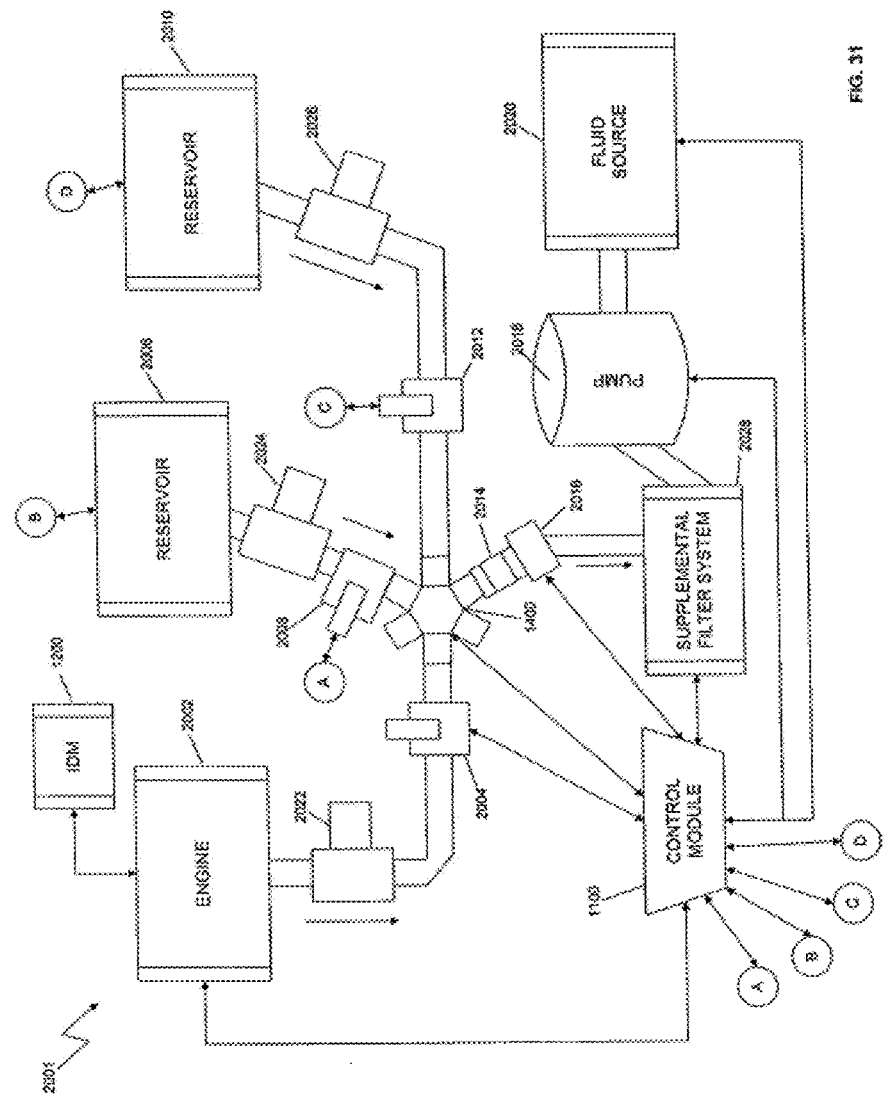
FIG. 31 includes a schematic diagram illustrating one embodiment of a fluid system configured for performing one or more fluid processes in accordance with the present systems and methods.

Referring now to FIG. 31, in various embodiments of the present systems and methods, a fluid system 2001 is provided in which an engine 2002 is connected to a junction block assembly 1400 through a valve 2004. A first reservoir 2006 is also connected to the junction block assembly 1400 through a valve 2008. In addition, a second reservoir 2010 is connected to the junction block assembly 1400 through a valve 2012. The junction block assembly 1400 includes a refill port 2014 structured to fluidly connect with a quick disconnect 2016. In operation of the fluid system 2001, the quick disconnect 2016 establishes fluid connection between the junction block assembly 1400 and a pump 2018. In addition, a fluid source 2020 is connected to the pump 2018. In one aspect of the present embodiment, the fluid source may be detachably connected to the pump 2018 so that subsequent fluid sources (not shown) containing a variety of fluids can be introduced to the fluid system 2001 through the action of the pump 2018. In an example fluid refill process, the respective positions of the valves 2004,2008,2012, the actuation/position of the junction block assembly 1400, the connection of the quick disconnect 2016 to the refill port 2014, and the operation of the pump 2018 work in conjunction to perform various fluid refill processes for the engine 2002 and the first and second reservoirs 2006,2010. In one example, it can be seen that such a fluid refill process can result in fluid flowing into the engine 2002 (after a prior fluid evacuation process) from the fluid source 2020. It can be appreciated that the functions of the control module 1100, working in association with the various components of the fluid system 2001, can result in evacuating/refilling one or more of the engine 2002 and the reservoirs 2006,2010 in a sequential manner. As shown, filters 2022,2024,2026 may be employed to filter contaminants or other particles present in fluid flowing from the fluid source 2020 to the engine 2002, the first reservoir 2006, or the second reservoir 2010 (respectively). In various embodiments of the present systems and methods, the reservoirs 2006,2010 may contain, for example and without limitation, transmission fluid, hydraulic fluid, lubricants such as oil, water, or another fluid used in addition to the operation of the engine 2002 and/or the overall function of the fluid system 2001. In addition, in another aspect, supplemental filter system 2028 can be installed between the refill port 2014 and the pump 2018. In various aspects of the present systems and methods, the supplemental filter system 2028 may be, for example, a fine filtration system, as that term is understood in the art.

Figure 32:
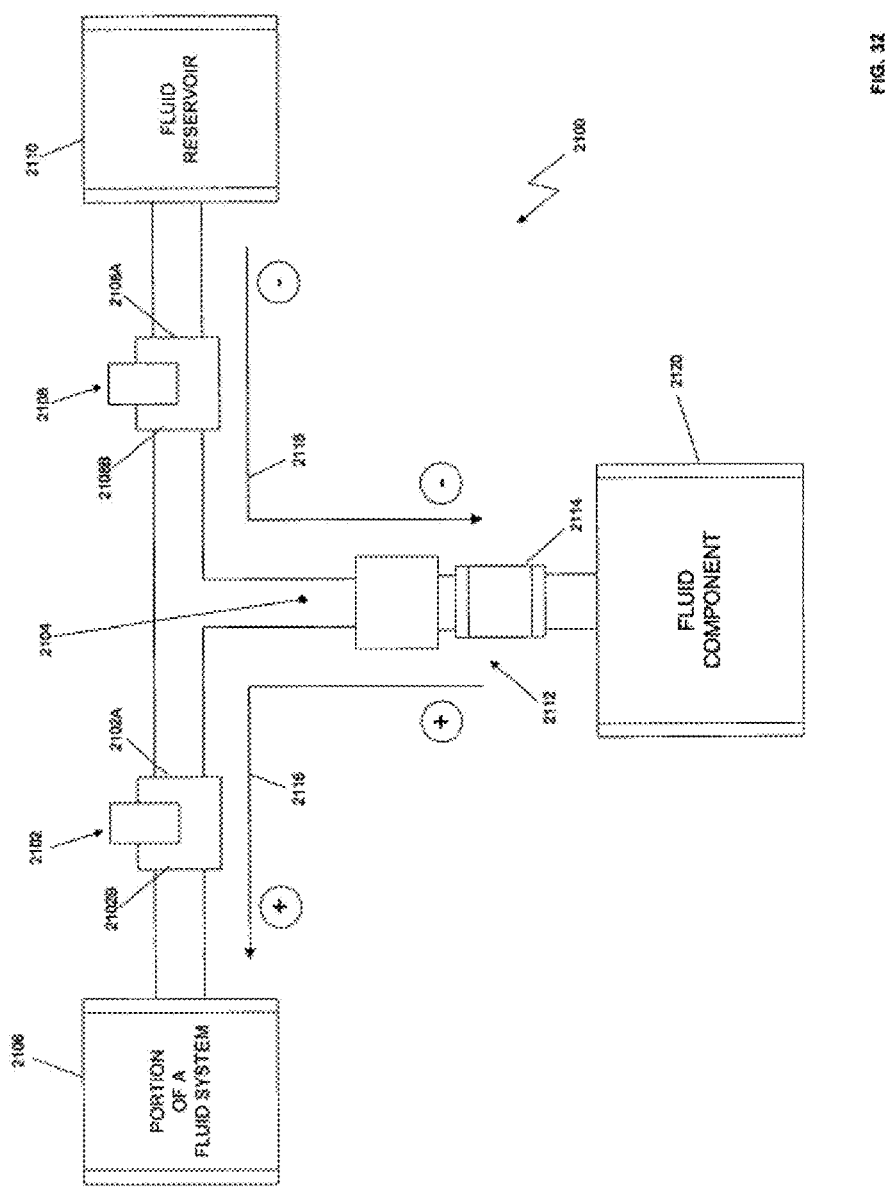
FIG. 32 includes a schematic representation of a valve assembly structured in accordance with embodiments of the present systems and methods.

Referring now to FIG. 32, in various embodiments of the present invention, a check valve assembly 2100 is provided in accordance with various systems and methods. The assembly 2100 includes a first check valve 2102 having an inlet 2102A in fluid communication with a common refill/evacuation location 2104 and an outlet 2102B in fluid communication with a portion of a fluid system 2106. A second check valve 2108 of the assembly 2100 includes an inlet 2108A in communication with a fluid reservoir 2110, for example, or another similar structure included within a fluid system. The second check valve 2108 further includes an outlet 2108B in fluid communication with the common refill/evacuation location 2104. In addition, an inlet/outlet port 2112 may be structured for fluid communication with the common refill/evacuation location 2104.

In various embodiments, the portion of a fluid system 2106 may include any reasonable combination of valves, pipes, reservoirs and/or other fluidic structures. In certain embodiments, the portion of a fluid system 2106 may be configured to include an operative association with at least a pre-filter portion of the fluid system. In various embodiments, the fluid reservoir 2110 may contain a quantity of a fluid such as oil, transmission fluid, hydraulic fluid, or another type of fluid described hereinabove and/or any other fluid suitable for use in accordance with the present systems and methods. In certain embodiments, a quick disconnect 2114 or other similar type of coupling may be operatively associated with the inlet/outlet port 2112 to permit operative association of various fluidic structures such as an external pump, for example, with the inlet/outlet port 2112. In various embodiments, the inlet/outlet port 2112 may be operatively associated with a clustered service location (as described hereinabove), for example.

In various embodiments, the inlet 2102A of the first check valve 2102 may be structured to respond to application of positive pressure (represented by arrow 2116) at the common refill/evacuation location 2104, which response to the positive pressure 2116 includes actuating the first check valve 2102 and permitting fluid to flow therethrough. As applied herein with respect to pressure levels, the term "positive" means pressure which is at a level sufficient to move a fluid or fluids in the direction of the positive pressure flow 2116 (e.g., fluid moving in a direction from the inlet/outlet port 2112 to the inlet 2102A of the first check valve 2102). During a filter purge operation, for example, compressed air may be introduced as positive pressure at the common refill/evacuation location 2104 and the inlet 2102A of the first check valve 2102. The positive pressure of the compressed air actuates the first check valve 2102 to permit the compressed air to flow to at least the portion of a fluid system 2016 and/or through passages, valves, filters, reservoirs or other fluidic structures in the fluid system that may contain old or used fluids (e.g., old or used oil). During a refill operation, for example, application of positive pressure 2116 at the common refill/evacuation location 2104 permits fluid flowing from the inlet/outlet port 2112 to flow through the first check valve 2102 to the portion of a fluid system 2106.

Conversely, the second check valve 2108 may be structured to respond to application of negative pressure (represented by arrow 2118) at the common refill/evacuation location 2104, which response to the negative pressure 2118 includes actuating the second check valve 2108 and permitting fluid to flow therethrough. As applied herein with respect to pressure levels, the term "negative" means pressure which is at a level sufficient to move a fluid or fluids in the direction of the negative pressure flow 2118 (e.g., fluid moving in a direction from the outlet 2108B of the second check valve 2108 to the inlet/outlet port 2112). During an evacuation operation, for example, application of negative pressure 2118 at the common refill/evacuation location 2104 permits fluid to flow through the second check valve 2108 to the inlet/outlet port 2112 of the assembly 2100. It can be appreciated that the present systems and methods permit alternative performance of positive pressure fluid operations or negative pressure fluid operations at the common refill/evacuation location 2104.

In various embodiments, the inlet/outlet port 2112 may be in fluid communication with one or more fluid components, such as fluid component 2120 shown in FIG. 32. The fluid component 2120 may include one or more of the following fluidic structures, for example and without limitation: a pump that is off-board with respect to a machine being serviced; a pump that is on-board with respect to a machine being serviced; a flow control means (in accordance with embodiments described hereinabove) such as a hand-held device, for example; and/or, a bracket or evacuation bracket (in accordance with embodiments described hereinabove). The fluid component 2120 may also be any other component suitable for supplying positive and/or negative fluid pressure to the inlet/outlet port 2112 in accordance with the various fluid operations described herein.

Figure 33:
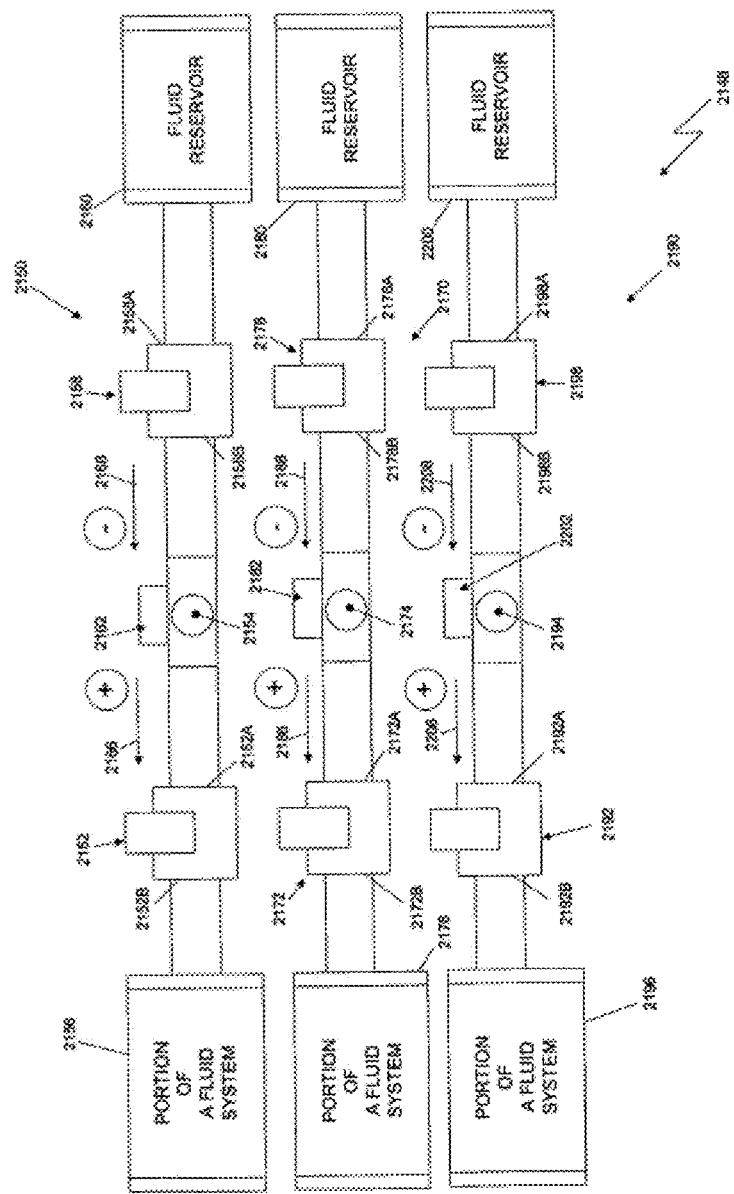
FIG. 33 includes a schematic representation of a valve system structured in accordance with embodiments of the present systems and methods.

Referring now to FIG. 33, in various embodiments of the present invention, a check valve system 2148 may include multiple check valve assemblies 2150, 2170, 2190 configured in accordance with the present invention to service multiple fluid reservoirs 2160, 2180, 2200, for example, and/or multiple kinds of fluids contained in the fluid reservoirs 2160, 2180, 2200. In various embodiments, one or more of the check valve assemblies 2150, 2170, 2190 may be structured to be part of the same fluid system, or any of the check valve assemblies 2150, 2170, 2190 may be structured for operation as part of an independently operating fluid system.

In the first check valve assembly 2150, for example, a first check valve 2152 may be structured with an inlet 2152A in fluid communication with a common refill/evacuation location 2154 and an outlet 2152B in fluid communication with a portion of a fluid system 2156. In certain embodiments, the portion of a fluid system 2156 may be configured to include an operative association with at least a pre-filter portion of the fluid system. A second check valve 2158 of the assembly 2150 includes an inlet 2158A in communication with the fluid reservoir 2160, for example, or another similar structure in fluidic association with the assembly 2150. The second check valve 2158 further includes an outlet 2158B in fluid communication with the common refill/evacuation location 2154. An inlet/outlet port 2162 may be structured for fluid communication with the common refill/evacuation location 2154. In various embodiments, the inlet/outlet port 2162 may be operatively associated with a clustered service location (as described hereinabove), for example. In certain embodiments, a quick disconnect (not shown) may be operatively associated with the common refill/evacuation location 2154 to permit ready connection and disconnection of fluidic structures in operative association with the common refill/ evacuation location 2154.

In various embodiments, the inlet 2152A of the first check valve 2152 may be structured to respond to application of positive pressure (represented by arrow 2166) at the common refill/evacuation location 2154, which response to the positive pressure 2166 includes actuating the first check valve 2152 and permitting fluid to flow therethrough. As applied herein with respect to pressure levels, the term "positive" means pressure which is at a level sufficient to move a fluid or fluids in the direction of the positive pressure flow 2166 (e.g., fluid moving in a direction from the inlet/outlet port 2162 to the inlet 2152A of the first check valve 2152). During a fluid refill operation, for example, application of positive pressure 2166 at the common refill/ evacuation location 2154 permits fluid flowing from the inlet/outlet port 2162 to flow through the first check valve 2152 to the portion of a fluid system 2156.

Conversely, the second check valve 2158 may be structured to respond to application of negative pressure (represented by arrow 2168) at the common refill/evacuation location 2154, which response to the negative pressure 2168 includes actuating the second check valve 2168 and permitting fluid to flow therethrough. As applied herein with respect to pressure levels, the term "negative" means pressure which is at a level sufficient to move a fluid or fluids in the direction of the negative pressure flow 2168 (e.g., fluid moving in a direction from the outlet 2158B of the second check valve 2158 to the inlet/outlet port 2162). During an evacuation operation, for example, application of negative pressure 2168 at the common refill/evacuation location 2154 permits fluid to flow through the second check valve 2158 to the inlet/outlet port 2162 of the assembly 2150. It can be appreciated that the present systems and methods permit alternative performance of positive pressure fluid operations or negative pressure fluid operations at the common refill/ evacuation location 2154.

In other aspects of the check valve system 2148, with reference to the second check valve assembly 2170, a third check valve 2172 may be structured with an inlet 2172A in fluid communication with a common refill/evacuation location 2174 and an outlet 2172B in fluid communication with a portion of a fluid system 2176. In certain embodiments, the portion of a fluid system 2176 may be configured to include an operative association with at least a pre-filter portion of the fluid system. A fourth check valve 2178 of the assembly 2150 includes an inlet 2178A in fluid communication with the fluid reservoir 2180, for example, or another similar structure fluidically associated with the assembly 2170. The fourth check valve 2178 further includes an outlet 2178B in fluid communication with the common refill/evacuation location 2174. An inlet/outlet port 2182 may be structured for fluid communication with the common refill/evacuation location 2174. In various embodiments, the inlet/outlet port 2182 may be operatively associated with a clustered service location (as described hereinabove), for example. In certain embodiments, a quick disconnect (not shown) may be operatively associated with the common refill/evacuation location 2174 to permit ready connection or disconnection of fluidic structures in operative association with/from the common refill/evacuation location 2174.

In various embodiments, the inlet 2172A of the third check valve 2172 may be structured to respond to application of positive pressure (represented by arrow 2186) at the common refill/evacuation location 2174, which response to the positive pressure 2186 includes actuating the third check valve 2172 and permitting fluid to flow therethrough. As applied herein with respect to pressure levels, the term "positive" means pressure which is at a level sufficient to move a fluid or fluids in the direction of the positive pressure flow 2186 (e.g., fluid moving in a direction from the inlet/outlet port 2182 to the inlet 2172A of the third check valve 2172). During a refill operation, for example, application of positive pressure 2186 at the common refill/ evacuation location 2174 permits fluid flowing from the inlet/outlet port 2182 to flow through the third check valve 2172 to the portion of a fluid system 2176.

Conversely, the fourth check valve 2178 may be structured to respond to application of negative pressure (represented by arrow 2188) at the common refill/evacuation location 2174, which response to the negative pressure 2188 includes actuating the fourth check valve 2188 and permitting fluid to flow therethrough. As applied herein with respect to pressure levels, the term "negative" means pressure which is at a level sufficient to move a fluid or fluids in the direction of the negative pressure flow 2188 (e.g., fluid moving in a direction from the outlet 2178B of the fourth check valve 2178 to the inlet/outlet port 2182). During an evacuation operation, for example, application of negative pressure 2188 at the common refill/evacuation location 2174 permits fluid to flow through the fourth check valve 2178 to the inlet/outlet port 2182 of the assembly 2170. It can be appreciated that the present systems and methods permit alternative performance of positive pressure fluid operations or negative pressure fluid operations at the common refill/ evacuation location 2174.

With reference to the third check valve assembly 2190 of the system 2148, a fifth check valve 2192 may have an inlet 2192A in fluid communication with a common refill/evacuation location 2194 and an outlet 2192B in fluid communication with a portion of a fluid system 2196. In certain embodiments, the portion of a fluid system 2196 may be configured to include an operative association with at least a pre-filter portion of the fluid system. A sixth check valve 2198 of the assembly 2190 includes an inlet 2198A in fluid communication with the fluid reservoir 2200, for example, or another similar structure fluidically associated with the assembly 2190. The sixth check valve 2198 further includes an outlet 2198B in fluid communication with the common refill/evacuation location 2194. An inlet/outlet port 2202 may be structured for fluid communication with the common refill/evacuation location 2194. In various embodiments, the inlet/outlet port 2112 may be operatively associated with a clustered service location (as described hereinabove), for example. In certain embodiments, a quick disconnect (not shown) may be operatively associated with the common refill/evacuation location 2194 to permit ready connection and disconnection of fluidic structures in operative association with the common refill/evacuation location 2194.

In various embodiments, the inlet 2192A of the fifth check valve 2192 may be structured to respond to application of positive pressure (represented by arrow 2206) at the common refill/evacuation location 2194, which response to the positive pressure 2206 includes actuating the fifth check valve 2192 and permitting fluid to flow therethrough. As applied herein with respect to pressure levels, the term "positive" means pressure which is at a level sufficient to move a fluid or fluids in the direction of the positive pressure flow 2206 (e.g., fluid moving in a direction from the inlet/outlet port 2202 to the inlet 2192A of the fifth check valve 2192). During a refill operation, for example, application of positive pressure 2206 at the common refill/ evacuation location 2194 permits fluid flowing from the inlet/outlet port 2202 to flow through the fifth check valve 2192 to the portion of a fluid system 2196.

Conversely, the sixth check valve 2198 may be structured to respond to application of negative pressure (represented by arrow 2208) at the common refill/evacuation location 2194, which response to the negative pressure 2208 includes actuating the sixth check valve 2198 and permitting fluid to flow therethrough. As applied herein with respect to pressure levels, the term "negative" means pressure which is at a level sufficient to move a fluid or fluids in the direction of the negative pressure flow 2208 (e.g., fluid moving in a direction from the outlet 2198B of the sixth check valve 2198 to the inlet/outlet port 2202). During an evacuation operation, for example, application of negative pressure 2208 at the common refill/evacuation location 2194 permits fluid to flow through the sixth check valve 2198 to the inlet/outlet port 2202 of the assembly 2190. It can be appreciated that the present systems and methods permit alternative performance of positive pressure fluid operations or negative pressure fluid operations at the common refill/evacuation location 2194.

It can be seen that multiple check valve assembly configurations (e.g., such as configurations that include the check valve assemblies 2150, 2170, 2190) permit multiple fluid operations such as refill operations, evacuation operations, and/or filter purge operations, for example, to be performed on multiple fluid reservoirs. It can be appreciated that any number of check valve assemblies may be provided within the scope of the present methods and systems. The illustration of three separate check valve assemblies 2150, 2170, 2190 in FIG. 33, for example, is merely for purposes of convenience of disclosure. More or fewer check valve assemblies may be employed in operative association with fluid systems configured in accordance with the present invention. Each of the portions of a fluid system 2156, 2176, 2196 may include any reasonable combination of valves, pipes, reservoirs and/or other fluidic structures. In various embodiments, one or more of the fluid reservoirs 2160, 2180, 2200 may contain a quantity of a fluid such as oil, transmission fluid, hydraulic fluid, or another type of fluid described hereinabove and/or any other fluid suitable for use in accordance with the present systems and methods.

In various embodiments, any one or more of the inlet/ outlet ports 2162, 2182, 2202 may be in fluid communication with one or more fluid components (not shown) including one or more of the following fluidic structures, for example and without limitation: a pump that is off-board with respect to a machine being serviced; a pump that is on-board with respect to a machine being serviced; a flow control means (in accordance with embodiments described hereinabove) such as a hand-held device, for example; and/or, a bracket or evacuation bracket (in accordance with embodiments described hereinabove). The fluid component may also be any other component suitable for supplying positive and/or negative fluid pressure to the inlet/outlet ports 2162, 2182, 2202 in accordance with various fluid operations described herein.

Figure 34:
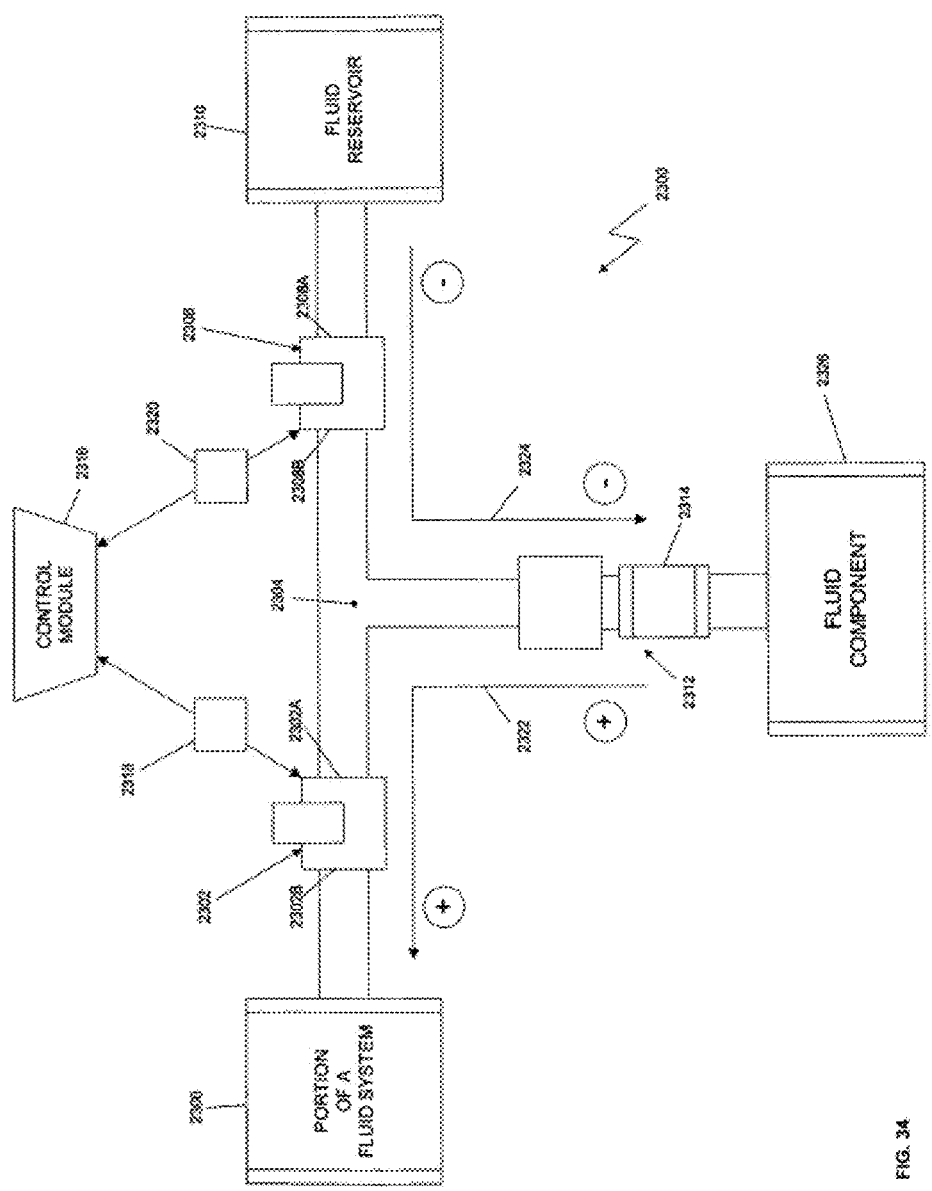
FIG. 34 includes a schematic representation of a valve assembly structured in accordance with embodiments of the present systems and methods.

Referring now to FIG. 34, in accordance with various embodiments of the present invention, an electronic valve assembly 2300 is provided in accordance with the present systems and methods. The assembly 2300 includes a first electronic valve 2302 having an inlet 2302A in fluid communication with a common refill/evacuation location 2304 and an outlet 2302B in fluid communication with a portion of a fluid system 2306. In various embodiments, the portion of a fluid system 2306 may include an operative association with at least a pre-filter portion of the fluid system. A second electronic valve 2308 of the assembly 2300 includes an inlet 2308A in communication with a fluid reservoir 2310, for example, or another similar structure included within the fluid system 2300. The second electronic valve 2308 further includes an outlet 2308B in fluid communication with the common refill/evacuation location 2304. In addition, an inlet/outlet port 2312 may be structured for fluid communication with the common refill/evacuation location 2304.

The portion of the fluid system 2306 may include any reasonable combination of valves, pipes, reservoirs and/or other fluidic structures. In various embodiments, the fluid reservoir 2310 may contain a quantity of a fluid such as oil, transmission fluid, hydraulic fluid, or another type of fluid described hereinabove and/or any other fluid suitable for use in accordance with the present systems and methods. In certain embodiments, a quick disconnect 2314 or other similar type of coupling may be operatively associated with the inlet/outlet port 2312 to permit operative association of various fluidic structures such as an external pump, for example, with the inlet/outlet port 2312. In various embodiments, the inlet/outlet port 2312 may be operatively associated with a clustered service location (as described hereinabove), for example.

In various embodiments, a control module 2316 may be operatively associated with one or both of the electronic valves 2302, 2308 to actuate the valves 2302, 2308 upon sensing a predetermined pressure level, for example, within the assembly 2300. One or more sensors such as pressure sensors 2318, 2320, for example, may be operatively associated with the control module 2316 and/or the electronic valves 2302, 2308 to provide pressure level information to the control module 2316.

The sensor 2318 associated with the first electronic valve 2302, for example, may be configured to communicate a signal indicative of application of positive pressure (represented by arrow 2322) at the common refill/evacuation location 2304, which response to the positive pressure 2322 includes actuating the first electronic valve 2302 to permit fluid flow therethrough. As applied herein with respect to pressure levels, the term "positive" means pressure which is at a level sufficient to move a fluid or fluids in the direction of the positive pressure flow 2322 (e.g., fluid moving in a direction from the inlet/outlet port 2312 to the inlet 2302A of the first electronic valve 2302). During a refill operation, for example, application of positive pressure 2322 at the common refill/evacuation location 2304, and subsequent actuation of the first electronic valve 2302 by the control module 2316, permit fluid to flow from the inlet/outlet port 2312, through the first electronic valve 2302 to the portion of the fluid system 2306.

In addition, the sensor 2320 associated with the second electronic valve 2308, for example, may be configured to communicate a signal indicative of application of negative pressure (represented by arrow 2324) at the common refill/evacuation location 2304, which response to the negative pressure 2324 includes actuating the second electronic valve 2308 and permitting fluid to flow therethrough. As applied herein with respect to pressure levels, the term "negative" means pressure which is at a level sufficient to move a fluid or fluids in the direction of the negative pressure flow 2324 (e.g., fluid moving in a direction from the outlet 2308B of the second electronic valve 2308 to the inlet/outlet port 2312). During an evacuation operation, for example, application of negative pressure 2324 at the common refill/evacuation location 2304, and subsequent actuation of the second electronic valve 2308, permit fluid to flow through the second electronic valve 2308 to the inlet/outlet port 2312 of the assembly 2300. It can be appreciated that the present systems and methods permit alternative positive pressure fluid operations or negative pressure fluid operations to be performed at the common refill/evacuation location 2304.

In various embodiments, the inlet/outlet port 2312 may be in fluid communication with one or more fluid components, such as fluid component 2326 shown in FIG. 34. The fluid component 2326 may include one or more of the following fluidic structures, for example and without limitation: a pump that is off-board with respect to a machine being serviced; a pump that is on-board with respect to a machine being serviced; a flow control means (in accordance with embodiments described hereinabove) such as a hand-held device, for example; and/or, a bracket or evacuation bracket (in accordance with embodiments described hereinabove). The fluid component 2326 may also be any other component suitable for supplying positive and/or negative fluid pressure to the inlet/outlet port 2312 in accordance with the various fluid operations described herein.

Figure 35:
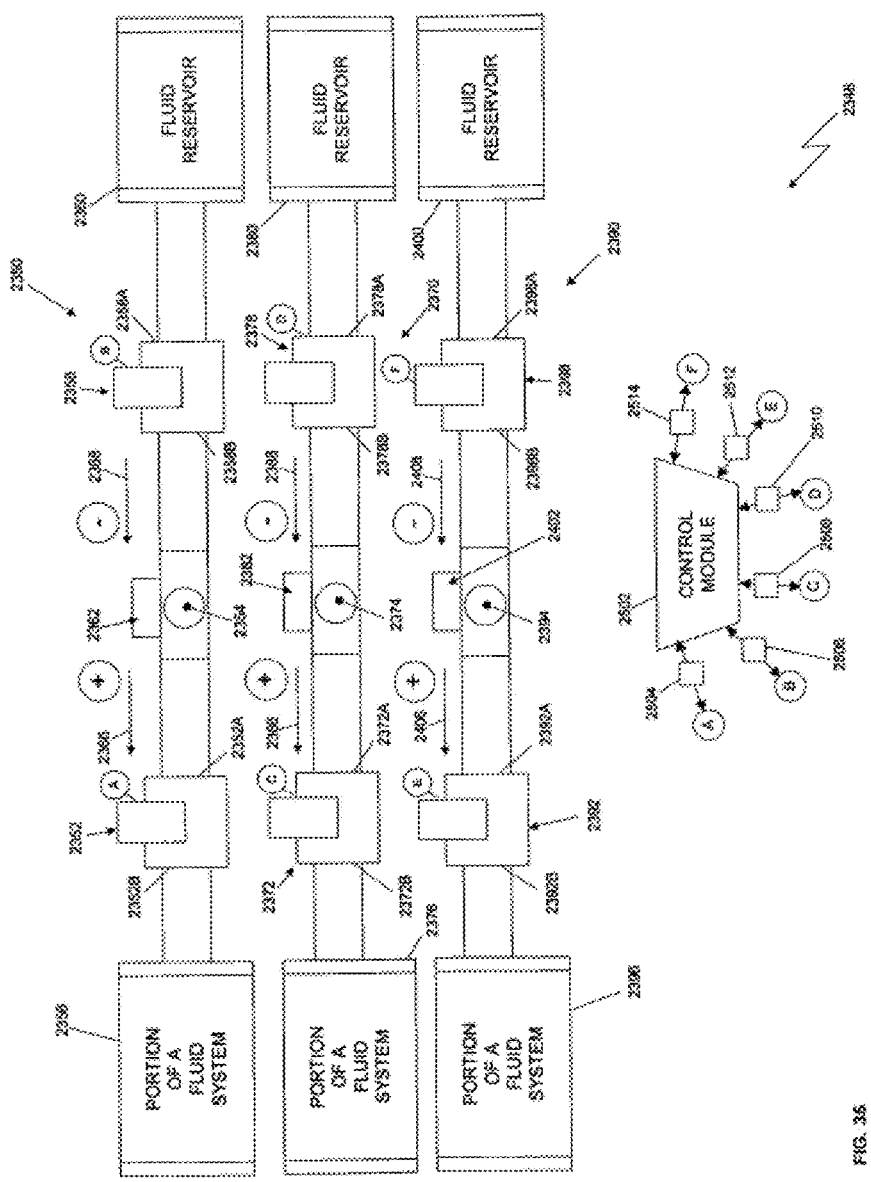
FIG. 35 includes a schematic representation of a valve system provided in accordance with embodiments of the present systems and methods.

Referring now to FIG. 35, in various embodiments of the present invention, an electronic valve system 2348 may include multiple electronic valve assemblies 2350, 2370, 2390 configured in accordance with the present invention to service multiple fluid reservoirs, for example, and/or multiple kinds of fluids contained in the fluid reservoirs. In various embodiments, one or more of the electronic valve assemblies 2350, 2370, 2390 may be structured to be part of the same fluid system, or any of the electronic valve assemblies 2350, 2370, 2390 may be structured for operation as part of an independently operating fluid system. In the first electronic valve assembly 2350, for example, a first electronic valve 2352 may be structured with an inlet 2352A in fluid communication with a common refill/evacuation location 2354 and an outlet 2352B in fluid communication with a portion of a fluid system 2356. In certain embodiments, the portion of a fluid system 2356 may be configured to include an operative association with at least a pre-filter portion of the fluid system. A second electronic valve 2358 of the assembly 2350 may include an inlet 2358A in communication with a fluid reservoir 2360, for example, or another similar structure in fluidic association with the assembly 2350. The second electronic valve 2358 further includes an outlet 2358B in fluid communication with the common refill/evacuation location 2354. An inlet/outlet port 2362 may be structured for fluid communication with the common refill/evacuation location 2354. In various embodiments, the inlet/outlet port 2362 may be operatively associated with a clustered service location (as described hereinabove), for example. In certain embodiments, a quick disconnect (not shown) may be operatively associated with the common refill/evacuation location 2354 to permit ready connection/disconnection of fluidic structures to/from operative association with the common refill/evacuation location 2354.

In various embodiments, the inlet 2352A of the first electronic valve 2352 may be structured to respond to application of positive pressure (represented by arrow 2366) at the common refill/evacuation location 2354, which response to the positive pressure 2366 includes actuating the first electronic valve 2352 and permitting fluid to flow therethrough. As applied herein with respect to pressure levels, the term "positive" means pressure which is at a level sufficient to move a fluid or fluids in the direction of the positive pressure flow 2366 (e.g., fluid moving in a direction from the inlet/outlet port 2362 to the inlet 2352A of the first electronic valve 2352). During a refill operation, for example, application of positive pressure 2366 at the common refill/evacuation location 2354 permits fluid flowing from the inlet/outlet port 2362 to flow through the first electronic valve 2352 to the portion of a fluid system 2356.

Conversely, the second electronic valve 2358 may be structured to respond to application of negative pressure (represented by arrow 2368) at the common refill/evacuation location 2354, which response to the negative pressure 2368 includes actuating the second electronic valve 2368 and permitting fluid to flow therethrough. As applied herein with respect to pressure levels, the term "negative" means pressure which is at a level sufficient to move a fluid or fluids in the direction of the negative pressure flow 2368 (e.g., fluid moving in a direction from the outlet 2358B of the second electronic valve 2358 to the inlet/outlet port 2362). During an evacuation operation, for example, application of negative pressure 2368 at the common refill/evacuation location 2354 permits fluid to flow through the second electronic valve 2358 to the inlet/outlet port 2362 of the assembly 2350. It can be appreciated that the present systems and methods permit alternative performance of positive pressure fluid operations or negative pressure fluid operations at the common refill/evacuation location 2354.

In other aspects of the electronic valve system 2348, with reference to the second electronic valve assembly 2370, a third electronic valve 2372 may be structured with an inlet 2372A in fluid communication with a common refill/evacuation location 2374 and an outlet 2372B in fluid communication with a portion of a fluid system 2376. In certain embodiments, the portion of a fluid system 2376 may be configured to include an operative association with at least a pre-filter portion of the fluid system. A fourth electronic valve 2378 of the assembly 2370 includes an inlet 2378A in fluid communication with a fluid reservoir 2380, for example, or another similar structure fluidically associated with the assembly 2370. The fourth electronic valve 2378 further includes an outlet 2378B in fluid communication with the common refill/evacuation location 2374. An inlet/outlet port 2382 may be structured for fluid communication with the common refill/evacuation location 2374. In various embodiments, the inlet/outlet port 2382 may be operatively associated with a clustered service location (as described hereinabove), for example. In certain embodiments, a quick disconnect (not shown) may be operatively associated with the common refill/evacuation location 2374 to permit ready connection or disconnection of fluidic structures to/from operative association with the common refill/evacuation location 2374.

In various embodiments, the inlet 2372A of the third electronic valve 2372 may be structured to respond to application of positive pressure (represented by arrow 2386) at the common refill/evacuation location 2374, which response to the positive pressure 2386 includes actuating the third electronic valve 2372 and permitting fluid to flow therethrough. As applied herein with respect to pressure levels, the term "positive" means pressure which is at a level sufficient to move a fluid or fluids in the direction of the positive pressure flow 2386 (e.g., fluid moving in a direction from the inlet/outlet port 2382 to the inlet 2372A of the third electronic valve 2372). During a refill operation, for example, application of positive pressure 2386 at the common refill/evacuation location 2374 permits fluid flowing from the inlet/outlet port 2382 to flow through the third electronic valve 2372 to the portion of a fluid system 2376.

Conversely, the fourth electronic valve 2378 may be structured to respond to application of negative pressure (represented by arrow 2388) at the common refill/evacuation location 2374, which response to the negative pressure 2388 includes actuating the fourth electronic valve 2388 and permitting fluid to flow therethrough. As applied herein with respect to pressure levels, the term "negative" means pressure which is at a level sufficient to move a fluid or fluids in the direction of the negative pressure flow 2388 (e.g., fluid moving in a direction from the outlet 2378B of the fourth electronic valve 2378 to the inlet/outlet port 2382). During an evacuation operation, for example, application of negative pressure 2388 at the common refill/evacuation location 2374 permits fluid to flow through the fourth electronic valve 2378 to the inlet/outlet port 2382 of the assembly 2370. It can be appreciated that the present systems and methods permit alternative performance of positive pressure fluid operations or negative pressure fluid operations at the common refill/evacuation location 2374.

With reference to the third electronic valve assembly 2390 of the system 2348, a fifth electronic valve 2392 may have an inlet 2392A in fluid communication with a common refill/evacuation location 2394 and an outlet 2392B in fluid communication with a portion of a fluid system 2396. In certain embodiments, the portion of a fluid system 2396 may be configured to include an operative association with at least a pre-filter portion of the fluid system. A sixth electronic valve 2398 of the assembly 2390 includes an inlet 2398A in fluid communication with a fluid reservoir 2400, for example, or another similar structure operatively associated with the assembly 2390. The sixth electronic valve 2398 further includes an outlet 2398B in fluid communication with the common refill/evacuation location 2394. An inlet/outlet port 2402 may be structured for fluid communication with the common refill/evacuation location 2394. In various embodiments, the inlet/outlet port 2312 may be operatively associated with a clustered service location (as described hereinabove), for example. In certain embodiments, a quick disconnect (not shown) may be operatively associated with the common refill/evacuation location 2394 to permit ready connection or disconnection of fluidic structures to/from operative association with the common refill/evacuation location 2394.

In various embodiments, the inlet 2392A of the fifth electronic valve 2392 may be structured to respond to application of positive pressure (represented by arrow 2406) at the common refill/evacuation location 2394, which response to the positive pressure 2406 includes actuating the fifth electronic valve 2392 and permitting fluid to flow therethrough. As applied herein with respect to pressure levels, the term "positive" means pressure which is at a level sufficient to move a fluid or fluids in the direction of the positive pressure flow 2406 (e.g., fluid moving in a direction from the inlet/outlet port 2402 to the inlet 2392A of the fifth electronic valve 2392). During a refill operation, for example, application of positive pressure 2406 at the common refill/evacuation location 2394 permits fluid flowing from the inlet/outlet port 2402 to flow through the fifth electronic valve 2392 to the portion of a fluid system 2396.

Conversely, the sixth electronic valve 2398 may be structured to respond to application of negative pressure (represented by arrow 2408) at the common refill/evacuation location 2394, which response to the negative pressure 2408 includes actuating the sixth electronic valve 2398 and permitting fluid to flow therethrough. As applied herein with respect to pressure levels, the term "negative" means pressure which is at a level sufficient to move a fluid or fluids in the direction of the negative pressure flow 2408 (e.g., fluid moving in a direction from the outlet 2398B of the sixth electronic valve 2398 to the inlet/outlet port 2402). During an evacuation operation, for example, application of negative pressure 2408 at the common refill/evacuation location 2394 permits fluid to flow through the sixth electronic valve 2398 to the inlet/outlet port 2402 of the assembly 2390. It can be appreciated that the present systems and methods permit alternative performance of positive pressure fluid operations or negative pressure fluid operations at the common refill/evacuation location 2394.

In various embodiments, a control module 2502 may be operatively associated with one or more of the electronic valves 2352, 2358, 2372, 2378, 2392, 2398 to actuate the valves 2352, 2358, 2372, 2378, 2392, 2398 upon sensing a predetermined pressure level, for example, within one or more of the assemblies 2350, 2370, 2390 of the electronic valve system 2348. One or more sensors such as pressure sensors 2504, 2506, 2508, 2510, 2512, 2514, for example, may be operatively associated with the control module 2502 and/or the electronic valves 2352, 2358, 2372, 2378, 2392, 2398 to provide pressure level information to the control module 2502.

The sensor 2504 associated with the first electronic valve 2352 of the first electronic valve assembly 2350 of the system 2348, for example, may be configured to communicate a signal indicative of application of positive pressure (represented by arrow 2366) at the common refill/evacuation location 2354, which response to the positive pressure 2366 includes actuating the first electronic valve 2352 to permit fluid flow therethrough. As applied herein with respect to pressure levels, the term "positive" means pressure which is at a level sufficient to move a fluid or fluids in the direction of the positive pressure flow 2366 (e.g., fluid moving in a direction from the inlet/outlet port 2362 to the inlet 2352A of the first electronic valve 2352). During a refill operation, for example, application of positive pressure 2366 at the common refill/evacuation location 2354, and subsequent actuation of the first electronic valve 2352 by the control module 2502, for example, together permit fluid to flow from the inlet/outlet port 2362, through the first electronic valve 2352 to the portion of the fluid system 2356.

In addition, the sensor 2506 associated with the second electronic valve 2358, for example, may be configured to communicate a signal indicative of application of negative pressure (represented by arrow 2368) at the common refill/evacuation location 2354, which response to the negative pressure 2368 includes actuating the second electronic valve 2358 and permitting fluid to flow therethrough. As applied herein with respect to pressure levels, the term "negative" means pressure which is at a level sufficient to move a fluid or fluids in the direction of the negative pressure flow 2368 (e.g., fluid moving in a direction from the outlet 2358B of the second electronic valve 2358 to the inlet/outlet port 2362). During an evacuation operation, for example, application of negative pressure 2368 at the common refill/evacuation location 2354, and subsequent actuation of the second electronic valve 2358, permit fluid to flow through the second electronic valve 2358 to the inlet/outlet port 2362 of the assembly 2350. It can be appreciated that the present systems and methods permit alternative positive pressure fluid operations or negative pressure fluid operations to be performed at the common refill/evacuation location 2354.

It can be seen that multiple electronic valve assembly configurations (e.g., such as configurations that include the electronic valve assemblies 2350, 2370, 2390) permit multiple fluid operations such as refill operations, evacuation operations, and/or filter purge operations, for example, to be performed on multiple fluid reservoirs. It can be appreciated that any number of electronic valve assemblies may be provided within the scope of the present methods and systems. The illustration of three separate electronic valve assemblies 2350, 2370, 2390 in FIG. 35, for example, is merely for purposes of convenience of disclosure. More or less electronic valve assemblies may be employed in operative association with fluid systems configured in accordance with the present invention. Each of the portions of a fluid system 2356, 2376, 2396 may include any reasonable combination of valves, pipes, reservoirs and/or other fluidic structures. In various embodiments, one or more of the fluid reservoirs 2360, 2380, 2400 may contain a quantity of a fluid such as oil, transmission fluid, hydraulic fluid, or another type of fluid described hereinabove and/or any other fluid suitable for use in accordance with the present systems and methods.

In various embodiments, any one or more of the inlet/outlet ports 2362, 2382, 2402 may be in fluid communication with one or more fluid components including one or more of the following fluidic structures, for example and without limitation: a pump that is off-board with respect to a machine being serviced; a pump that is on-board with respect to a machine being serviced; a flow control means (in accordance with embodiments described hereinabove) such as a hand-held device, for example; and/or, a bracket or evacuation bracket (in accordance with embodiments described hereinabove). The fluid component may also be any other component suitable for supplying positive and/or negative fluid pressure to the inlet/outlet ports 2362, 2382, 2402 in accordance with the various fluid operations described herein.

Figure 36:
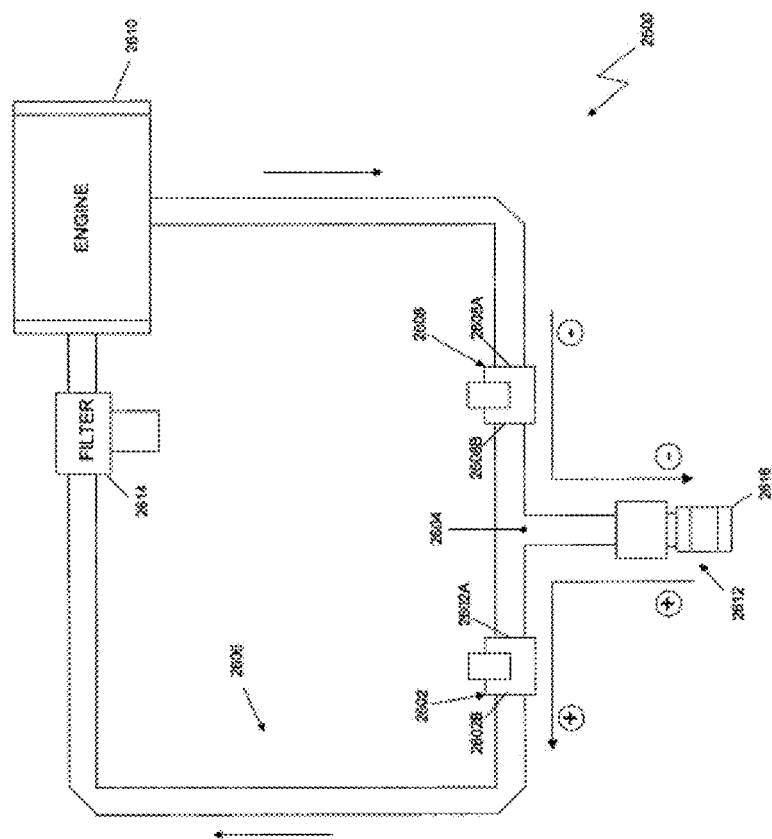
FIG. 36 includes a schematic representation of an illustrative fluid system provided in accordance with various embodiments of the present systems and methods.

Referring now to FIG. 36, an illustration of a fluid system 2600 in accordance with various aspects of the present systems and methods is provided. The fluid system 2600 includes a first check valve 2602 having an inlet 2602A in fluid communication with a common refill/evacuation location 2604 and an outlet 2602B in fluid communication with a pre-filter portion 2606 of the fluid system 2600. A second check valve 2608 of the fluid system 2600 includes an inlet 2608A in communication with an engine fluid reservoir 2610, for example. The second check valve 2608 further includes an outlet 2608B in fluid communication with the common refill/evacuation location 2604. In addition, an inlet/outlet port 2612 may be structured for fluid communication with the common refill/evacuation location 2604. In another aspect, a fluid filter 2614 is in fluid communication with the pre-filter portion 2606 and the fluid reservoir 2610 of the fluid system 2600. It can be appreciated that the fluid filter 2614 may be, for example and without limitation, an oil filter, a transmission fluid filter, a hydraulic fluid filter or a variety of other types of suitable fluid filters for corresponding types of fluid systems. In various embodiments, a quick disconnect 2616 or other similar type of coupling may be operatively associated with the inlet/outlet port 2612 to permit operative association of various fluidic structures such as an external pump, for example, with the inlet/outlet port 2612.

Figure 37:
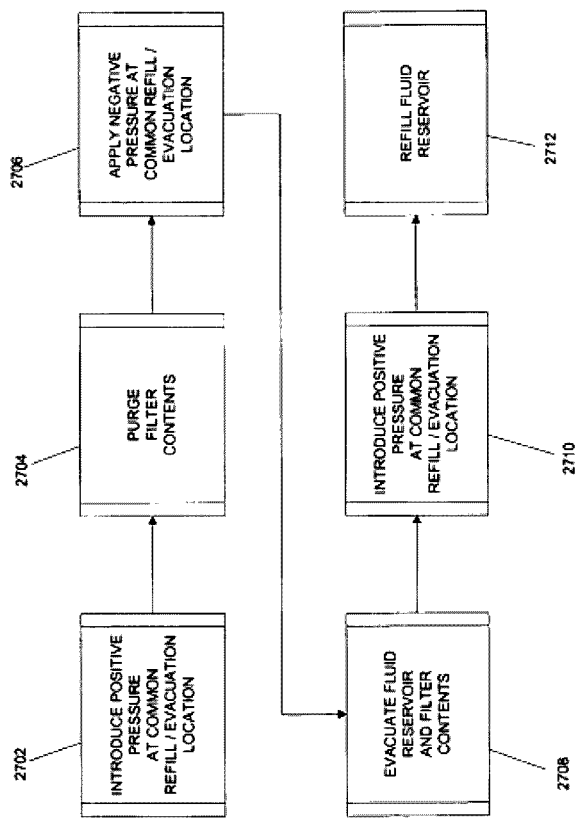
FIG. 37 includes a flow chart illustrating various aspects of fluid operations that can be performed in accordance with the present systems and methods.

Referring now to FIG. 37, a flow chart is provided that includes examples of various fluid operations that may be performed in accordance with the present systems and methods. In step 2702, and in connection with the fluid system 2600 of FIG. 36 by way of example, positive pressure may be introduced at the common refill/evacuation location 2604. A fluid such as air, for example, may be introduced through the inlet/outlet port 2612 to provide positive pressure at the common refill/evacuation location 2604. The positive pressure actuates the first check valve 2602 and permits the contents of the fluid filter 2614 to be purged in step 2704. The purged contents of the fluid filter 2614 may be forced by the positive pressure into the engine fluid reservoir 2610, for example.

In step 2706, negative pressure may be introduced at the common refill/evacuation location 2604 through the inlet/outlet port 2612. It can be seen that such negative pressure actuates the second check valve 2608 to permit fluid to be evacuated from the engine fluid reservoir 2610 in step 2708 (which evacuated fluid includes the contents of the fluid filter purged in step 2704) through the second check valve 2608 to exit through the inlet/outlet port 2612. In addition, positive pressure may be introduced in step 2710 at the common refill/evacuation location 2604 such as during performance of a refill fluid operation, for example, to refill the contents of the engine fluid reservoir 2610 in step 2712. It can therefore be seen that the refill fluid encounters the fluid filter 2614 prior to refilling the engine fluid reservoir 2610, and other operative components of the system 2600, which enhances filtration of the refill fluid and which may enhance operation of a machine, for example, operatively associated with the system 2600.

Figure 38:
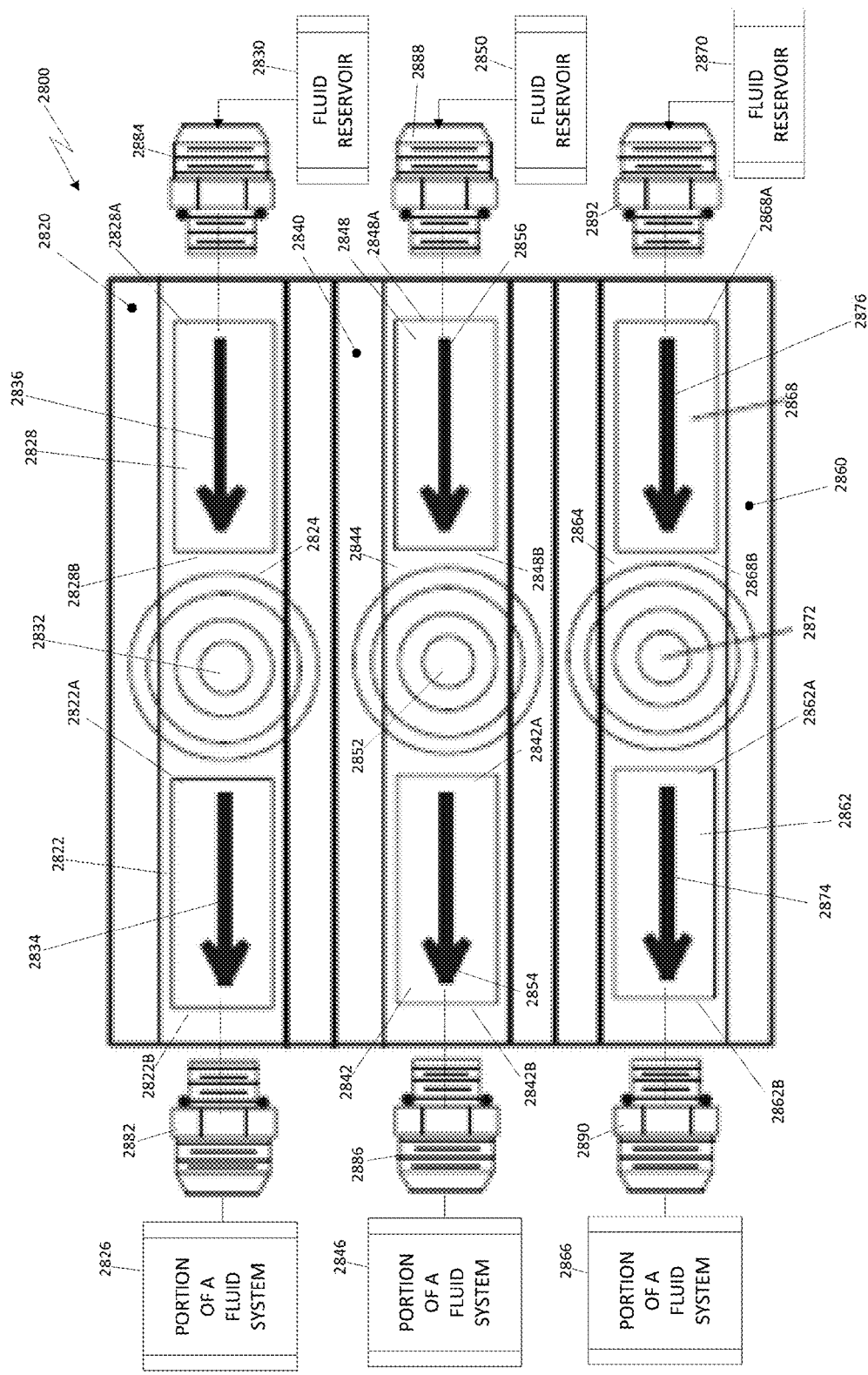
FIG. 38 includes a schematic representation of a module of valve assemblies provided in accordance with the present systems and methods.

Referring now to FIG. 38, a check valve module 2800 is provided that may include a plurality of check valve assemblies 2820, 2840, 2860 coupled or ganged together to form the module 2800. The individual assemblies 2820, 2840, 2860 may be coupled together by a conventional device or method such as by welding the assemblies 2820, 2840, 2860 to each other, for example. It can be seen that the module embodiments described herein provide substantially compact and central locations for performance of various fluid operations such as fluid refill, fluid evacuation, and filter purge operations performed on a machine, for example. In various embodiments, one or more of the check valve assemblies 2820, 2840, 2860 may be structured to be part of the same fluid system, or any of the check valve assemblies 2820, 2840, 2860 may be structured for operation as part of an independently operating fluid system.

In various embodiments, with respect to the first check valve assembly 2820, for example, a first check valve 2822 may be structured with an inlet 2822A in fluid communication with a common refill/evacuation location 2824 and an outlet 2822B in fluid communication with a portion of a fluid system 2826. In certain embodiments, the portion of a fluid system 2826 may be configured to include an operative association with at least a pre-filter portion of the fluid system. A second check valve 2828 of the assembly 2820 includes an inlet 2828A in communication with a fluid reservoir 2830, for example, or another similar structure in fluidic association with the assembly 2820. The second check valve 2828 further includes an outlet 2828B in fluid communication with the common refill/evacuation location 2824. An inlet/outlet port 2832 may be structured for fluid communication with the common refill/evacuation location 2824. In various embodiments, the inlet/outlet port 2832 may be operatively associated with a clustered service location (as described hereinabove), for example. In certain embodiments, a quick disconnect (not shown) may be operatively associated with the common refill/evacuation location 2824 to permit ready connection and disconnection of fluidic structures in operative association with the common refill/evacuation location 2824. In various embodiments, the check valves 2822, 2828 may comprise cartridge type check valves, for example.

In various embodiments, the inlet 2822A of the first check valve 2822 may be structured to respond to application of positive pressure (represented by arrow 2834) at the common refill/evacuation location 2824, which response to the positive pressure 2834 includes actuating the first check valve 2822 and permitting fluid to flow therethrough. As applied herein with respect to pressure levels, the term "positive" means pressure which is at a level sufficient to move a fluid or fluids in the direction of the positive pressure flow 2834 (e.g., fluid moving in a direction from the inlet/outlet port 2832 to the inlet 2822A of the first check valve 2822). During a refill operation, for example, application of positive pressure 2834 at the common refill/evacuation location 2824 permits fluid flowing from the inlet/outlet port 2832 to flow through the first check valve 2822 to the portion of a fluid system 2826.

Conversely, the second check valve 2828 may be structured to respond to application of negative pressure (represented by arrow 2836) at the common refill/evacuation location 2824, which response to the negative pressure 2836 includes actuating the second check valve 2828 and permitting fluid to flow therethrough. As applied herein with respect to pressure levels, the term "negative" means pressure which is at a level sufficient to move a fluid or fluids in the direction of the negative pressure flow 2836 (e.g., fluid moving in a direction from the outlet 2828B of the second check valve 2828 to the inlet/outlet port 2832). During an evacuation operation, for example, application of negative pressure 2836 at the common refill/evacuation location 2824 permits fluid to flow through the second check valve 2828 to the inlet/outlet port 2832 of the assembly 2820. It can be appreciated that the present systems and methods permit alternative performance of positive pressure fluid operations or negative pressure fluid operations at the common refill/evacuation location 2824.

In other aspects of the check valve system 2800, with reference to the second check valve assembly 2840, a third check valve 2842 may be structured with an inlet 2842A in fluid communication with a common refill/evacuation location 2844 and an outlet 2842B in fluid communication with a portion of a fluid system 2846. In certain embodiments, the portion of a fluid system 2846 may be configured to include an operative association with at least a pre-filter portion of the fluid system. A fourth check valve 2848 of the assembly 2840 includes an inlet 2848A in fluid communication with a fluid reservoir 2850, for example, or another similar structure fluidically associated with the assembly 2840. The fourth check valve 2848 further includes an outlet 2848B in fluid communication with the common refill/evacuation location 2844. An inlet/outlet port 2852 may be structured for fluid communication with the common refill/evacuation location 2844. In various embodiments, the inlet/outlet port 2852 may be operatively associated with a clustered service location (as described hereinabove), for example. In certain embodiments, a quick disconnect (not shown) may be operatively associated with the common refill/evacuation location 2844 to permit ready connection or disconnection of fluidic structures in operative association with/from the common refill/evacuation location 2844. In various embodiments, the check valves 2842, 2848 may comprise cartridge type check valves, for example.

In various embodiments, the inlet 2842A of the third check valve 2842 may be structured to respond to application of positive pressure (represented by arrow 2854) at the common refill/evacuation location 2844, which response to the positive pressure 2854 includes actuating the third check valve 2842 and permitting fluid to flow therethrough. As applied herein with respect to pressure levels, the term "positive" means pressure which is at a level sufficient to move a fluid or fluids in the direction of the positive pressure flow 2854 (e.g., fluid moving in a direction from the inlet/outlet port 2852 to the inlet 2842A of the third check valve 2842). During a refill operation, for example, application of positive pressure 2854 at the common refill/evacuation location 2844 permits fluid flowing from the inlet/outlet port 2852 to flow through the third check valve 2842 to the portion of a fluid system 2846.

Conversely, the fourth check valve 2848 may be structured to respond to application of negative pressure (represented by arrow 2856) at the common refill/evacuation location 2844, which response to the negative pressure 2856 includes actuating the fourth check valve 2848 and permitting fluid to flow therethrough. As applied herein with respect to pressure levels, the term "negative" means pressure which is at a level sufficient to move a fluid or fluids in the direction of the negative pressure flow 2856 (e.g., fluid moving in a direction from the outlet 2848B of the fourth check valve 2848 to the inlet/outlet port 2852). During an evacuation operation, for example, application of negative pressure 2856 at the common refill/evacuation location 2844 permits fluid to flow through the fourth check valve 2848 to the inlet/outlet port 2852 of the assembly 2840. It can be appreciated that the present systems and methods permit alternative performance of positive pressure fluid operations or negative pressure fluid operations at the common refill/evacuation location 2844.

With reference to the third check valve assembly 2860 of the system 2800, a fifth check valve 2862 may have an inlet 2862A in fluid communication with a common refill/evacuation location 2864 and an outlet 2862B in fluid communication with a portion of a fluid system 2866. In certain embodiments, the portion of a fluid system 2866 may be configured to include an operative association with at least a pre-filter portion of the fluid system. A sixth check valve 2868 of the assembly 2860 includes an inlet 2868A in fluid communication with a fluid reservoir 2870, for example, or another similar structure included within the fluid system. The sixth check valve 2868 further includes an outlet 2868B in fluid communication with the common refill/evacuation location 2864. An inlet/outlet port 2872 may be structured for fluid communication with the common refill/evacuation location 2864. In various embodiments, the inlet/outlet port 2872 may be operatively associated with a clustered service location (as described hereinabove), for example. In certain embodiments, a quick disconnect (not shown) may be operatively associated with the common refill/evacuation location 2864 to permit ready connection and disconnection of fluidic structures in operative association with the common refill/ evacuation location 2864. In various embodiments, the check valves 2862, 2868 may comprise cartridge type check valves, for example.

In various embodiments, the inlet 2862A of the fifth check valve 2862 may be structured to respond to application of positive pressure (represented by arrow 2874) at the common refill/evacuation location 2864, which response to the positive pressure 2874 includes actuating the fifth check valve 2862 and permitting fluid to flow therethrough. As applied herein with respect to pressure levels, the term "positive" means pressure which is at a level sufficient to move a fluid or fluids in the direction of the positive pressure flow 2874 (e.g., fluid moving in a direction from the inlet/outlet port 2872 to the inlet 2862A of the fifth check valve 2862). During a refill operation, for example, application of positive pressure 2874 at the common refill/evacuation location 2864 permits fluid flowing from the inlet/outlet port 2872 to flow through the fifth check valve 2862 to the portion of a fluid system 2866.

Conversely, the sixth check valve 2868 may be structured to respond to application of negative pressure (represented by arrow 2876) at the common refill/evacuation location 2864, which response to the negative pressure 2876 includes actuating the sixth check valve 2868 and permitting fluid to flow therethrough. As applied herein with respect to pressure levels, the term "negative" means pressure which is at a level sufficient to move a fluid or fluids in the direction of the negative pressure flow 2876 (e.g., fluid moving in a direction from the outlet 2868B of the sixth check valve 2868 to the inlet/outlet port 2872). During an evacuation operation, for example, application of negative pressure 2876 at the common refill/evacuation location 2864 permits fluid to flow through the sixth check valve 2868 to the inlet/outlet port 2872 of the assembly 2860. It can be appreciated that the present systems and methods permit alternative performance of positive pressure fluid operations or negative pressure fluid operations at the common refill/evacuation location 2864.

It can be seen that multiple check valve assembly configurations (e.g., such as the module 2800 that includes the check valve assemblies 2820, 2840, 2860) permit multiple fluid operations such as refill operations, evacuation operations, and/or filter purge operations, for example, to be performed on multiple fluid reservoirs. It can be appreciated that any number of check valve assemblies may be provided as a module within the scope of the present methods and systems. The illustration of three separate check valve assemblies 2820, 2840, 2860 in FIG. 38, for example, is merely for purposes of convenience of disclosure. More or less check valve assemblies may be employed in operative association with fluid systems configured in accordance with the present invention. Each of the portions of a fluid system 2826, 2846, 2866 may include any reasonable combination of valves, pipes, reservoirs and/or other fluidic structures. In various embodiments, one or more of the fluid reservoirs 2830, 2850, 2870 may contain a quantity of a fluid such as oil, transmission fluid, hydraulic fluid, or another type of fluid described hereinabove and/or any other fluid suitable for use in accordance with the present systems and methods.

In various embodiments, one or more adapter fittings such as fittings 2882, 2884, 2886, 2888, 2890, 2892, for example, may promote operative structure of the module 2800 with one or more of the portions of a fluid system 2826, 2846, 2866; one or more of the fluid reservoirs 2830, 2850, 2870; and/or other suitable fluidic structures in operative association with the check valve module 2800.

Figure 39:
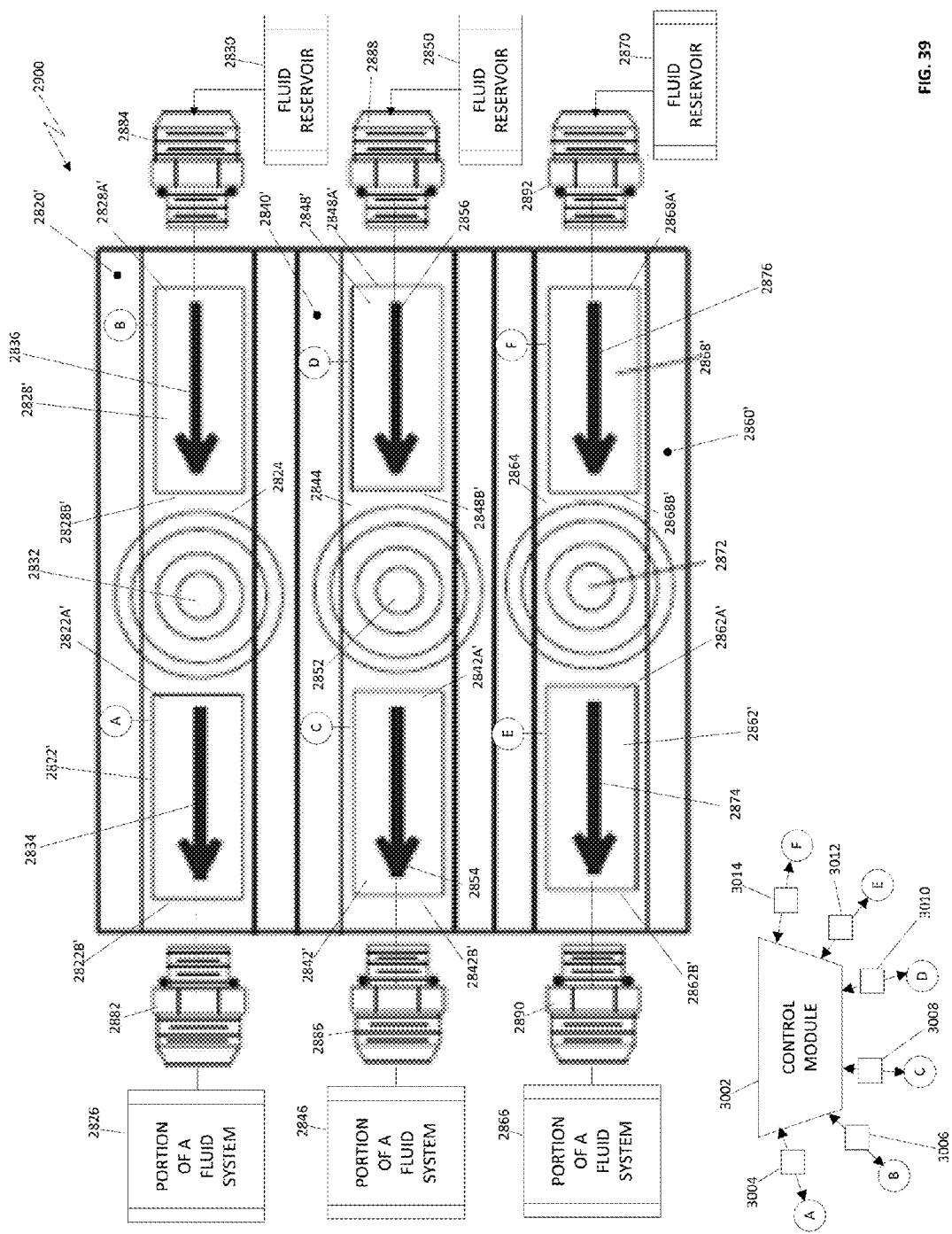
FIG. 39 includes a schematic representation of an electronic valve module provided in accordance with various embodiments shown in FIG. 38.

Referring now to FIG. 39, an electronic valve module 2900 structured and operative substantially similarly to the check valve module of FIG. 38 (see previous discussion) is provided. In the embodiments of FIG. 39, inserted in place of the check valves 2822, 2828, 2842, 2848, 2862, 2868, respectively, are a plurality of electronic valves 2822', 2828', 2842', 2848', 2862', 2868'. In analogous accordance with the embodiments of FIG. 38, the electronic valve assemblies 2820', 2840', 2860' of FIG. 39 may be coupled or ganged together to form the electronic module 2900. The individual assemblies 2820', 2840', 2860' may be coupled together by a conventional device or method such as by welding the assemblies 2820', 2840', 2860' to each other, for example. It can be seen that the module embodiments described herein provide substantially compact and central locations for performance of various fluid operations such as fluid refill, fluid evacuation, and filter purge operations performed on a machine, for example.

In various embodiments, a control module 3002 may be operatively associated with one or more of the electronic valves 2822', 2828', 2842', 2848', 2862', 2868' to actuate the valves 2822', 2828', 2842', 2848', 2862', 2868' upon sensing a predetermined pressure level, for example, within one or more of the assemblies 2820', 2840', 2860' of the electronic module 2900. One or more sensors such as pressure sensors 3004, 3006, 3008, 3010, 3012, 3014, for example, may be operatively associated with the control module 3002 and/or the electronic valves 2822', 2828', 2842', 2848', 2862', 2868', respectively, to provide pressure level information, for example, to the control module 3002.

The sensor 3004 associated with the first electronic valve 2822' of the first electronic valve assembly 2820' of the module 2900, for example, may be configured to communicate a signal indicative of application of positive pressure 2834 at the common refill/evacuation location 2824, which response to the positive pressure 2834 includes actuating the first electronic valve 2822' to permit fluid flow therethrough. As applied herein with respect to pressure levels, the term "positive" means pressure which is at a level sufficient to move a fluid or fluids in the direction of the positive pressure flow 2834 (e.g., fluid moving in a direction from the inlet/outlet port 2832 to an inlet 2822A' of the first electronic valve 2822'). During a refill operation, for example, application of positive pressure 2834 at the common refill/evacuation location 2824, and subsequent actuation of the first electronic valve 2822' by the control module 3002, for example, together permit fluid to flow from the inlet/outlet port 2832, through the first electronic valve 2822' to the portion of the fluid system 2826.

In addition, the sensor 3006 associated with the second electronic valve 2828', for example, may be configured to communicate a signal indicative of application of negative pressure 2836 at the common refill/evacuation location 2824, which response to the negative pressure 2836 includes actuating the second electronic valve 2828' and permitting fluid to flow therethrough. As applied herein with respect to pressure levels, the term "negative" means pressure which is at a level sufficient to move a fluid or fluids in the direction of the negative pressure flow 2836 (e.g., fluid moving in a direction from an outlet 2828B' of the second electronic valve 2828' to the inlet/outlet port 2832). During an evacuation operation, for example, application of negative pressure 2836 at the common refill/evacuation location 2824, and subsequent actuation of the second electronic valve 2828', permit fluid to flow through the second electronic valve 2828' to the inlet/outlet port 2832 of the assembly 2820'. It can be appreciated that the present systems and methods permit alternative positive pressure fluid operations or negative pressure fluid operations to be performed at the common refill/evacuation location 2824.

It can be seen that multiple electronic valve assembly configurations (e.g., such as the module 2900 that includes the electronic valve assemblies 2820', 2840', 2860') permit multiple fluid operations such as refill operations, evacuation operations, and/or filter purge operations, for example, to be performed on multiple fluid reservoirs. It can be appreciated that any number of electronic valve assemblies may be provided in a module within the scope of the present methods and systems. The illustration of three separate electronic valve assemblies 2820', 2840', 2860' in FIG. 39, for example, is merely for purposes of convenience of disclosure. More or less electronic valve assemblies may be employed in operative association with fluid systems configured in accordance with the present invention.

Figure 40:
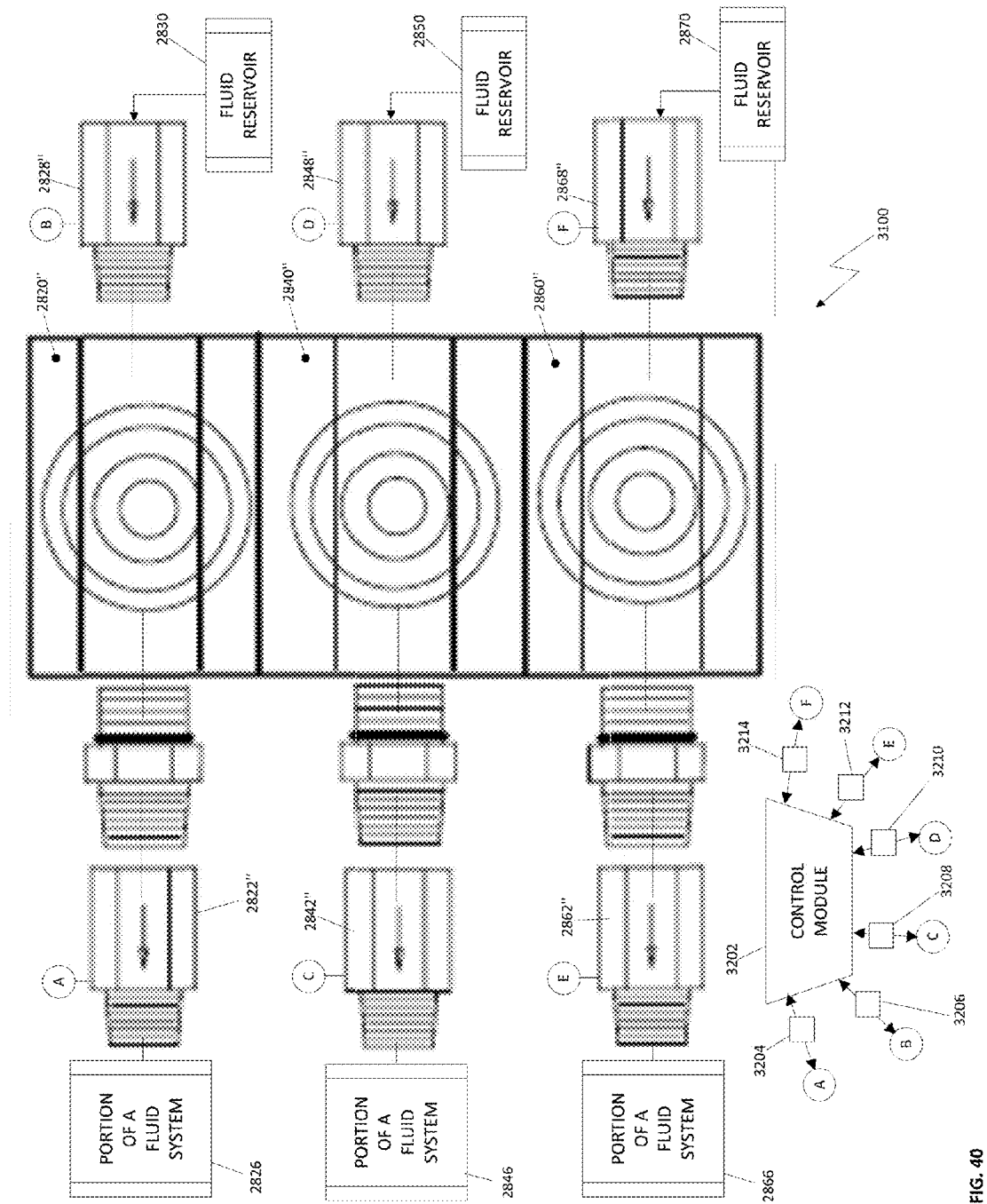
FIG. 40 includes a schematic representation of a valve module provided in accordance with various embodiments of FIGS. 38 and 39.

Referring now to FIG. 40, alternative embodiments of a module 3100 are provided in analogous structural and operative accordance with the embodiments of FIGS. 38 and 39 (see above). As shown, valves 2822" and 2828" may be threadedly received into a first assembly 2820" of the module 3100; valves 2842" and 2848" may be threadedly received into a second assembly 2840" of the module 3100; and/or valves 2862" and 2868" may be threadedly received into a third assembly 2860" of the module. In various embodiments, the valves 2822", 2828", 2842", 2848", 2862", 2868" may be, where operatively appropriate for the module 3100, check valves, electronic valves, or a combination of both check valves and electronic valves.

In various embodiments, a control module 3202 may be operatively associated with the module 3100. As shown in FIG. 40 by way of illustration, the control module 3002 may be operatively associated with one or more of the valves 2822", 2828", 2842", 2848", 2862", 2868" (which comprise electronic valves in this example) to actuate the valves 2822", 2828", 2842", 2848", 2862", 2868" upon sensing a predetermined pressure level, for example, within one or more of the assemblies 2820", 2840", 2860" of the module 3100. In accordance with prior discussion hereinabove, one or more sensors such as pressure sensors 3204, 3206, 3208, 3210, 3212, 3214, for example, may be operatively associated with the control module 3202 and/or the electronic valves 2822", 2828", 2842", 2848", 2862", 2868", respectively, to provide pressure level information, for example, to the control module 3002.

It can be seen that the various embodiments of valve assemblies and valve systems described herein purge pre-filter portions, filter portions and/or post-filter portions of the various fluid systems described herein. It can be appreciated that any one or more of the fluid operation method steps described herein, alone or in combination, may be performed in accordance with the present systems and methods. The steps may be employed to perform a variety of fluid operations including, for example and without limitation, refill, evacuation, and/or filter purge operations.

Where applicable and operational in the context of various embodiments of valve assemblies and systems described herein, one or more valves may be in a normally closed or normally open position prior to, during, or after performance of a particular fluid operation. In addition, one or more types of valves may be employed in certain embodiments of the present systems and methods (e.g., all check valves may be used, all electronic valves may be used, or some reasonable combination of both check valves and electronic valves may be employed).

It can be appreciated that, where applicable and operational in the context of various embodiments of valve assemblies and systems described herein, performing a refill fluid operation to a pre-filter portion of a fluid system improves filtration of the refill fluid. In various embodiments, the refill fluid encounters at least one filter, for example, before the refill fluid encounters various other operative components of the fluid system.

Referring again to FIGS. 34, 35, 39 and 40 (and in analogous structural, functional and operational accordance with prior discussion hereinabove with reference to FIG. 20, in particular), one or more of the control modules 2316, 2502, 3002, 3202 may include various components for controlling and monitoring a fluid system, as well as for monitoring, collecting and analyzing data associated with the various fluid system and method embodiments described herein. For example, the various sensors described in FIGS. 34, 35, 39 and 40 can include, for example and without limitation, sensors to detect temperature, pressure, voltage, current, contaminants, cycle time, flow sensors (presence or absence of flow), automatic "off" of one or more pumps in a fluid system, and/or other sensors suitable for detecting various conditions experienced by a machine and its components. The control modules 2316, 2502, 3002, 3202 may also include one or more data storage media for storing, retrieving and/or reporting data communicated to the control modules 2316, 2502, 3002, 3202. Data stored within these data storage media may include a variety of data collected from the condition of a fluid system including, for example and without limitation, oil condition, particle count of contaminants, cycle time data for time to evacuate or time to refill a given reservoir, time stamp data on a reservoir-by-reservoir basis, time stamp data on a system-by-system basis, fluid receptacle or other fluid storage/retention medium. In addition, the control modules 2316, 2502, 3002, 3202 may include controls that actuate (e.g., open or close) their respectively associated electronic valves in accordance with pressure levels, for example, sensed at various inlets or outlets of the electronic valves.

Data can be communicated to the control modules 2316, 2502, 3002, 3202 to and/or from a fluid system through a variety of methods and systems. In various embodiments disclosed herein, data may be communicated, for example, by a wireline connection, communicated by satellite communications, cellular communications, infrared and/or communicated in accordance with a protocol such as IEEE 802.11, for example, or other wireless or radio frequency communication protocol among other similar types of communication methods and systems. One or more data devices can be employed in operative association with the control modules 2316, 2502, 3002, 3202 for the purpose of receiving, processing, inputting and/or storing data and/or for cooperating with the control modules 2316, 2502, 3002, 3202 to control, monitor or otherwise manipulate one or more components included within a fluid system. Examples of data devices include, for example and without limitation, personal computers, laptops, and personal digital assistants (PDA's), and other data devices suitable for executing instructions on one or more computer-readable media.

In certain embodiments, the various sensors described in FIGS. 34, 35, 39 and 40 can be configured to detect one or more of the following conditions within a fluid system: engine oil pressure, oil temperature in the engine, amount of current drawn by a pre-lubrication circuit, presence of contaminants (such as oil contaminants, for example) in the engine, amount of time that has elapsed for performance of one or more cycles of various engine operations (i.e., cycle time) such as fluid purge operations, pre-lubrication operations, fluid evacuation operations, fluid refill operations, fluid flow rates, and others. One example of a sensor that may be used in accordance with various embodiments of the present systems and methods is a contamination sensor marketed under the "LUBRIGARD" trade designation (Lubrigard Limited, United Kingdom, North America, Europe). A contamination sensor can provide information regarding oxidation products, water, glycol, metallic wear particles, and/or other contaminants that may be present in the engine oil, hydraulic oil, gearbox oil, transmission oil, compressor oil and/or other fluids used in various machines. In various aspects of the present methods and systems, the contamination sensor may be employed during one or more fluid processes, for example, such as a fluid evacuation operation or a fluid refill operation.

It can be appreciated that the control modules 2316, 2502, 3002, 3202 may receive and store data associated with activation and deactivation of various components of a fluid system and operation of a machine, such as an engine, for example, included within the fluid system. Cycle time, for example, can be calculated from analysis of collected data to provide an indication of elapsed time for completing evacuation and/or refill operations. For a given oil temperature or temperature range (e.g., as can be detected and communicated by a temperature sensor), an average cycle time, for example, can be calculated through analysis of two or more collected cycle times. In various aspects, the present methods and systems can determine whether the most recently elapsed cycle time deviates from a nominal average cycle time, or range of cycle times, for a given oil temperature or temperature range. In addition, factors may be known such as the type and viscosity of fluids (e.g., such as oil) used in connection with operation of the machine. An unacceptable deviation from a nominal cycle time, or range of times, can result in recording a fault in data storage media of the control modules 2316, 2502, 3002, 3202. It can be appreciated that many other types of fault conditions may be detected, analyzed and recorded in connection with practice of the present systems and methods.

Collected and analyzed data, as well as recorded fault events, can be stored in association with the control modules 2316, 2502, 3002, 3202, internal data modules associated with the control modules 2316, 2502, 3002, 3202, and/or at a remote location. In various embodiments, the control modules 2316, 2502, 3002, 3202 may be configured for operation as integral components of a machine or as remote components not installed locally on the machine. The collected and analyzed information can be stored in one or more data storage media of the control modules 2316, 2502, 3002, 3202. The information can also be stored externally with respect to a machine and its components. Data may be transmitted wirelessly by a radio frequency communication or by a wireline connection from the control modules 2316, 2502, 3002, 3202 to one or more data devices such as a personal digital assistant, for example, configured and employed as a computer system for receiving and processing data collected from the control modules 2316, 2502, 3002, 3202 during fluid evacuation and fluid refill processes.

In one illustrative example, information related to an oil filter purge operation, such as the date and time of the filter purge or the cycle time of the filter purge, for example, and/or other machine conditions can be recorded and processed in connection with operation of the control modules 2316, 2502, 3002, 3202. In addition, the condition (e.g., open or closed) of various valve inlets and outlets, and the date/time at which they are actuated, may be detected, recorded and/or analyzed for various fluid operations. In accordance with the systems and methods disclosed herein, data may be collected and recorded on a reservoir-by-reservoir basis and/or on a fluid system-by-fluid system basis as service is performed on a machine, for example.

Referring now to FIGS. 41A through 41C, various embodiments of a connection/disconnection detection system 4000 are provided in accordance with the present invention. As shown, a first coupling portion 4002 is fluidically connected to a portion of a first fluid system 4003 (shown partially for convenience of illustration), and a second coupling portion 4004 is fluidically connected to a portion of a second fluid system 4005 (shown partially for convenience of illustration). In various embodiments, the first and second fluid systems may be structured as independently operated fluid systems or may be structured for operation as part of a single fluid system. The first coupling portion 4002 may include one or more electrical contacts 4006, 4008 and the second coupling portion 4004 may include at least one electrical contact 4010.

As shown in FIG. 41B, upon connection of the first coupling portion 4002 to the second coupling portion 4004, an operative association is established among the electrical contacts 4006, 4008, 4010. In the example shown, connection of the coupling portions 4002, 4004 is established by inserting the second coupling portion 4004 into the first coupling portion 4002 and rotating the second coupling portion 4004 in the direction of the arrow 4011. It can be appreciated, however, that any suitable method or device for connecting the coupling portions 4002, 4004 may be employed within the scope of the present invention. In certain embodiments, the electrical contacts 4006, 4008, 4010 may be replaced with any suitable device or method for establishing an electrical operative association using the coupling portions 4002, 4004. Examples of other devices include, without limitation, sensors, contact switches, magnetic switches, Hall effect sensors, and/or any other operationally and structurally suitable devices.

In various embodiments, the electrical contacts 4006, 4008 are operatively associated with a signal processor 4012. The signal processor 4012 may include a sensor/receiver 4014 for receiving an electrical signal from the contacts 4006, 4008 once the contact 4010 of the first coupling portion 4002 completes an electrical circuit with the contacts 4006, 4008 of the second coupling portion 4004 upon connection of the coupling portions 4002, 4004. A transmitter 4016 may be included within the signal processor 4012 for transmitting the electrical signal representative of the connection and/or data representative of the electrical signal to a control module 4018. The control module 4018 may be configured to function in accordance with the various embodiments of control modules described previously herein. For example, the control module 4018 may record in a suitable storage medium a date and/or a time when connection or disconnection of the coupling portions 4002, 4004 has occurred.

Referring now to FIG. 41C, in another mode of operation of the connection/disconnection detection system 4000, the second coupling portion 4004 may be moved in the direction of the arrow 4026 to initiate disconnection of the second coupling portion 4004 from the first coupling portion 4002. As shown, the disconnection of the coupling portions 4002, 4004 results in disassociation of the electrical contact 4010 from the electrical contacts 4006, 4008. In various embodiments, the sensor/receiver 4014 of the signal processor 4012 may be configured to detect this disassociation of the electrical contacts 4006, 4008, 4010. An electrical signal representative of the disconnection and/or a data signal representative of the disconnection of the coupling portions 4002, 4004 may be transmitted through the transmitter 4016 for further processing by the control module 4018. For example, the control module 4018 may record in a suitable storage medium a date and/or a time when the disconnection of the coupling portions 4002, 4004 occurred.

The signal processor 4012 further may include a power source 4020 for supplying power to operate the various components of the signal processor 4012. In certain aspects, the power source 4020 may receive electrical energy, for example, from a battery 4022 of a machine 4024 for which various fluid operations are performed.

Figure 41D:
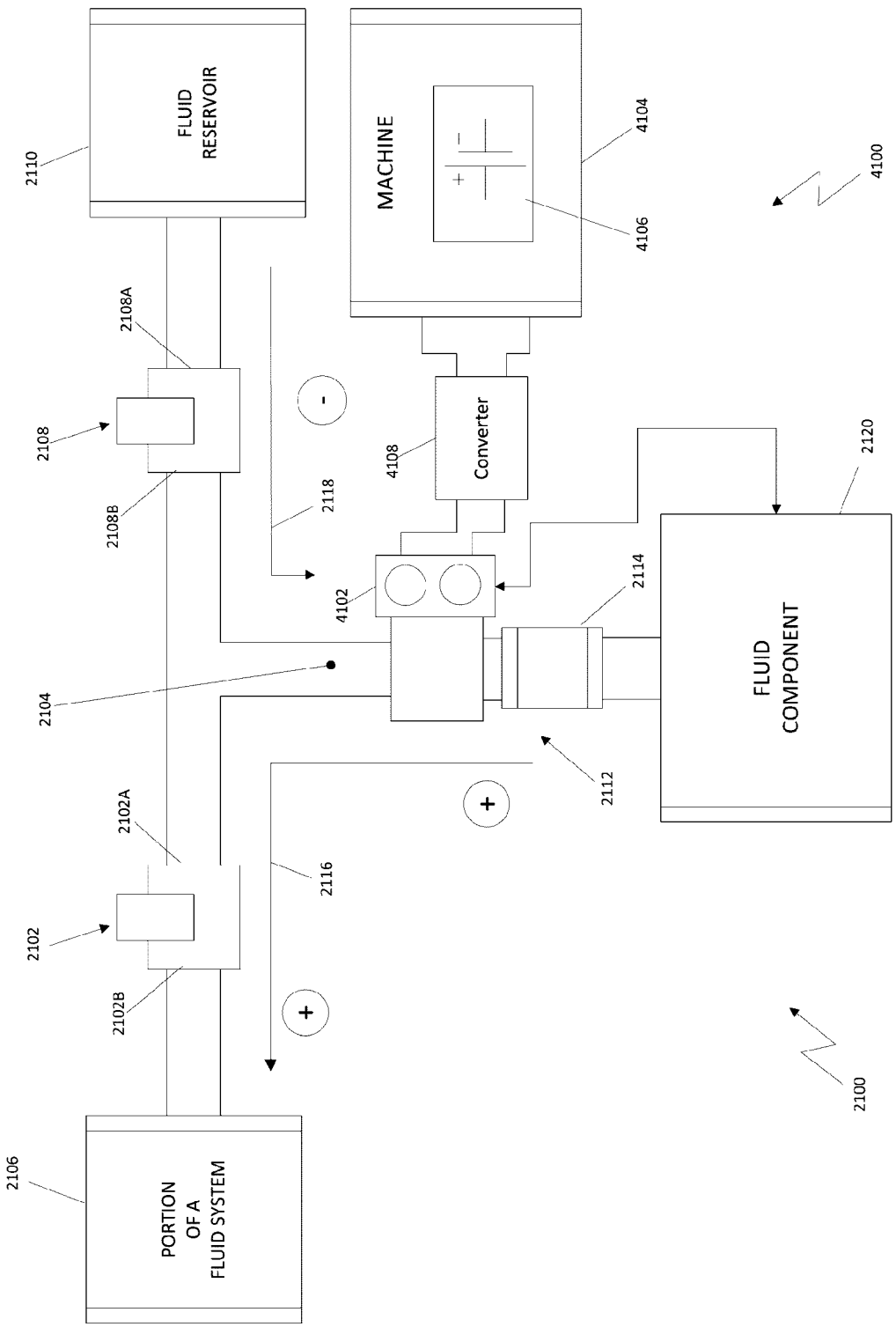
FIG. 41D includes a schematic representation of a power supply system provided in accordance with various embodiments of the present invention.

Referring now to FIG. 41D, embodiments of a power supply system 4100 provided in accordance with the present invention are shown. For convenience of disclosure, embodiments of the present invention illustrated in FIG. 32 (previously discussed) are shown in operative association with the power supply system 4100. It can be appreciated that the power supply system 4100 may be applied, where structurally and functionally appropriate, to various embodiments of fluid systems, assemblies and other fluidic components and fluid operations described herein.

The power supply system 4100 may include a power receptacle 4102 structured to receive a power cord, for example, or other electrically operative connection to one or more of the fluid components 2120. In various embodiments, the power receptacle 4102 is positioned in a location adjacent to or in the vicinity of a fluidic structure, such as the inlet/outlet port 2112, for example. The power receptacle 4102 may be electrically associated with a machine 4104 for which one or more fluid service operations are performed. In certain embodiments, the power receptacle 4102 may be electrically operatively associated with a battery 4106, for example, or other power source of the machine 4104. A converter 4108 may be optionally included within the power supply system 4100 to convert a DC power source of the machine 4104, for example, to an AC power source at the power receptacle 4102, for example, which is accessible for electrical connection of the fluid component 2120 to the power receptacle 4102. In certain embodiments the battery 4106 of the machine 4104 may be replaced or supplemented with an off-board power source, for example, or another power source external to the operation of the machine 4104. Furthermore, it can be appreciated that the fluid components 2120, of either the on-board or off-board variety, may have their own independent power sources in lieu of or in addition to external power sources such as the battery 4106 of the machine 4104, for example.

The benefits of the present systems and methods will be readily apparent to those skilled in the art. Systems and methods for selectively and/or sequentially performing fluid evacuation and/or refill processes can be useful in performing service and maintenance operations on machines. Such capabilities can ultimately improve the performance and useful life of machines for which such orchestrated fluid evacuation and/or fluid refill procedures are performed. In addition, the use of controls, monitoring, and data storage and analysis in connection with performing multiple fluid evacuation and/or refill processes can further enhance the overall effectiveness of service and maintenance operations performed on a variety of machines.

Various aspects of the invention reflect that the inventor has developed enhanced fluid filtration methods, system, and techniques that can leverage the function of a supplemental pump in conjunction with the existing components of a machine, such as the main pump of a machine with an engine, for example. In various embodiments, a supplemental filter apparatus may be operatively associated with the supplemental pump and/or a main pump of the machine to provide filtration of fluid flowing through the machine. The filtered fluid can then be returned to one or more fluid reservoirs of the machine through an appropriate fluid communication path. In addition, in certain embodiments a control module may be employed in operative association with the supplemental pump, one or more components of the machine, and/or a valve system or valve arrangement. The control module may be programmed to activate or deactivate the supplemental pump, for example, in association with detecting the existence of one or more kinds of filter triggering conditions. Such filter triggering conditions may be associated with a condition of the fluid (e.g., viscosity or the presence of contaminants), an operational state of one or more components the machine (e.g., engine speed or main pump pressure), occurrence of a predetermined event (e.g., a fixed time), and/or a variety of other potential triggering conditions or events. One or more sensors may be operatively associated with the control module to detect and to provide signals indicative of machine conditions or fluid conditions in connection with operation of the machine or the supplemental pump, for example. In various embodiments, operation of the supplemental pump may provide the function or effect of a "kidney loop" arrangement, as that term is understood by those skilled in the art of performing fluid processes or other maintenance on machines, including heavy machinery. In certain embodiments, a main pump of machine may operate independently and/or in conjunction with the supplemental pump to perform various kidney loop or other filtering operations as described in more detail herein.

The inventor has realized that machines that require filtered fluids often cannot effectively filter smaller particle sizes due to the fact that fine filtration media require either substantially high pressure across the filter, which can cause excessive parasitic power losses. Such fine filter media often require a substantial amount of installation space within the machine, which can cause unacceptably high filter manufacturing and disposal costs, and adds weight and size to the machine design. In addition, filter media may not allow through-flow sufficient to provide the fluid pressure needed to adequately lubricate the machine components. Therefore, equipment designers have usually compromised by using a coarse filter media that delivers adequate flow but only removes relatively larger particles from fluid. Also, certain equipment manufacturers have designed machines that direct a small amount of fluid flow through a fine filter media with the intent that most fluid in the machine will eventually pass through the fine filter. However, fine particles are constantly being created or introduced into the fluid system, and the particles are typically present in greater concentrations than desired. In certain situations, to maximize the pressure drop across the fine filter media, equipment designers have connected the outlet of the filter media to a low pressure zone (e.g., an engine sump). But since this fluid flow is not being supplied to the system needing lubrication, the main pump must be oversized to produce the excess flow. Various embodiments of the present invention can be structured to generate such excess flow only as needed to maintain a desired level of particle count, for example, or when the parasitic power required can be produced more efficiently. For example, by sending fluid flow from a prelubrication or refill process through a fine filter media, parasitic power required to filter the fluid can be reduced. In certain embodiments, fluid can be passed through the fine filter media during periods when the system would otherwise be decelerated by braking activity, for example, and embodiments of the invention can be structured to minimize the parasitic power required to filter this fluid. In addition, this additional load could be usefully applied to enhance the braking power of the machine.

Figure 42:
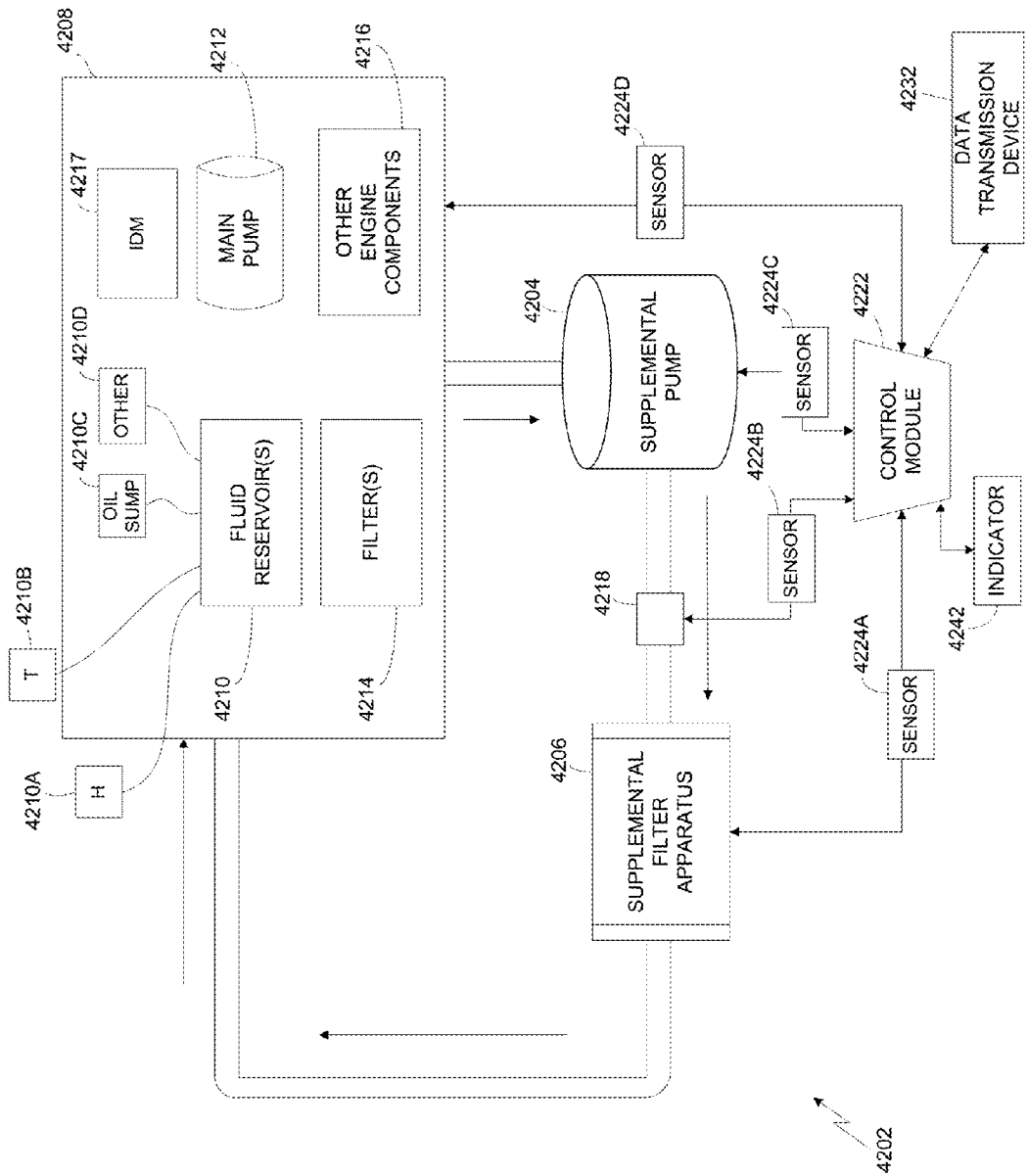
FIG. 42 schematically illustrates an example of a fluid filtration apparatus structured in accordance with various embodiments of the invention.

FIG. 42 schematically illustrates an example arrangement of a machine 4202 operatively associated with a fluid filtration apparatus including a supplemental pump 4204 and a supplemental filter apparatus 4206 in accordance with various embodiments of the invention. As shown, the machine 4202 may include an engine 4208 comprising one or more fluid reservoirs 4210 (e.g., hydraulic fluid reservoir 4210A, transmission fluid reservoir 4210B, oil sump 4210C, or various other fluid reservoirs 4210D). The engine 4208 may also include a main pump 4212 that performs primary fluid processing for the engine 4208, such as pumping oil, air, or other fluids through the engine 4208, for example. One or more filters 4214 may be included in the engine, as well as potentially a variety of other engine components 4216. In various embodiments, the supplemental filter apparatus 4206 and/or the filters 4214 may include one or more of an electrical filter, a magnetic filter, a centrifugal filter, a paper-based filter, or a synthetic filter. In certain embodiments, the supplemental pump 4204 may be positioned onboard with respect to the machine 4202 and/or the engine 4208.

In various embodiments, the machine 4202 may be structured with one or more fluid components 4218. The fluid component 4218 may include one or more of the following fluidic structures, for example and without limitation: a pump that is off-board with respect to the machine 4202; a pump that is on-board with respect to the machine 4202; a flow control means such as a hand-held device, for example; a bracket or evacuation bracket; and/or, a quick-disconnect structure. The fluid component 4218 may also be one or more other types of components, devices, or systems suitable for supplying positive and/or negative fluid pressure to one or more fluid inlet ports or fluid outlet ports associated with the fluid component 4218. For example, the fluid component 4218 may be employed to perform one or more types of fluid evacuation processes and/or fluid refill processes (e.g., oil changes or other machine 4202 maintenance operations) in association with different fluid reservoirs 4210, for example, of the machine 4202. It can be appreciated that the fluid component 4218 may be positioned in one or more other places within the fluid system or valve system of the machine 4202.

In various embodiments, a control module 4222 may be operatively associated with the machine 4202 to collect, process, and/or communicate data indicative of operational states, triggering conditions, machine 4202 conditions, component functions, events, or other like data. For example, the control module 4222 may be programmed to activate or deactivate the supplemental pump 4204; to receive, transmit, and/or process data signals in communication with one or more components of the machine 4202; and/or, to process or analyze data communicated from one or more sensors 4224A-4224D that can be operatively associated with various parts of the machine 4202. For example, the sensor 4224A may be configured to detect contaminants or other aspects of fluid composition associated with fluid flow passing through the supplemental filter apparatus 4206. The control module 4222 may include one or more processors or computer systems programmed with software, firmware, or other computer-executable instructions to perform the various functions of the control module 4222. The control module 4222 may be operatively associated with one or more data transmission devices 4232 which may receive and/or store data received or processed by the control module 4222. In certain embodiments, the control module 4222 may communicate signals to one or more indicators 4242 which reflect the activity or function of different aspects of the control module 4222. For example, one such indicator 4242 may include a warning light, or an alert graphical display positioned on the console of a vehicle in which the machine 4202 is installed. In certain embodiments, the control module 4222 may activate or deactivate a valve system or otherwise operate a valve or valve apparatus in connection with a filter triggering condition, for example.

Figure 42A:
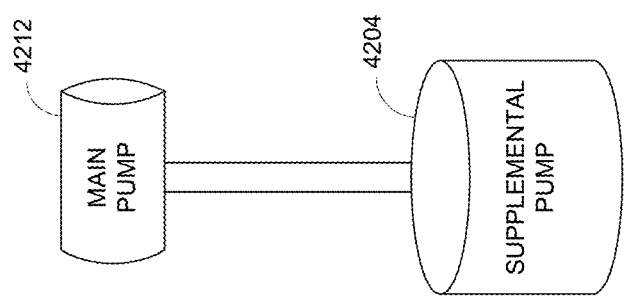
FIG. 42A schematically illustrates a supplemental pump connected for fluid communication with a main pump of a machine.

Referring again to FIG. 42, in the example shown, the machine 4202 includes a fluid filtration apparatus comprising the supplemental pump 4204 and the supplemental filter apparatus 4206. The supplemental pump 4204 may be connected for fluid communication with the main pump 4212 of the engine 4208. For example, FIG. 42A illustrates an arrangement in which the supplemental pump 4204 is operatively connected for communicating fluid with the main pump 4212. In certain embodiments, the supplemental pump 4204 may be a pre-lubrication pump, for example, or an existing pump such as a component of a power steering system or a power braking system operatively associated with the machine 4202. The supplemental pump 4204 may be structured for fluid communication with at least one component of the engine 4208, such as one or more of the fluid reservoirs 4210. The supplemental filter apparatus 4206 may be positioned in fluidic series with the supplemental pump 4204 and structured with an inlet for receiving fluid flow from the supplemental pump 4204. The supplemental filter apparatus 4206 may be structured with an outlet to direct the fluid flow to one or more of the fluid reservoirs 4210, or other components, of the engine 4208. From the outlet or discharge side of the supplemental filter apparatus 4206, fluid may be directed to flow to a primary oil filter 4214 of the engine 4208, for example. In various embodiments, the supplemental filter apparatus 4206 may include at least one fine filtration medium. In certain embodiments, one of the filters 4214 of the engine 4208 may be positioned between the outlet of the supplemental filter apparatus 4206 and one or more of the fluid reservoirs 4210 of the engine 4208.

In various embodiments, the control module 4222 may be programmed to perform one or more functions upon detecting the existence of various filter triggering conditions or other events. Likewise, the control module 4222 may be programmed to perform one or more functions when a filter triggering condition is no longer detected, is out of a predefined parameter range (e.g., 10% above or 10% below a predefined engine speed), or otherwise no longer exists as a triggering condition. For example, the control module 4222 may be programmed to activate or deactivate the supplemental pump 4204 in association with detecting the existence of a filter triggering condition. Examples of potential filter triggering conditions may include a combination of one or more of the following: threshold fluid temperature, threshold fluid pressure, threshold engine speed, threshold fluid contaminant level, filter condition, threshold time duration of operation, an injection timing variable, a fuel consumption value, a predetermined day or time, machine state of operation. For example, supplemental filtration can be activated as a function of oil condition, engine 4208 hours, mileage, fuel consumption, and/or engine 4208 component speed (e.g., as measured in revolutions per minute (RPM)).

In certain embodiments, engine 4208 hours may mean total time of operation, such as operation time between two or more defined points in time, or time between fluid operations such as oil changes performed on the engine 4208.

In another example, fluid condition monitoring may be performed to detect a filter triggering condition, such as particle count, particle accumulation, oxidation level, and/or fluid dilution level. In various embodiments, a contaminant sensor may be configured to detect soot levels, for example, or the presence of other contaminants in a fluid flowing through the machine 4202. For example, a filter triggering condition may be employed that corresponds with a maximum soot level that is acceptable for desired or optimum engine 4208 operation, which may be specified by an original equipment manufacturer or by other engineering specifications. The control module 4222 may be programmed to activate the supplemental filter apparatus 4206 upon reaching the predetermined soot level for the specifications of a given engine 4208. In another example, the supplemental filter apparatus 4206 may function to remove a dilutant such as water, for example, from oil or fuel employed by the machine 4202.

In various embodiments, a filter triggering condition may involve a deviation from a predetermined range for an engine 4208 idle speed, a turbo boost pressure, a fuel consumption rate, a waste gate function, or an injection rate, for example. In addition, calculated values such a fuel-to-air ratio can be considered at least part of a filter triggering condition. For example, clogging an air filter in the engine 4208 can cause a change in the fuel-to-air ratio, in addition to potentially causing the fuel to increase its soot level. Other factors related to combustion chemistry, or other phenomena that impact quality of combustion, may also form the basis for defining a filter triggering condition.

The inventor has recognized that arrangements such as the one illustrated in FIG. 42 can provide more than a partial bypass for the machine 4202. In one embodiment, the fluid filtration apparatus may be employed to draw fluid flow from a reservoir or oil sump of the engine 4208, for example, and divert more than 15 percent of the oil flow through the engine 4208 through a two to five micron supplemental filter apparatus 4206 using the main pump 4212 of the engine 4208. In various embodiments, the filter apparatus provides full flow from the engine 4208 through the supplemental filter apparatus 4206 by using the supplemental pump 4204.

Figure 43:
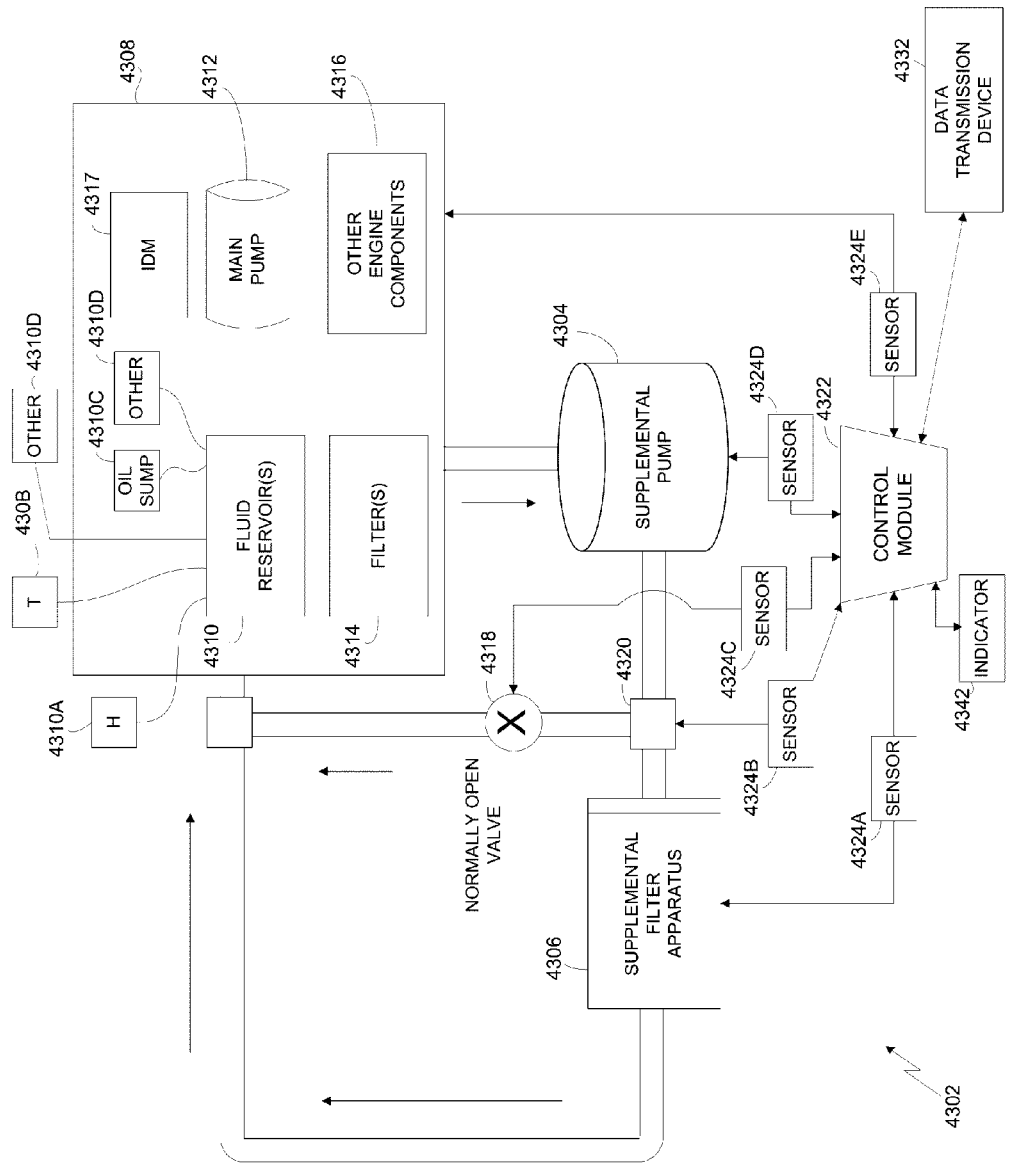
FIG. 43 schematically illustrates an example of a fluid filtration apparatus structured in accordance with various embodiments of the invention.

FIG. 43 schematically illustrates another example of a fluid filtration apparatus structured for operation in a machine 4302 in accordance with various embodiments of the invention. The fluid filtration apparatus includes a supplemental pump 4304 structured for fluid communication with a supplemental filter apparatus 4306 and at least one component of an engine 4308. The engine 4308 may include multiple fluid reservoirs 4310 having different types of fluids (e.g., hydraulic fluid reservoir 4310A, transmission fluid reservoir 4310B, oil sump 4310C, or various other fluid reservoirs). The engine 4308 may also include a main pump 4312 that performs primary fluid processing for the engine 4308, such as pumping oil, air, or other fluids through the engine 4308, for example. One or more filters 4314 may be included in the engine 4308, as well as potentially a variety of other engine components 4316. In various embodiments, the supplemental filter apparatus 4306 and/or the filters 4314 may include one or more of an electrical filter, a magnetic filter, a centrifugal filter, a paper-based filter, or a synthetic filter. In certain embodiments, the supplemental pump 4304 may be positioned onboard with respect to the machine 4302 and/or the engine 4308.

As shown, the inlet of the supplemental filter apparatus 4306 may be connected to the outlet of the supplemental pump 4304. A valve apparatus 4318 may be provided with an inlet connected at a common junction between an outlet of the supplemental pump 4304 and an inlet of the supplemental filter apparatus 4306. The outlet of the valve apparatus 4318 may also be connected at a common junction of an outlet of the supplemental filter apparatus 4306 and one or more components of the engine 4208, such as one or more of the fluid reservoirs 4310A-4310D. In various embodiments, the valve apparatus 4318 may include a normally open valve, for example.

In various embodiments, a control module 4322 may be programmed to actuate at least one of the normally open valve in the valve apparatus 4318 or to activate the supplemental pump 4304 in association with detecting a filter triggering condition (including filter triggering conditions described in other places herein). Likewise, the control module 4322 may be programmed to activate or deactivate the supplemental pump 4304 as appropriate in accordance with various filter triggering conditions. For example, the control module 4322 may be programmed to activate at least one of the normally open valve in the valve apparatus 4318 or to activate the supplemental pump 4304 at a predetermined time during operation of the machine 4302. In certain embodiments, the control module 4322 may be programmed to activate or deactivate the supplemental pump 4304; to receive, transmit, and/or process data signals in communication with one or more components of the machine 4302; and/or, to process or analyze data communicated from one or more sensors 4324A-4324E as operatively associated with various parts of the machine 4302. For example, the sensor 4324A may be configured to detect contaminants or other aspects of fluid composition associated with fluid flow passing through the supplemental filter apparatus 4306.

The control module 4322 may include one or more processors or computer systems programmed with software, firmware, or other computer-executable instructions to perform the various functions of the control module 4322. The control module 4322 may be operatively associated with one or more data transmission devices 4332 which can store and/or process data received or processed by the control module 4322. In certain embodiments, the control module 4322 may communicate signals to one or more indicators 4342 which reflect the activity or function of different aspects of the control module 4322. For example, one such indicator 4342 may include a warning light, or an alert graphical display positioned on the console of a vehicle in which the machine 4302 is installed. In certain embodiments, the control module 4322 may activate or deactivate a filter system or otherwise operate a valve or valve apparatus in connection with a filter triggering condition. For example, the control module 4322 may be programmed to actuate the normally open valve of the valve apparatus 4318 to employ or to bypass the supplemental filter apparatus 4306 under appropriate circumstances or in association with a detected filter triggering condition.

It can be seen that the arrangement illustrated in FIG. 43 can be embodied as a filtration system (as supplied in part by the supplemental filter apparatus 4306) in parallel with a prelubrication system (as supplied in part by the supplemental pump 4304). The normally open valve of the valve apparatus 4318 may represent a usual primary flow of fluid through the supplemental pump 4304 back to the engine 4308. In one operating state, the normally open valve of the valve apparatus 4318 can be closed to direct a primary fluid flow through the supplemental filter apparatus 4306. In another operating state, the normally open valve of the valve apparatus 4318 can be opened to direct the primary fluid flow away from the supplemental filter apparatus 4306 and back to the engine 4308. It can be seen that the filtration system of FIG. 43 can be useful in the event that a fine filter associated with the supplemental filter apparatus 4306 becomes too restrictive, which might result from a clogged filter, for example. In one example, a filter triggering condition may result in opening the normally open valve of the valve apparatus 4318 when an oil temperature is below a threshold temperature and when a flow rate through the supplemental filter apparatus 4306 is below a threshold rate. In another example, the filter triggering condition which results in actuating the valve apparatus 4318 may detect a threshold fluid pressure at various points within the machine 4302. In another example, supplemental filtration by the supplemental filter apparatus 4306 may be engaged based on condition monitoring of the fluid to regulate when and how long the supplemental pump 4304 is activated.

In certain embodiments, a filter triggering condition can be logged by the control module 4322 as a fault condition, such as when fluid pressure is too high at the supplemental filter apparatus 4306 perhaps indicating that the filter medium needs to be cleaned or changed. In addition, a filter triggering condition may be accompanied by activating or deactivating an indicator 4342 in connection with the filter triggering condition. For example, a high fluid pressure filter triggering condition may cause an indicator 4342 in the operator area of the machine 4308 to activate, signaling to the operator that the filter medium of the supplemental filter apparatus 4306 needs to be changed.

The inventor has recognized that there are advantages in determining whether to use the supplemental pump 4304 to direct fluid flow through a filter 4314 of the engine 4308 or directly to an appropriate fluid reservoir 4310. For example, fluid that has passed through the supplemental filter apparatus 4306 may be sufficiently clean so as not to require further filtering through a filter 4314 of the engine 4308. In another example, directing fluid flow with the supplemental pump 4304 from the supplemental filter apparatus 4306 into a filter 4314, oil rifle, and bearings of the engine 4308 can boost oil pressure. Such a boost in oil pressure may be useful at times when the engine 4308 is idling, for example, or during other states of machine 4302 operation when a boost in oil pressure or other fluid pressure is required. It can be seen that this arrangement can boost engine oil pressure while lowering the power required by the engine 4308. In other words, one of the problems identified by the inventor is that typically the oil pump on the engine 4308 has to be oversized in order to deliver sufficient lubrication during engine 4308 idle. Accordingly, the oil pump is often oversized to deliver appropriate pressure at engine 4308 idle speed, even though such an oil pump is larger than it has to be to deliver pressure at comparatively higher engine 4308 speeds achieved during machine 4302 operation. In various embodiments, use of the filtration system including the supplemental pump 4304 can serve as a way to downsize the flow range of the engine pump 4312.

In various embodiments, the control module 4322 may be programmed to activate the supplemental pump 4304 and direct fluid flow back to the to the filter 4214 to allow for using a smaller engine primary oil pump and/or reduce the duty cycle needed from certain engine 4308 components. This arrangement has the potential to provide supplemental fluid flow at low engine speeds 4308 in a way that can allow engine 4308 manufacturers to reduce the flow rate and thus reduce parasitic loading on the main pump 4312. Likewise, the control module 4322 may be programmed to decide when to deactivate the supplemental pump 4304. For example, deactivating the supplemental pump 4304 may be performed in response to analyzing a combination of one or more factors such as engine 4308 speed (e.g., within a tolerance range at idle speed, full speed, or other operational speeds), engine oil rifle pressure, or fluid temperature. For example, an oil regulator may be disabled if the oil is too thick (i.e., viscosity), and the engine 4308 may then run on the high pressure supplied by the supplemental pump 4304 to raise the rifle pressure.

In various embodiments, the machine 4302 may be structured with one or more fluid components 4320. The fluid component 4320 may include one or more of the following fluidic structures, for example and without limitation: a pump that is off-board with respect to the machine 4302; a pump that is on-board with respect to the machine 4302; a flow control means such as a hand-held device, for example; a bracket or evacuation bracket; and/or, a quick-disconnect structure. The fluid component 4320 may also be one or more other types of components, devices, or systems suitable for supplying positive and/or negative fluid pressure to one or more fluid inlet ports or fluid outlet ports associated with the fluid component 4320. For example, the fluid component 4320 may be employed to perform one or more types of fluid evacuation processes and/or fluid refill processes (e.g., oil changes or other machine 4302 maintenance operations) in association with different fluid reservoirs 4310, for example, of the machine 4302. It can be appreciated that the fluid component 4320 may be positioned in one or more other places within the fluid system or valve system of the machine 4302.

FIG. 44A schematically illustrates an example arrangement of a machine 4402 operatively associated with a supplemental pump 4404 and a supplemental filter apparatus 4406 in accordance with various embodiments of the invention. As shown, the machine 4402 may include an engine 4408 comprising one or more fluid reservoirs 4410 (e.g., hydraulic fluid reservoir 4410A, transmission fluid reservoir 4410B, oil sump 4410C, or various other fluid reservoirs 4410D). The engine 4408 may also include a main pump 4412 that performs primary fluid processing for the engine 4408, such as pumping oil, air, or other fluids through the engine 4408, for example. One or more filters 4414 may be included in the engine, as well as potentially a variety of other engine components 4416. In various embodiments, a fluid filtration apparatus may comprise the supplemental filter apparatus 4406 having an inlet connected at a common junction of an outlet of the supplemental pump 4404 and an inlet of a first valve 4418A. The first valve 4418A may be connected to facilitate fluid flow to the engine 4408 at a threshold level of fluid pressure. A second valve 4418B may be positioned between an outlet of the supplemental filter apparatus 4406 and an inlet of at least one component of the engine 4408. In certain embodiments, the supplemental pump 4404 may be positioned onboard with respect to the machine 4402 and/or the engine 4408.

In certain embodiments, a control module 4422 may be programmed for actuating at least one of the first valve 4418A, the second valve 4418B, or the supplemental pump 4404 in association with detecting the existence of a filter triggering condition. For example, activating and/or deactivating the supplemental pump 4404 may be performed in response to analyzing a combination of one or more factors such as engine 4408 speed (e.g., within a tolerance range at idle speed, full speed, or other operational speeds), engine oil rifle pressure, or fluid temperature. For example, an oil regulator may be disabled if the oil is too thick (i.e., viscosity), and the engine 4408 may then run on the high pressure supplied by the supplemental pump 4404 to raise the rifle pressure. Likewise, the control module 4422 may be programmed to deactivate the supplemental pump 4404 as appropriate in accordance with various filter triggering conditions. The control module 4422 may include one or more processors or computer systems programmed with software, firmware, or other computer-executable instructions to perform the various functions of the control module 4422. The control module 4422 may be operatively associated with one or more data transmission devices 4432 which can store and/or process data received or processed by the control module 4422. The control module 4422 may be programmed to activate or deactivate the supplemental pump 4404; to receive, transmit, and/or process data signals in communication with one or more components of the machine 4402; and/or, to process or analyze data communicated from one or more sensors 4424A-4424E as operatively associated with various parts of the machine 4302. In certain embodiments, the control module 4422 may communicate signals to one or more indicators 4442 which reflect the activity or function of different aspects of the control module 4422. For example, one such indicator 4442 may include a warning light, or an alert graphical display positioned on the console of a vehicle in which the machine 4402 is installed. In certain embodiments, the control module 4422 may activate or deactivate a filter system or otherwise operate a valve or valve apparatus in connection with a filter triggering condition.

In the example of a fluid filtration apparatus shown in FIG. 44A, the second valve 4418B may include a normally closed valve to resist fluid flow through the supplemental filter apparatus 4406 in a first operating mode. In this first operating mode, fluid flows through the supplemental pump 4404, through the first valve 4418A, and then back to a component of the engine 4408. In various embodiments, the first valve 4418A may include a check valve which is connected to a filter head 4414 of the engine 4408, for example. In certain embodiments, the second valve 4418B may be connected to a sump of the engine 4408. In the first operating mode when the second valve 4418B is closed, then fluid may flow through the supplemental pump 4404 to the filter 4414, such as during a pre-lubrication fluid process, for example. In a second operating mode, the second valve 4418B may be opened to enable bypass filtration of the fluid flow through the supplemental filter apparatus 4406 and back to the sump 4410C of the engine 4408, or another fluid reservoir 4410. It can be seen that back pressure through the filter 4414 during engine operation can resist fluid from flowing through the first valve 4418A. In the event that restriction of fluid flow by the supplemental filter apparatus 4406 restriction results in unacceptably high pressure, then the first valve 4418A can be actuated to allow fluid flow through the engine 4408 through the filter 4414. In other words, when the second valve 4418B is open, the part of the fluid path that leads to the engine 4408 through the first valve 4418A and the filter head 4414 is also open. For example, if the supplemental filter apparatus 4406 includes a two micron filter medium, and the filter medium becomes clogged during use, then a pressure greater than pressure at the filter 4414 would allow fluid to flow into the filter 4414, thus potentially limiting pressure at the supplemental filter apparatus 4406 to just slightly more than the engine 4408 fluid pressure at filter 4414.

In various embodiments, the machine 4402 may be structured with one or more fluid components 4420. The fluid component 4420 may include one or more of the following fluidic structures, for example and without limitation: a pump that is off-board with respect to the machine 4402; a pump that is on-board with respect to the machine 4402; a flow control means such as a hand-held device, for example; a bracket or evacuation bracket; and/or, a quick-disconnect structure. The fluid component 4420 may also be one or more other types of components, devices, or systems suitable for supplying positive and/or negative fluid pressure to one or more fluid inlet ports or fluid outlet ports associated with the fluid component 4420. For example, the fluid component 4420 may be employed to perform one or more types of fluid evacuation processes and/or fluid refill processes (e.g., oil changes or other machine 4402 maintenance operations) in association with different fluid reservoirs 4410, for example, of the machine 4402. It can be appreciated that the fluid component 4420 may be positioned in one or more other places within the fluid or valve system of the machine 4402.

Figure 44B:
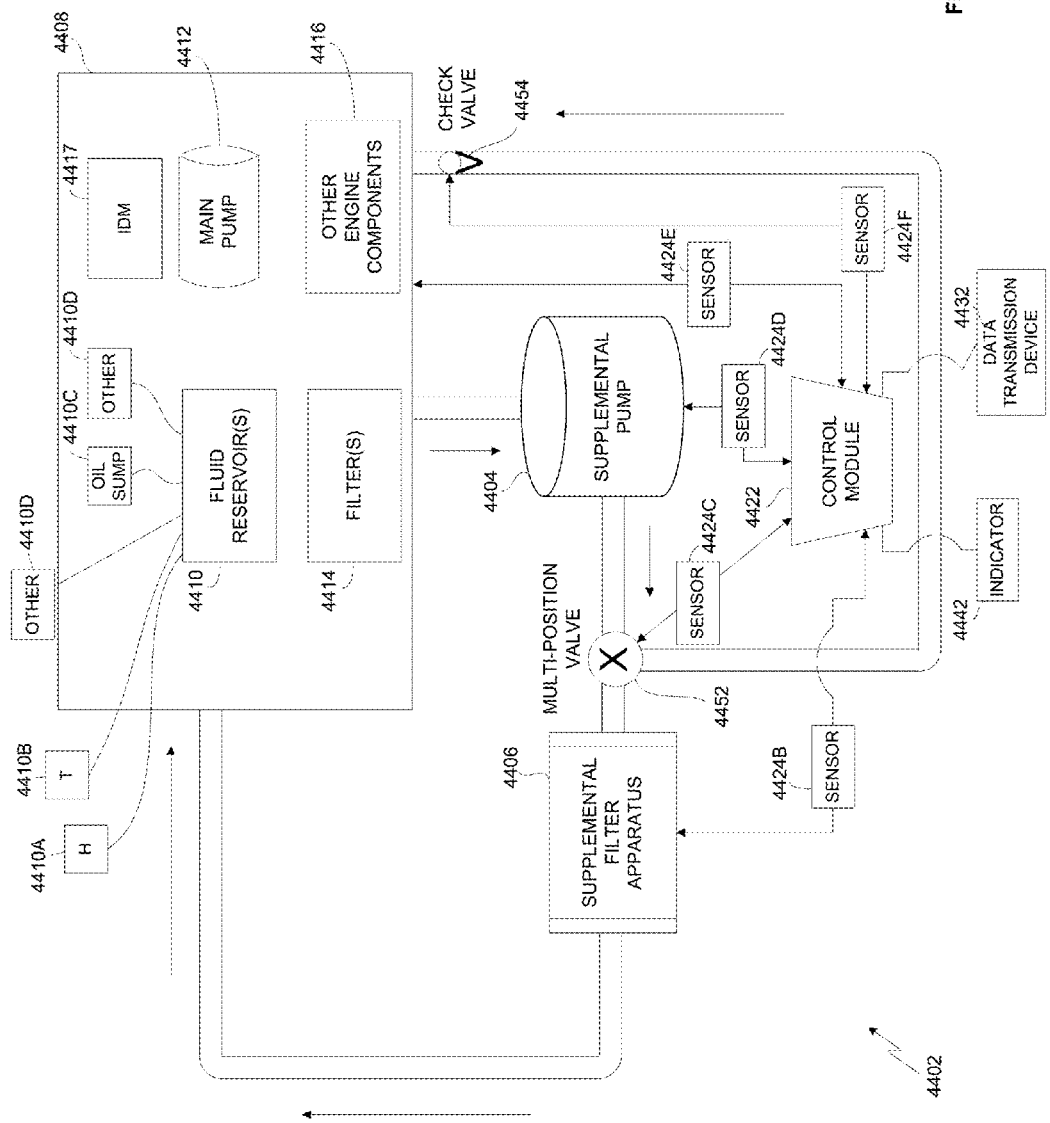

FIG. 44B illustrates an alternative embodiment of the fluid filtration apparatus shown in FIG. 44A. In this embodiment, a multi-position valve 4452 may be located at a common junction of: an inlet of the supplemental filter apparatus 4406; an outlet of the supplemental pump 4404; and, an inlet of a second valve 4454 operatively associated with the engine 4408. In addition, an outlet of the supplemental filter apparatus 4406 may be in fluid communication with a fluid reservoir 4410 or another component of the engine 4408. The multi-position valve 4452 may be structured for being alternatively positioned: in a first operating state in which a fluid path is established from the outlet of the supplemental pump 4404 to the inlet of the second valve 4454; or in a second operating state in which a fluid path is established from the outlet of the supplemental pump 4404, through the inlet of the supplemental filter apparatus 4406, and to the fluid reservoir 4410 or another component of the engine 4408. The control module 4422 may be configured to process or communicate signals in connection with operation of the multi-position valve 4452 and/or a sensor 4424C operatively associated with the multi-position valve 4452.

Figure 45:
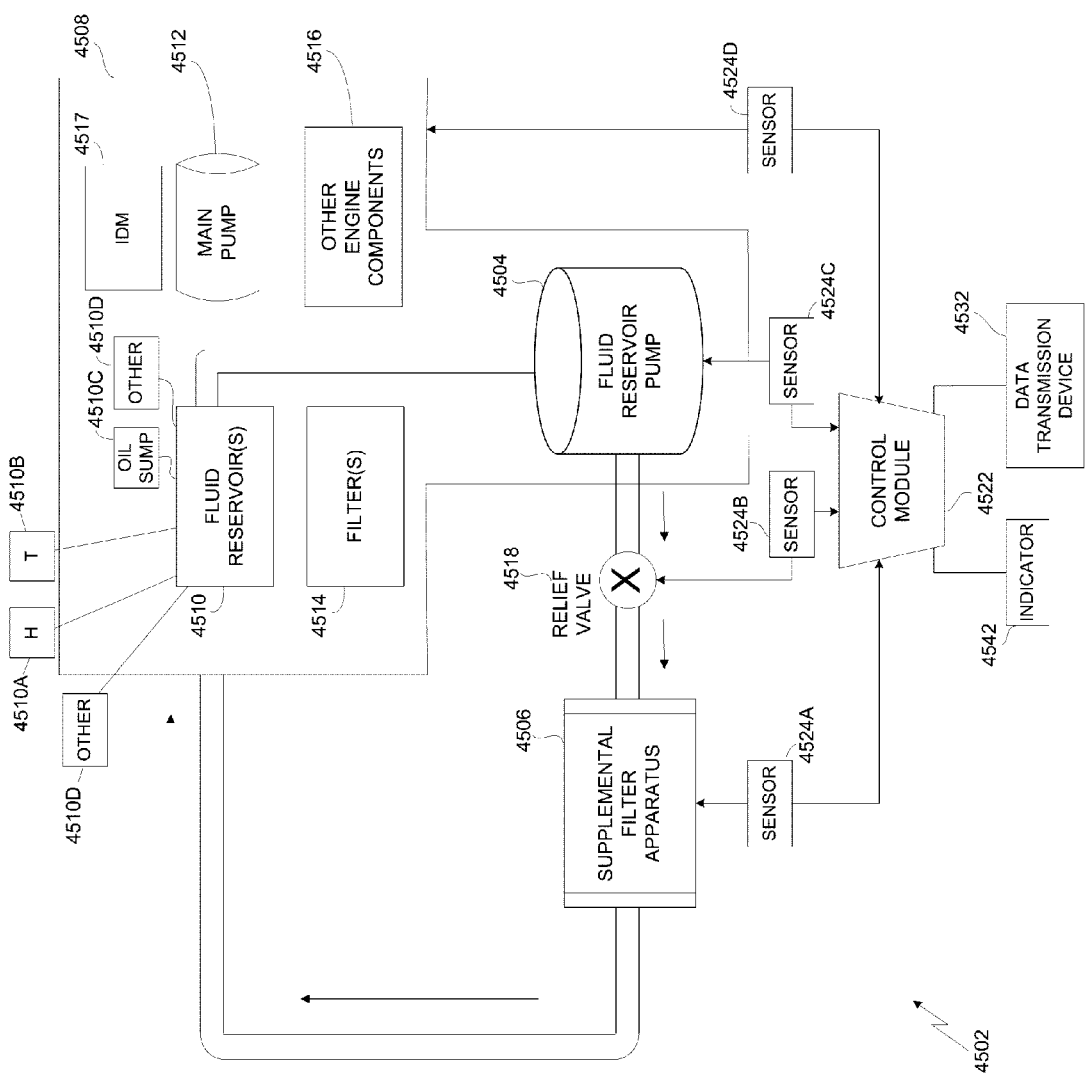
FIG. 45 schematically illustrates an example of a fluid filtration apparatus structured in accordance with various embodiments of the invention.

FIG. 45 schematically illustrates an example arrangement of a machine 4502 operatively associated with a fluid filtration apparatus including a fluid reservoir pump 4504 and a supplemental filter apparatus 4506 in accordance with various embodiments of the invention. As shown, the fluid reservoir pump 4504 may be connected to at least one fluid reservoir 4510 of an engine 4508. The machine 4502 may include an engine 4508 comprising one or more fluid reservoirs 4510 (e.g., hydraulic fluid reservoir 4510A, transmission fluid reservoir 4510B, oil sump 4510C, or various other fluid reservoirs 4510D). The engine 4508 may also include a main pump 4512 that performs primary fluid processing for the engine 4508, such as pumping oil, air, or other fluids through the engine 4508, for example. One or more filters 4514 may be included in the engine, as well as potentially a variety of other engine components 4516. In various embodiments, the supplemental filter apparatus 4506 and/or the filters 4514 may include one or more of an electrical filter, a magnetic filter, a centrifugal filter, a paper-based filter, or a synthetic filter. In certain embodiments, the fluid reservoir pump 4504 may be positioned onboard with respect to the machine 4502 and/or the engine 4508.

In certain embodiments, the fluid reservoir pump 4504 may be a pre-lubrication pump, for example, or an existing pump which is a component of a power steering system or a power braking system operatively associated with the machine 4502. The supplemental pump 4504 may be structured for fluid communication with at least one component of the engine 4508, such as one or more of the fluid reservoirs 4510. The supplemental filter apparatus 4506 may be positioned in fluidic series with the supplemental pump 4504 and structured with an inlet for receiving fluid flow from the supplemental pump 4504. The supplemental filter apparatus 4506 may be structured with an outlet to direct the fluid flow to one or more of the fluid reservoirs 4510 of the engine 4508. From the outlet or discharge side of the supplemental filter apparatus 4506, fluid may be directed to flow to a primary air filter 4514 of the engine 4508, for example. In various embodiments, the supplemental filter apparatus 4506 may include at least one fine filtration medium. In certain embodiments, one of the filters 4514 of the engine 4508 may be positioned between the outlet of the supplemental filter apparatus 4506 and one or more of the fluid reservoirs 4510 of the engine 4508.

In various embodiments, the supplemental filter apparatus 4506 may be connected to the fluid reservoir pump 4504, which may be a pump operatively associated with the oil sump 4510C, for example. In certain embodiments, a relief valve 4518 may be connected for fluid communication between the supplemental filter apparatus 4506 and the fluid reservoir pump 4504. The relief valve 4518 may be structured to direct fluid flow from the fluid reservoir pump 4504 to the supplemental filter apparatus 4506 in association with a filter triggering condition associated with the relief valve 4518, for example. In various embodiments, the relief valve 4518 may be structured to resist diverting flow from an oil rifle and bearings of the engine 4508, for example, until the engine 4508 experiences excess flow. In certain embodiments, the relief valve 4518 may be regulated by pressure, temperature, fluid viscosity, flow of fluid reservoir pump 4504 (e.g., engine oil pump), and/or other conditions. In one embodiment, the relief valve 4518 may be activated when excess flow exists beyond an amount flow that is necessary for the engine 4508 to perform at a predetermined level of operation. As shown in FIG. 45, excess flow can be passed through the relief valve 4518 to the supplemental filter apparatus 4506 as a bypass for performing fine filtration.

In various embodiments, it can be seen that operation of the engine 4508 can be optimized to use substantially the correct amount of fluid needed by the engine 4508, and excess flow can be directed to a bypass or filtration process. For example, if oil rifle pressure in the engine 4508 is 23 psi and the engine 4508 speed is at 900 rpm, then the engine 4508 may begin dumping at least part of its excess oil through an oil regulator. As the engine 4508 speed ramps up the rpm curve, more flow than needed may be added to the system. At this stage, the rifle pressure may be 32 psi, for example, when the engine 4508 begins to dump the excess oil. Next, in this example, suppose that the engine 4508 achieves a rated speed of 1800 to 2100 rpm, while rifle pressure had risen from 32 psi to 35 psi, while potentially dumping 23 gallons per minute through the oil regulator. In this example, it can be seen that at least some portion of the dumped oil can be directed through the supplemental filter apparatus 4506 instead of being wasted. In certain embodiments, the filter triggering condition associated with activation or deactivation of the relief valve 4518 may or may not be set at a level that results in a decrease in the rifle pressure within the engine 4508.

In various embodiments, the machine 4502 may be structured with one or more fluid components in operative association with the relief valve 4518. The fluid component may include one or more of the following fluidic structures, for example and without limitation: a pump that is off-board with respect to the machine 4502; a pump that is on-board with respect to the machine 4502; a flow control means such as a hand-held device, for example; a bracket or evacuation bracket; and/or, a quick-disconnect structure. The fluid component may also be one or more other types of components, devices, or systems suitable for supplying positive and/or negative fluid pressure to one or more fluid inlet ports or fluid outlet ports associated with the fluid component. For example, the fluid component may be employed to perform one or more types of fluid evacuation processes and/or fluid refill processes (e.g., oil changes or other machine 4502 maintenance operations) in association with different fluid reservoirs 4510, for example, of the machine 4502. It can be appreciated that the fluid component may be positioned in one or more other places within the fluid or valve system of the machine 4502.

In various embodiments, a control module 4522 may be operatively associated with the machine 4502 to collect, process, and/or communicate data indicative of operational states, triggering conditions, machine 4502 conditions, component functions, events, or other like data. For example, the control module 4522 may be programmed to activate or deactivate the fluid reservoir pump 4504; to receive, transmit, and/or process data signals in communication with one or more components of the machine 4502; and/or, to process or analyze data communicated from one or more sensors 4524A-4524D that may be operatively associated with various parts of the machine 4502. For example, the sensor 4524A may be configured to detect contaminants or other aspects of fluid composition associated with fluid flow passing through the supplemental filter apparatus 4506. The control module 4522 may include one or more processors or computer systems programmed with software, firmware, or other computer-executable instructions to perform the various functions of the control module 4522. The control module 4522 may be operatively associated with one or more data transmission devices 4232 which can store and/or process data received or processed by the control module 4522. In certain embodiments, the control module 4522 may communicate signals to one or more indicators 4542 which reflect the activity or function of different aspects of the control module 4522. For example, one such indicator 4542 may include a warning light, or an alert graphical display positioned on the console of a vehicle in which the machine 4502 is installed. In certain embodiments, the control module 4522 may activate or deactivate a valve system or otherwise operate a valve or valve apparatus in connection with a filter triggering condition, for example.

In various embodiments, the control module 4522 may be programmed to perform one or more functions upon detecting the existence of various filter triggering conditions or other events. Likewise, the control module 4522 may be programmed to perform one or more functions when a filter triggering condition is no longer detected, is out of a predefined parameter range (e.g., 10% above or 10% below a predefined engine speed), or otherwise no longer exists as a triggering condition. For example, the control module 4522 may be programmed to activate the fluid reservoir pump 4504 in association with detecting the existence of a filter triggering condition. Examples of potential filter triggering conditions may include a combination of one or more of the following: threshold fluid temperature, threshold fluid pressure, threshold engine speed, threshold fluid contaminant level, filter condition, threshold time duration of operation, an injection timing variable, a fuel consumption value, a predetermined day or time, machine state of operation. For example, supplemental filtration can be activated as a function of oil condition, engine 4508 hours, or engine 4508 component speed as measured in RPM or another suitable measurement. In certain embodiments, engine 4508 hours may mean total time of operation, such as operation time between two or more defined points in time, or time between fluid operations such as oil changes performed on the engine 4508.

In another example, fluid condition monitoring may be performed to detect a filter triggering condition, such as particle count, particle accumulation, and/or fluid dilution level. In various embodiments, a contaminant sensor may be configured to detect soot levels, for example, or the presence of other contaminants in a fluid flowing through the machine 4502. For example, a filter triggering condition may be employed that corresponds with a maximum soot level that is acceptable for desired or optimum engine 4508 operation, which may be specified by an original equipment manufacturer or by other engineering specifications. The control module 4522 may be programmed to activate the supplemental filter apparatus 4506 upon reaching the predetermined soot level for the specifications of a given engine 4508. In another example, the supplemental filter apparatus 4506 may function to remove a dilutant such as water, for example, from oil or fuel employed by the machine 4502.

In various embodiments, a filter triggering condition may involve a deviation from a predetermined range for an engine 4508 idle speed, a turbo boost pressure, a fuel consumption rate, a waste gate function, or an injection rate, for example. In addition calculated values such a fuel-to-air ratio can be considered at least part of a filter triggering condition. For example, clogging an air filter in the engine 4508 can cause a change in the fuel-to-air ratio, in addition to potentially causing the fuel to increase its soot level. Other factors related to combustion chemistry, or other phenomena that impact quality of combustion, may also form the basis for defining a filter triggering condition.

Figure 46:
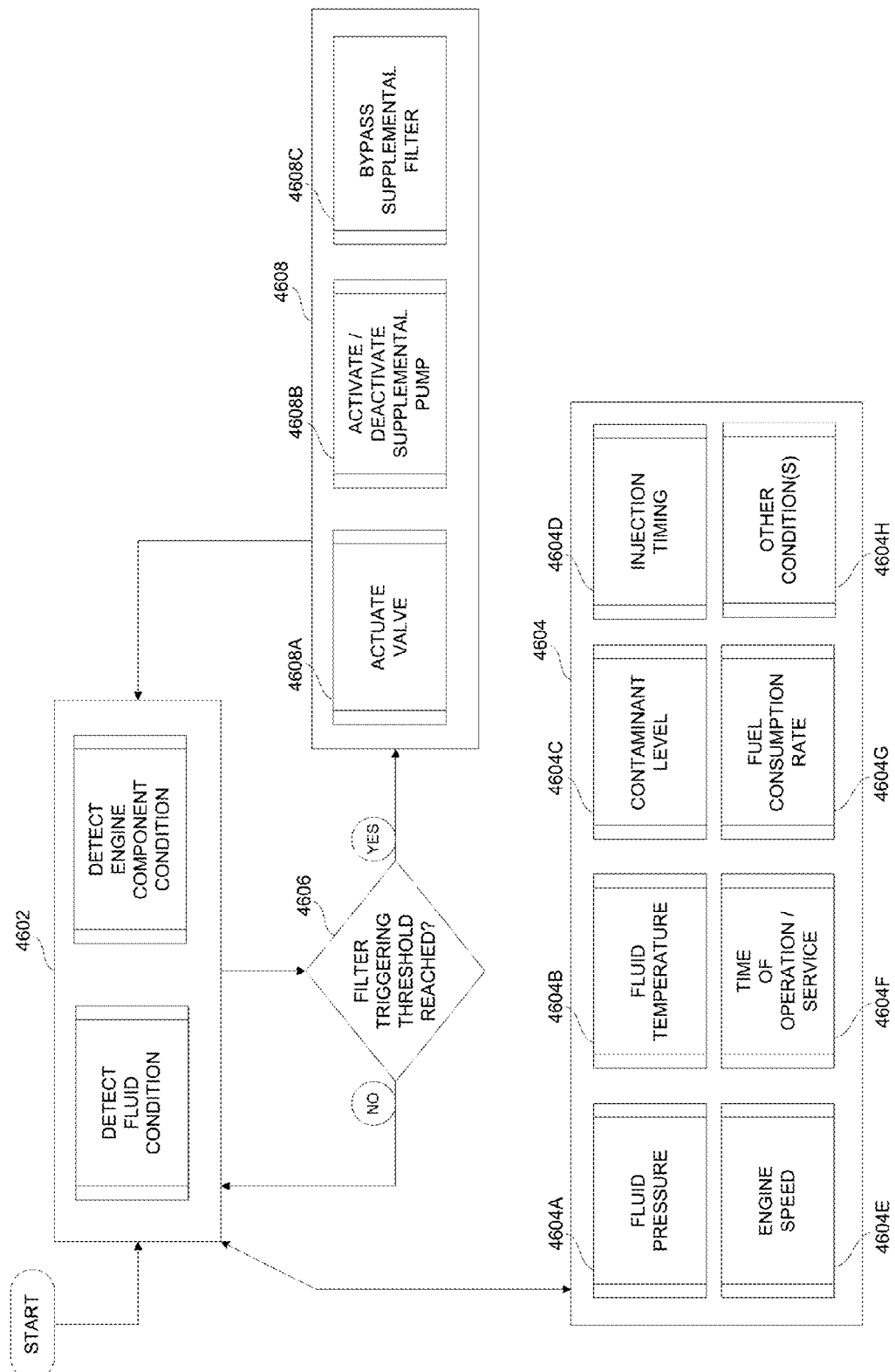
FIG. 46 includes a process flow diagram illustrating an example of processing various filter triggering conditions in accordance with certain embodiments of the invention.

FIG. 46 includes an example of a process flow illustrating aspects of detecting and identifying filter triggering conditions in accordance with various embodiments of the invention. At step 4602, a fluid condition or an engine component condition may be detected, for example, such as by the function of one or more of the control modules or sensors described herein. As shown, examples of fluid and component conditions 4604 include fluid pressure 4604A, fluid temperature 4604B, contaminant level 4604C, injection timing 4604D, engine speed 4604E, time of operation or service 4604F, fuel consumption rate 4604G, or many other conditions 4604H (including the various filter triggering conditions described herein). At step 4606, a control module or other device may determine whether a filter triggering threshold has been reached (e.g., whether the fluid temperature has fallen below or risen above a predetermined threshold). If the predetermined threshold has been reached, then the system may perform an action 4608 such as actuating a valve 4608A, activating or deactivating a supplemental pump 4608B or the main pump of a machine, bypassing a supplemental filter 4608C, and/or take other actions as may be appropriate under the circumstances, such as performing a kidney loop or fluid filtration process, for example. In one example, the supplemental pump may be activated to perform a kidney loop operation during braking or deceleration of the machine, or otherwise when the engine speed 4604E of the machine is reduced.

In various embodiments, the control modules described herein may include various components for controlling and monitoring a fluid system, as well as for monitoring, collecting and analyzing data associated with various fluid system and method embodiments described herein. The control module may include a processor for executing various commands within, and directing the function of, the various components of the control module. One or more sensor inputs can be provided in the control module for receiving and processing data communicated from one or more sensors installed within a fluid system. Sensors applicable to operation of a machine can include, without limitation, sensors to detect temperature, sensors to detect pressure, sensors to detect voltage, sensors to detect current, sensors to detect contaminants, sensors to detect cycle time, flow sensors and/or other sensors suitable for detecting various conditions experienced by the machine during the various stages of operation of the machine. In addition, one or more indicators can be provided in operative association with the control module for providing alerts or notifications of conditions detected and communicated to the control module. Such indicators can be conventional audio, visual, or audiovisual indications of a condition detected within a fluid system. The control module may also include one or more operatively associated data transmission devices or data storage media for storing, retrieving and/or reporting data communicated to the control module. Data stored within the data storage media may include a variety of data collected from the condition of the fluid system including, for example and without limitation, oil condition, particle count of contaminants, cycle time data for time to evacuate or time to refill a given reservoir, and/or fluid receptacle or fluid storage data.

The control module may include one or more controls for permitting manipulation of various elements of a fluid system and/or for receiving and processing data communicated from a fluid system. Machine controls can be provided for controlling various aspects of an engine, for example, such as ignition, pre-lubrication operations, initiating a fluid evacuation process, initiating a fluid refill process, initiating a kidney loop or filtration process, and various other machine operations. Pump controls can be provided for controlling the action of a pump or supplemental pump operatively associated with a fluid system, such as the fluid system of a machine, for example. One or more valve controls can be provided to actuate the position (e.g., open, closed, or other position) of one or more valves included within a fluid system. In addition, one or more multi-position valve controls can be provided to operate a multi-way valve or a multi-position valve apparatus or system. In addition, evacuation bracket controls can be provided for the particular function of one or more evacuation brackets included within, or introduced into, a fluid system as fluid components. In addition, in various embodiments described herein, it can be appreciated that the controls need not be located within the same location such as included within the same service panel, for example, or other like centralized location. It can be further appreciated that the controls may be operatively associated with a machine, a fluid system, a valve system, or other component by one or more wireline and/or wireless communication methods or systems.

Data can be communicated to the control module to and/or from a fluid system through a variety of methods, systems, or techniques. In various embodiments, data may be communicated, for example, by a wireline connection, communicated by satellite communications, cellular communications, infrared and/or communicated in accordance with a protocol such as IEEE 802.11, for example, or other wireless or radio frequency communication protocol among other similar types of communication methods and systems.

Figure 47:
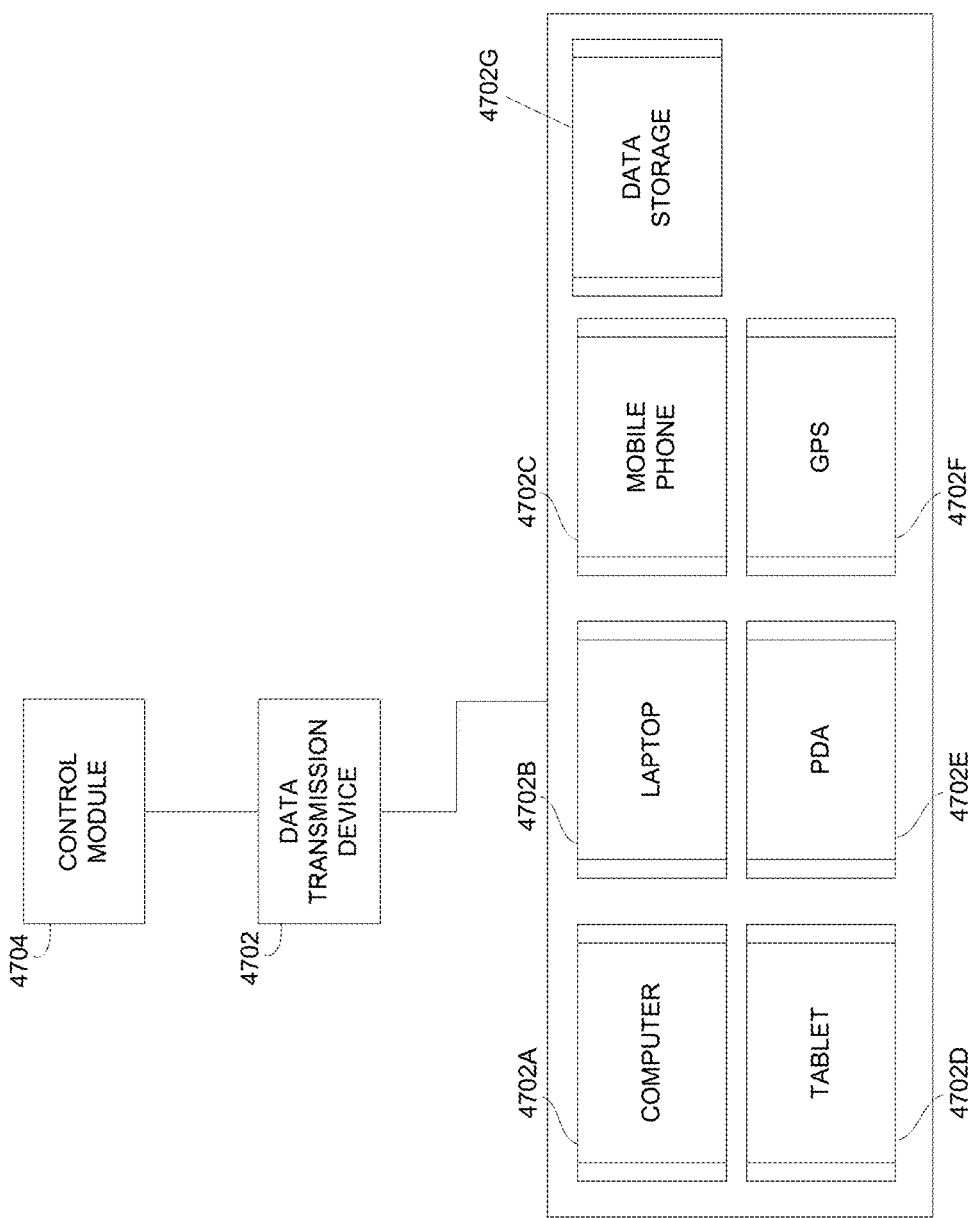
FIG. 47 includes a schematic depicting various examples of data communication and data processing in accordance with various embodiments of the invention.

As shown in FIG. 47, one or more data transmission devices 4702 can be employed in operative association with a control module 4704 for the purpose of receiving, processing, inputting and/or storing data and/or for cooperating with the control module 4704 to control, monitor or otherwise manipulate one or more components included within a fluid system. Examples of data transmission devices 4702 include, for example and without limitation, computers 4702A, laptops 4702B, mobile phones 4702C, tablets 4702D, and personal digital assistants (PDA's) 4702E, and/or other data devices 4702 suitable for executing instructions on one or more computer-readable media. The control module 4704 may also include or may be operatively associated with a global positioning system ("GPS") 4702F that can be programmed to determine a position of a machine, for example. In certain embodiments, the data transmission device 4702 may include one or more types of data storage media 4702G suitable for receiving data signals and/or storing data. In one example, a high fluid pressure filter triggering condition may generate a signal which represents the filter medium of the supplemental filter apparatus needing to be changed. Such a signal could be communicated wirelessly to a mobile device, for example, by use of the various media or devices described herein.

Various types of sensors can be employed in various embodiments to detect one or more conditions, states, or other characteristics of a fluid system, different fluids, or components employed in the fluid system. For example, the sensors can detect one or more of the following conditions within a fluid system: engine oil pressure, oil temperature in the engine, amount of current drawn by a pre-lubrication circuit, presence of contaminants (such as oil contaminants, for example) in the engine, amount of time that has elapsed for performance of one or more cycles of various engine operations (i.e., cycle time) such as pre-lubrication operations, fluid evacuation operations, fluid refill operations, fluid flow rates, and others. One example of a sensor that may be used in accordance with various embodiments of the present systems and methods is a contamination sensor marketed under the "LUBRIGARD" trade designation (Lubrigard Limited). A contamination sensor can provide information regarding oxidation products, water, glycol, metallic wear particles, and/or other contaminants that may be present in the engine oil, hydraulic oil, gearbox oil, transmission oil, compressor oil and/or other fluids used in various machines. In various aspects of the present methods and systems, the contamination sensor may be employed during one or more fluid processes, for example, such as a fluid evacuation process or a fluid refill process.

It can be appreciated that the control module can receive and store data associated with activation and deactivation of various components of a fluid system and operation of a machine, such as an engine, for example, included within the fluid system. Cycle time, for example, can be calculated from analysis of collected data to provide an indication of elapsed time for completing evacuation and/or refill operations. For a given oil temperature or temperature range (e.g., as can be detected and communicated by a temperature sensor), an average cycle time, for example, can be calculated through analysis of two or more collected cycle times. In one aspect, the present methods and systems can determine whether the most recently elapsed cycle time deviates from a nominal average cycle time, or range of cycle times, for a given oil temperature or temperature range. In addition, factors may be known such as the type and viscosity of fluids (e.g., such as oil) used in connection with operation of the machine. An unacceptable deviation from a nominal cycle time, or range of times, can result in recording a fault in a data storage medium operatively associated with the control module. It can be appreciated that many other types of fault conditions may be detected, analyzed and recorded in connection with practice of the present systems and methods. In other illustrative examples, conditions associated with battery voltage, current, and/or the presence of contaminants in the machine, for example, may be detected, analyzed, and one or more fault conditions recorded by the control module.

In various embodiments, data collected from fluid system operation can be stored on an internal data module 4217, 4317, 4417, 4517 installed on or near a machine, for example. The internal data module 4217, 4317, 4417, 4517 can include a processor with an operatively associated memory. In one aspect, the internal data module 4217, 4317, 4417, 4517 can be a "one-shot" circuit, as that term is understood by those skilled in the art. The internal data module 4217, 4317, 4417, 4517 can be configured to receive and store data related to various conditions of a fluid system, a machine, a valve, a pump, or other components of a fluid system. In one embodiment, the internal data module 4217, 4317, 4417, 4517 can store data in the memory prior to engine ignition and then transfer the stored data to the control module, for example, or another computer system, once engine ignition is initiated. In another embodiment, the internal data module 4217, 4317, 4417, 4517 can store condition data for subsequent download to the control module or another suitable computer system. In various embodiments, the internal data module 4217, 4317, 4417, 4517 can be configured for use in performing data collection and storage functions when the control module is not otherwise active (e.g., during various machine service operations). In this manner, the internal data module 4217, 4317, 4417, 4517 can be employed to store data corresponding to the electrical events associated with an oil change, for example, or another type of fluid evacuation or refill procedure and can transmit data related to the procedure to the control module. In various embodiments, the internal data module 4217, 4317, 4417, 4517 can be a stand-alone, discrete module, or can be configured for full or partial integration into the operation of the control module.

Collected and analyzed data, as well as recorded fault events, can be stored in association with the control module, the internal data module 4217, 4317, 4417, 4517, and/or at a remote location. In various embodiments, the control module and/or the internal data module 4217, 4317, 4417, 4517 can be configured for operation as integral components of a machine or as remote components not installed locally on the machine. The collected and analyzed information can be stored in one or more of the data transmission devices and/or data storage media operatively associated with the control module, or on another conventional storage suitable for use in connection with the control module. The information can also be stored externally with respect to a machine and its components. Data can be transmitted wirelessly by a radio frequency communication or by a wireline connection from the control module to one or more data devices (as described herein). A mobile phone 4702C, for example, may be configured and employed as a computer system for receiving and processing data collected from the control module during fluid evacuation and fluid refill processes.

In various embodiments, data can be collected, stored and/or analyzed for multiple reservoirs connected with, or operatively associated with, a machine. A control module or other data device can be employed to collect, store, and/or analyze data in accordance with one or more of the process steps shown in FIG. 46, for example, as well as in connection with other functions performed in connection with fluid operations and/or maintenance for a machine. In one example, the control module can be used to collect and analyze time-stamp information associated with an event such as an evacuation/refill process performed in connection with an oil reservoir, for example. Data such as current valve position, valve type, and/or reservoir type, for example, can be collected in connection with performance of an evacuation/refill procedure for a fluid reservoir, for example. Data stored within the data transmission devices and/or data storage media may include a variety of data collected from the condition of a fluid system including, for example and without limitation, oil condition; particle count of contaminants; cycle time data for time to evacuate or time to refill a given reservoir; time stamp data on a reservoir-by-reservoir basis; time stamp data on a component-by-component basis; time stamp data on a system-by-system basis; and/or, data associated with a fluid receptacle or another fluid storage medium.

Figure 48:
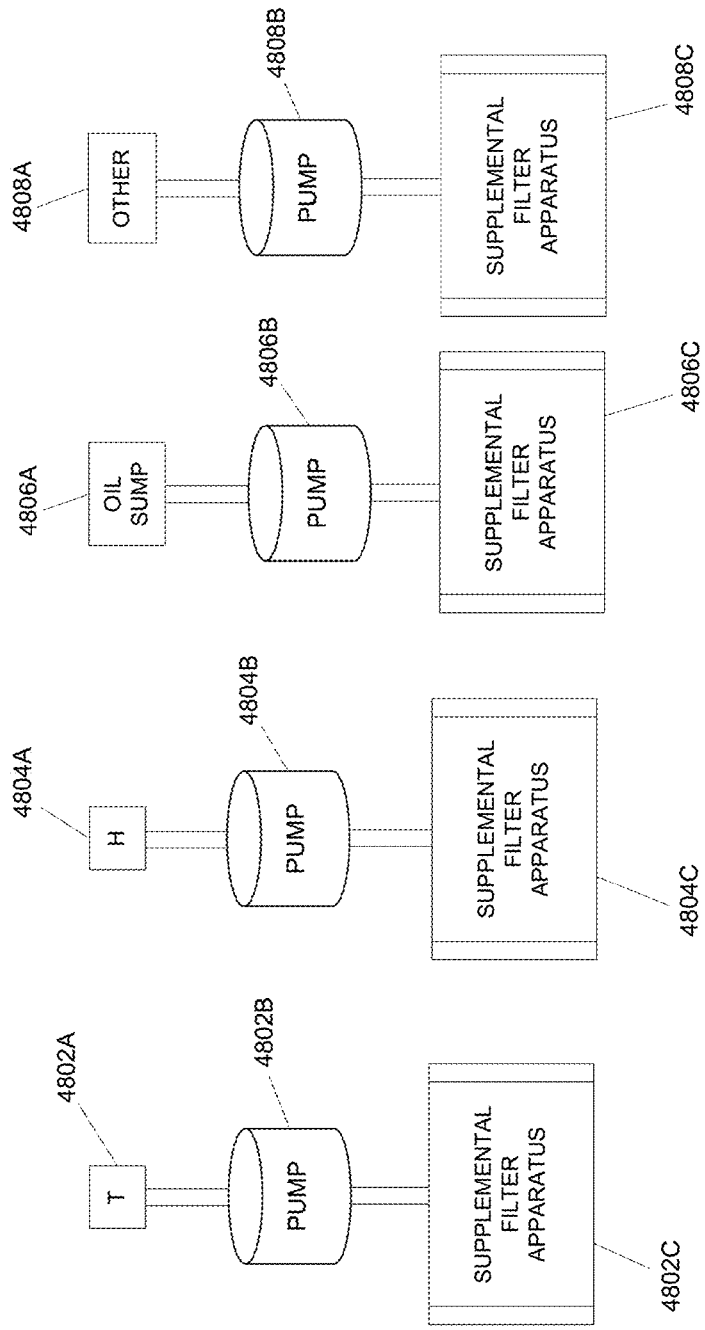
FIG. 48 schematically illustrates various examples of fluid reservoir and pump combinations that may be employed in association with various embodiments of the invention.

FIG. 48 schematically illustrates various examples of fluid reservoir and pump combinations that may be employed in association with various embodiments of the invention. As shown, each fluid reservoir 4802A, 4804A, 4806A, 4808A may be operatively associated with a pump or supplemental pump 4802B, 4804B, 4806B, 4808B. For example, one or more of the fluid reservoirs 4802A, 4804A, 4806A, 4808A may be a component of a power steering system or power braking system of a machine. In the example shown, one or more of the supplemental pumps 4802B, 4804B, 4806B, 4808B may be operatively associated with one or more supplemental filter apparatuses 4802C, 4804C, 4806C, 4808C. In certain embodiments, two or more fluid reservoirs may share a common pump and/or a common supplemental filter apparatus. Where operationally applicable, it can be appreciated that the multiple supplemental pump and/or multiple supplemental filter apparatus embodiments illustrated in FIG. 48 may be employed in connection with various embodiments of machines and fluid filtration apparatuses described herein. In one example, fluid such as the engine oil of a machine may be filtered through a supplemental filter apparatus and then returned back to the fuel tank of the machine to be used as fuel.

Referring now to FIG. 49, for purposes of illustrating an operative environment for certain embodiments of the invention, a diesel engine 810 is shown having portions removed and/or broken away for convenience of illustration of the lubrication system of the engine 4910. It can be appreciated that the diesel engine 4910 is shown and described herein merely for purposes of convenience of disclosure and illustration and that many other machines, as defined herein, can be employed in accordance with the various embodiments of the present systems and methods. The lubrication system may include a main oil pump 4920 that is mechanically driven from the crankshaft 4922 of the engine 4910. When actuated by rotation of crankshaft 4922, the main oil pump 4920 draws oil from a sump 4924 through a screening element 4926 and distributes it under pressure through a plurality of conduits 4928. The pressurized oil is delivered to the crankshaft bearings 4930 of the engine 4910, to the turbocharger unit 4932, to the valve train assembly 4934, to the pistons 4936, through a filtering assembly 4938, and to other engine components that require lubrication. It can be appreciated that one or more valves and/or passages (not shown) may be included within the lubrication system of the engine 4910 to control the flow of oil provided to various engine components.

Figure 49A:
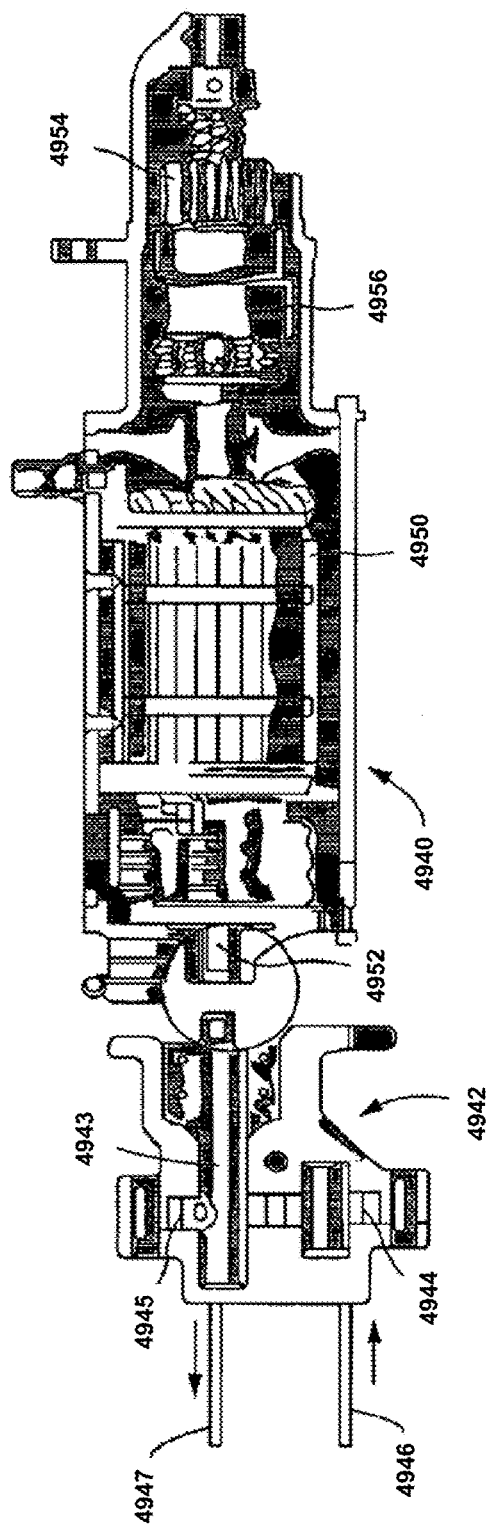
FIG. 49A is a sectional side view of a starter and a pre-ignition oil pump mechanism structured for use in connection with the engine of FIG. 49.

Referring now to FIGS. 49 and 49A, during operation of the engine 4910, the main oil pump 4920 is not actuated until the crankshaft 4922 begins to rotate due to the operation of an electromechanical starter assembly 4940. The starter assembly 4940 can be conventional in configuration and can include a direct current motor assembly 4950 having an armature shaft 4952 extending therethrough. The armature shaft 4952 supports a starter gear 4954 adjacent to one end of the starter assembly 4940. The starter gear 4954 engages a flywheel 4923 to rotatably drive crankshaft 4922 when actuated. A bendix drive mechanism 4956 controls the axial movement of the starter gear 4954 to engage and disengage the starter gear 4954 from the flywheel 4923. Because a significant time period can elapse before the main oil pump 4920 is able to achieve normal operating oil pressure in the lubrication system, vital components of the engine 4910 may move and interact through a number of cycles with little or no lubrication pressure. This can result in undesirably excessive wear and premature failure of engine components.

In various embodiments, a pre-lubrication electromechanical system can be activated prior to combustion in the engine 4910 and rotation of the crankshaft 4922. The pre-lubrication system can be employed to at least some lubricating oil pressure before initial movement and interaction of engine 4910 components. To provide lubrication to the engine 4910 components, the pre-lubrication system can include a supplemental oil pump 4942 operatively connected to the starter assembly 4940. In one aspect, the supplemental oil pump 4942 can include a mechanically driven gear-type oil pump having an elongated drive shaft 4943 and gears 4944, 4945. It can be seen that the supplemental oil pump 4942 communicates with the lubrication system of the engine 4910 through an oil inlet line 4946, an oil output line 4947, and a check valve 4948. The drive shaft 4943 of the supplemental oil pump 4942 may be connected to the armature shaft 4952 of the starter motor 4940 opposite the starter gear 4954 in any convenient manner, so that the two shafts 4943, 4952 can rotate together. The supplemental oil pump 4942 and the starter motor 4940 may be conveniently incorporated within a single housing to form an integral unit. In certain embodiments, the supplemental oil pump 4942 can be installed as an on-board component of the engine 4910, or as a remotely positioned external pump.

In certain embodiments, the check valve 4948 can be mounted on the engine 4910 adjacent to the outlet line 4947 to resist oil backflow while the supplemental oil pump 4942 is inoperative. This check valve 4948 can also resist spinning of the starter assembly 4940 caused by oil flow during normal operation of the engine 4910. It can be seen that failure of the supplemental oil pump 4942 would not render the engine 4910 inoperative, thereby avoiding potentially expensive down-time and maintenance for the engine 4910 and its associated equipment. Likewise, because the supplemental oil pump 4942 pumps oil through the filtering assembly 4938 before the oil enters the engine 4910, failure of the supplemental oil pump 4942 would not likely introduce damaging particles into the engine 4910.

Various aspects of the following disclosure include operational examples for the various system and method embodiments described herein. It can be appreciated that such operational examples are provided merely for convenience of disclosure, and that no particular aspect or aspects of these operational examples are intended to limit the scope of application of the present systems and methods.

Where applicable and operational in the context of various embodiments of valve assemblies and systems described herein, one or more valves may be in a normally closed or normally open position prior to, during, or after performance of a particular fluid operation. In addition, one or more types of valves may be employed in certain embodiments of the present systems and methods (e.g., a reasonable combination of check valves and/or electronic valves may be employed).

It can be appreciated that, where applicable and operational in the context of various embodiments of valve assemblies and systems described herein, performing a refill fluid operation to a pre-filter portion of a fluid system improves filtration of the refill fluid. In various embodiments, the refill fluid encounters at least one filter, for example, before the refill fluid encounters various other operative components of the fluid system.

Data can be communicated with the control modules to and/or from a fluid system through a variety of methods and systems. In various embodiments disclosed herein, data may be communicated, for example, by a wireline connection, communicated by satellite communications, cellular communications, infrared and/or communicated in accordance with a wireless or radio frequency communication protocol among other similar types of communication methods and systems. One or more data devices can be employed in operative association with the control modules for the purpose of receiving, processing, inputting and/or storing data and/or for cooperating with the control modules to control, monitor or otherwise manipulate one or more components included within a fluid system.

In one illustrative example, information related to an oil filter purge operation, such as the date and time of the filter purge or the cycle time of the filter purge, for example, and/or other machine conditions can be recorded and processed in connection with operation of the control modules. In addition, the condition (e.g., open or closed) of various valve inlets and outlets, and the date/time at which they are actuated, may be detected, recorded and/or analyzed for various fluid operations. In accordance with the systems and methods disclosed herein, data may be collected and recorded on a reservoir-by-reservoir basis and/or on a fluid system-by-fluid system basis as service is performed on a machine, for example.

Figure 50:
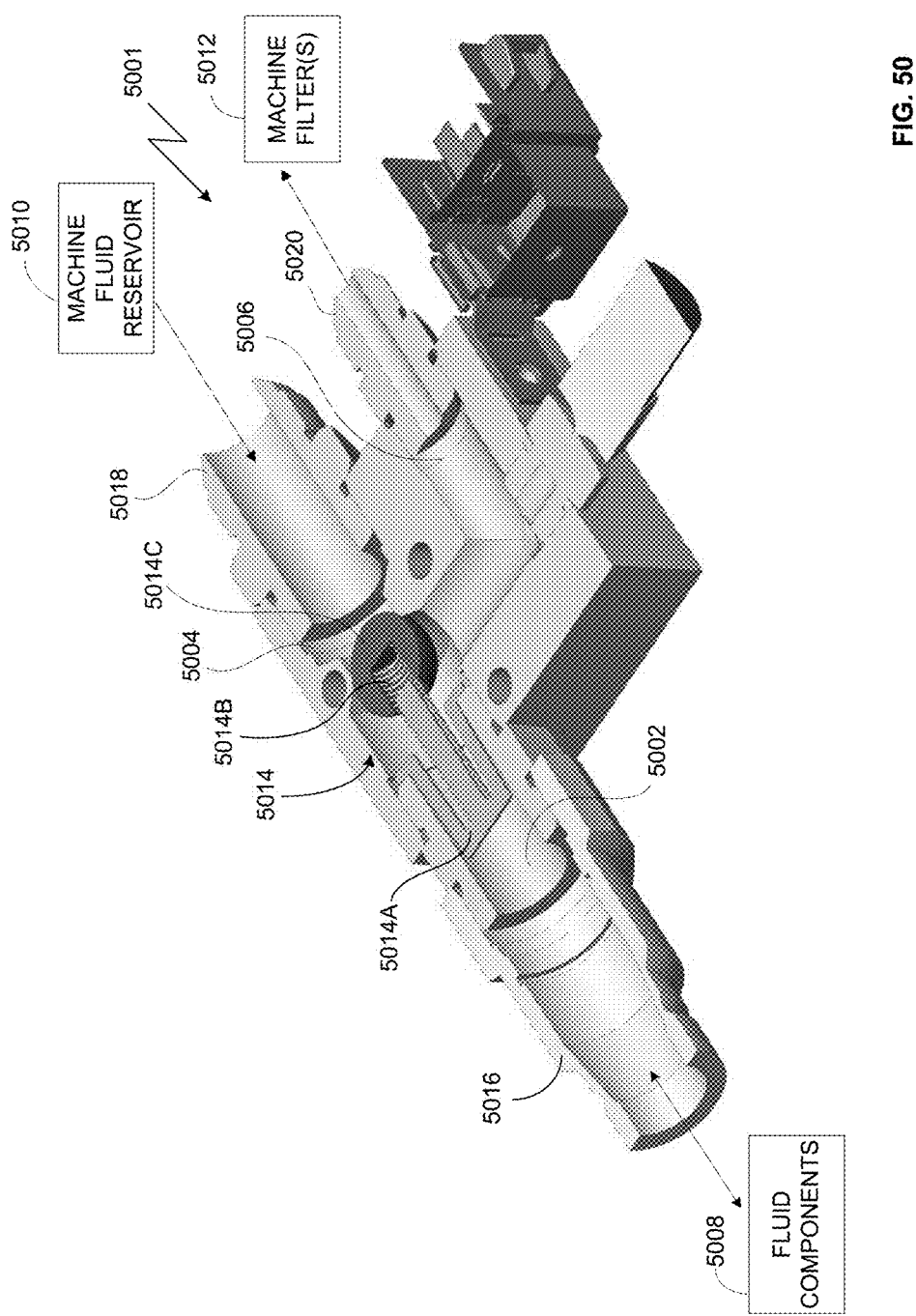
FIG. 50 includes a cut-away view of an example of a valve assembly structured in accordance with various embodiments of the invention.
Figure 51:
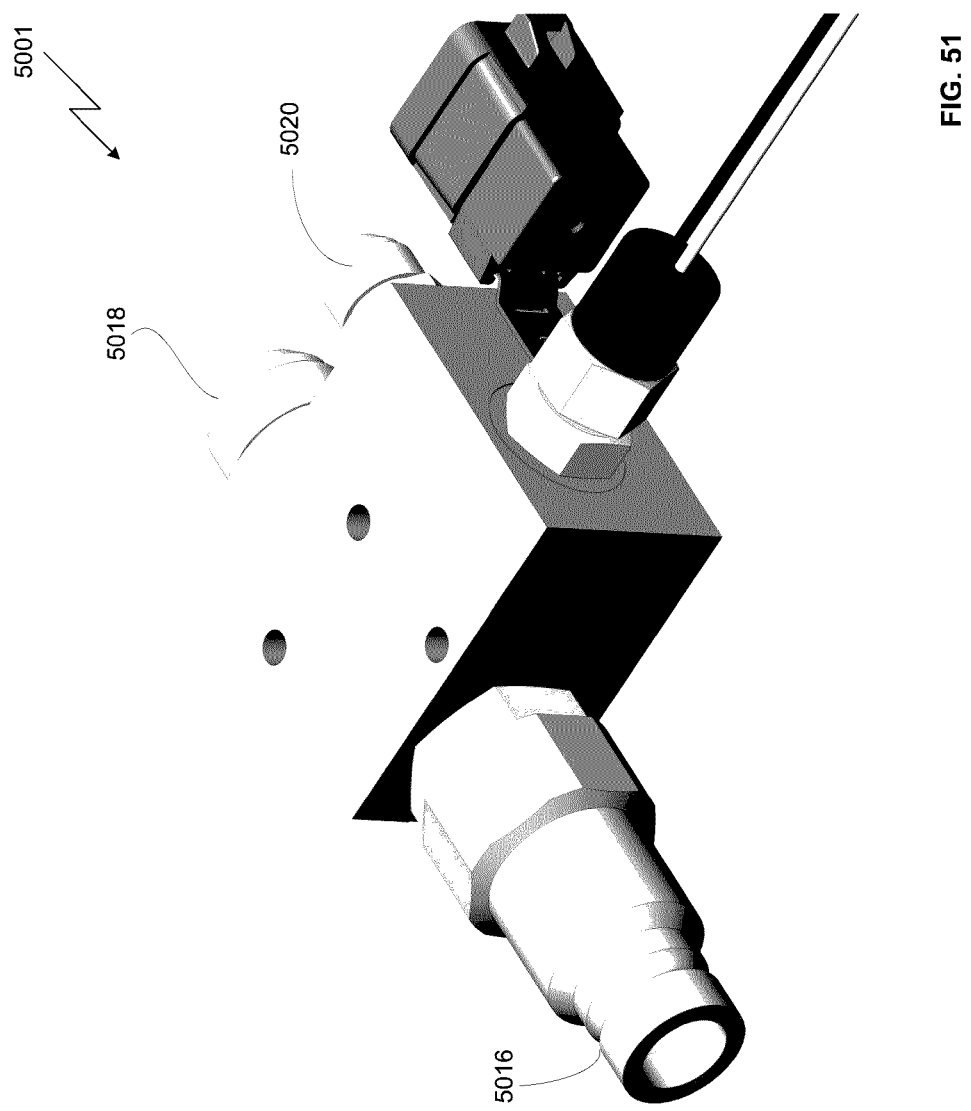
FIG. 51 includes a three-dimensional view of the valve assembly of FIG. 50.

FIGS. 50 and 51 illustrate embodiments of a valve assembly 5001 that can be structured and employed in cooperative connection with, or in place of, various embodiments of valve assemblies, valve systems, or other fluid systems described herein. In various embodiments, the valve assembly 5001 may include an inlet/outlet port 5002 structured for fluid communication with a machine fluid reservoir port 5004 or a filter port 5006. The valve assembly 5001 may be structured for fluid communication through the inlet/outlet port 5002 with one or more fluid components 5008. The fluid component 5008 may include one or more of the following fluidic structures, for example and without limitation: a pump that is off-board with respect to the machine; flow control means such as a hand-held device, for example; a bracket or evacuation bracket; and/or, a quick-disconnect structure or other coupling. The fluid component 5008 may also be one or more other types of components, devices, or systems suitable for supplying positive and/or negative fluid pressure to one or more fluid inlet ports or fluid outlet ports associated with a machine. For example, the fluid component 5008 may be employed in connection with the valve assembly 5001 to perform one or more types of fluid evacuation processes and/or fluid refill processes (e.g., oil changes or other machine maintenance operations) in association with different fluid reservoirs, for example, of a machine. The machine reservoir port 5004 may be structured for fluid communication with a machine fluid reservoir 5010, such as the sump of a machine, for example. The filter port 5006 may be structured for fluid communication with one or more types of filters 5012 such as fluid filters, supplemental filter apparatuses, or fine filtration media (as described herein).

In various embodiments, an actuating mechanism 5014 may be positioned inside the valve assembly 5001. The actuating mechanism 5014, which may be associated with a quick-disconnect coupling, can be structured to include a support 5014A operatively associated with a spring 5014B and a ball 5014C. The ball 5014C may be comprised of polypropylene, for example, or another suitable material. The actuating mechanism 5014 can be structured to react to pressure changes within the valve assembly 5001. In response to such pressure changes, the mechanism 5014 may alternate between a normally closed position (as shown in FIG. 50); and an open position in which the ball 5014C moves toward the direction of the inlet/outlet port 5002 to establish a fluid communication path from the machine fluid reservoir port 5004 to the inlet/outlet port 5002. In certain embodiments, one or more types of couplings 5016, 5018, 5020, such as quick-disconnect devices, may be connected to one or more of the various ports 5002, 5004, 5006.

In one example, during a fluid evacuation operation, negative pressure can be applied at the inlet/outlet port 5002, such as by a pump (e.g., onboard pump or off-board pump) connected to the valve assembly 5001 as a fluid component 5008, for example. Upon application of negative pressure, the spring 5014B is compressed and the ball 5014C moves in a direction from the machine fluid reservoir port 5004 toward the inlet/outlet port 5002, establishing fluid communication from the machine fluid reservoir 5010 to the fluid component 5008, and at the same time fluid flow through the valve assembly 5001 from the filter port 5006 is resisted, possibly in conjunction with a check valve, for example, downstream from the coupling 5020. A fluid evacuation operation may involve removing used or dirty oil from the sump of machine, for example, such as by evacuating the used oil from the sump through the valve assembly 5001, to an external pump 5008.

In another example, during a fluid refill operation, positive pressure can be applied at the inlet/outlet port 5002, such as by a pump (e.g., onboard pump or off-board pump) connected to the valve assembly 5001 as a fluid component 5008, for example. Upon application of positive pressure, the spring 5014B is extended and the ball 5014C moves in a direction away from the inlet/outlet port 5002 toward the machine fluid reservoir port 5004, establishing a substantial fluid seal to resist fluid from flowing into the machine fluid reservoir 5010. Instead, fluid communication is established between the inlet/outlet port 5002 and the filter port 5006 to establish fluid flow through one or more machine filters 5012. A fluid refill operation may involve adding clean or new oil pumped from the pump 5008, for example, and routing the new oil through one or more filters 5012 and perhaps ultimately to an appropriate fluid reservoir 5010 of the machine, such as the sump.

Figure 52:
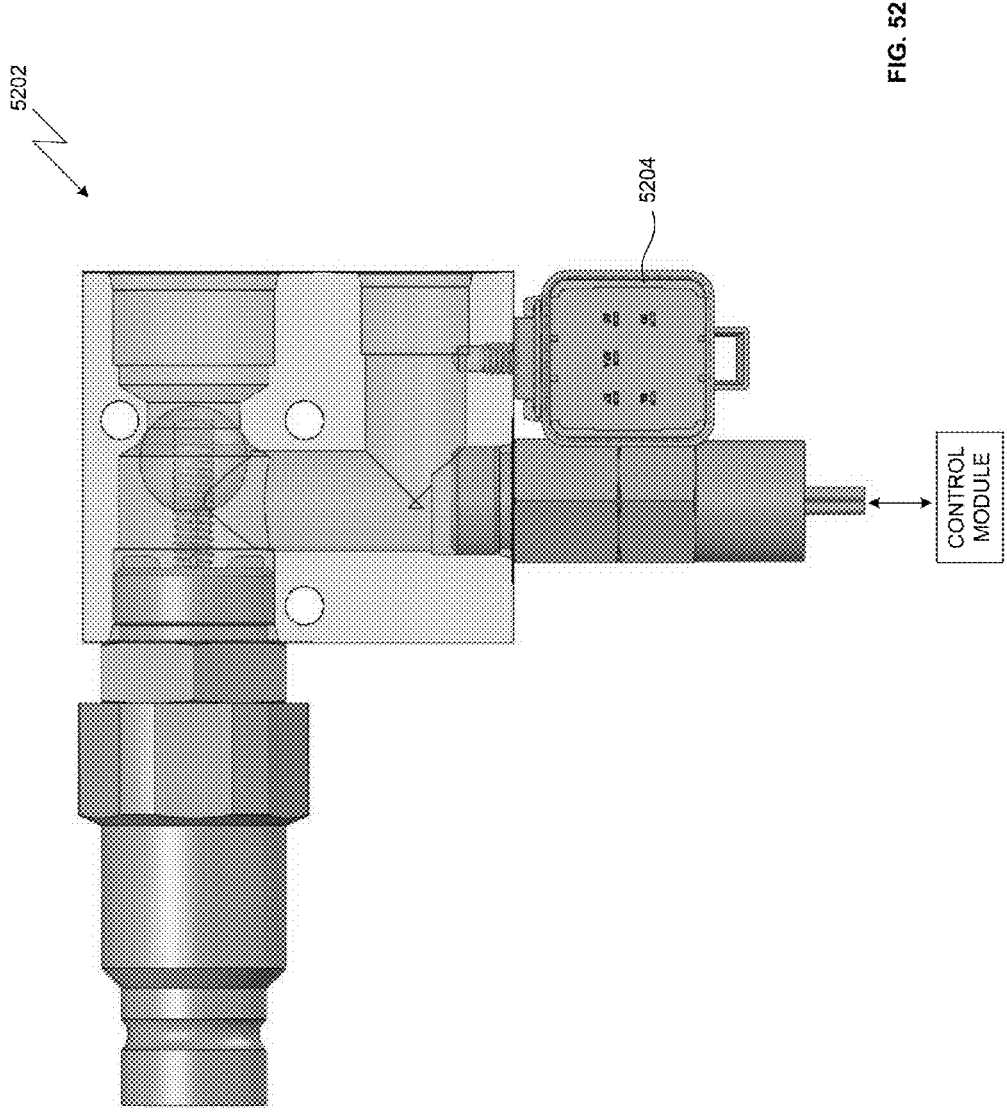
FIG. 52 illustrates a plan view of an example of a valve assembly structured in accordance with various embodiments of the invention.

FIG. 52 illustrates an example of a valve assembly 5202 including a sensor 5204 operatively associated with the interior of the valve assembly 5202. The sensor 5204 may include a vacuum switch for sensing conditions associated with various fluid evacuation operations. In certain embodiments, the sensor 5204 may include a pressure switch for sensing conditions associated with various fluid refill operations. In other embodiments, the sensor 5204 may comprise a combination of a vacuum switch and a pressure switch to have the capacity to sense both fluid evacuation operations and fluid refill operations. The sensor 5204 may be operatively associated with a control module 5206 which can be programmed to interpret signals received from the sensor 5204 and to record data associated with different fluid operations involving the valve assembly 5202. For example, the control module 5204 may record and analyze data associated with fluid temperature, fluid pressure, time of fluid operation, date of fluid operation, among many other types of engine conditions, fluid conditions, or other events or conditions applicable to a machine and its fluid systems. Such conditions or events may be associated with a state of the fluid (e.g., viscosity or the presence of contaminants), an operational state of one or more components the machine (e.g., engine speed or main pump pressure), occurrence of a predetermined event (e.g., a fixed time), and/or a variety of other potential conditions or events.

Figure 53A:
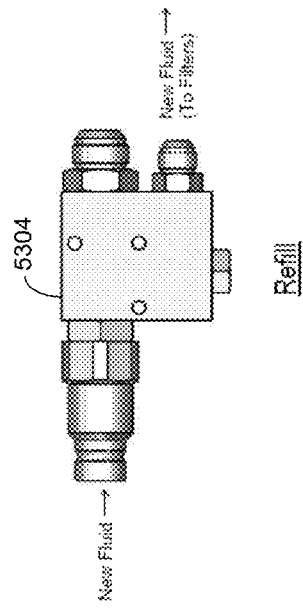
FIGS. 53A-53D include various examples of valve assemblies structured in accordance with various embodiments of the invention.
Figure 53B:
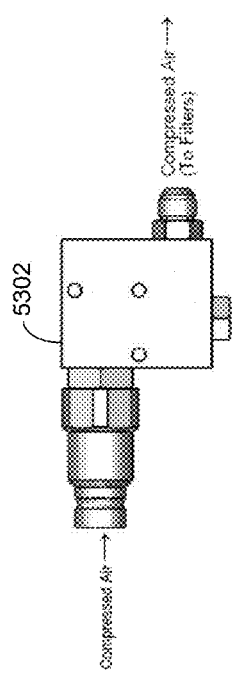
Figure 53C:
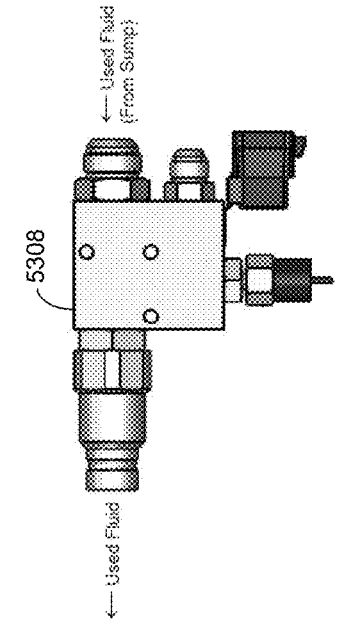
Figure 53D:
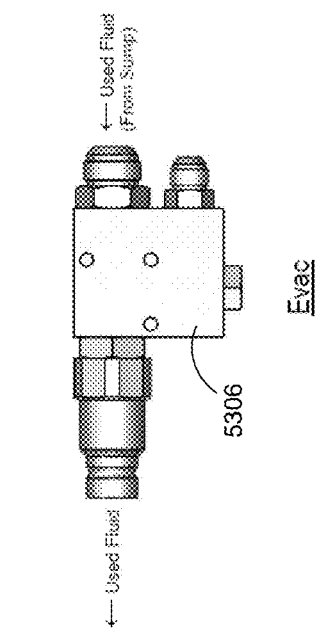

FIGS. 53A-53D illustrate examples of how different valve assemblies 5302, 5304, 5306, 5308 may be structured for different purposes or fluid operations in connection with machine maintenance, for example. FIG. 53A includes a valve assembly 5302 configured for performing a purge operation for the filters of a machine, such as by forcing compressed air through the fluid system. FIG. 53B includes a valve assembly 5304 configured for performing a refill fluid operation by directing new fluid to the filters of a machine from an external pump, for example, or another fluid component. FIG. 53C includes a valve assembly 5306 configured for performing an evacuation fluid operation in which used oil flows from the sump of the machine to an external pump or other fluid component. FIG. 53D includes a valve assembly 5308 configured for sensing a condition within the valve assembly 5308, such as fluid pressure or temperature and/or for collecting time stamp data associated with fluid operations involving the valve assembly 5308. Such conditions or events may be associated with a state of the fluid (e.g., viscosity or the presence of contaminants), an operational state of one or more components the machine (e.g., engine speed or main pump pressure), occurrence of a predetermined event (e.g., a fixed time), and/or a variety of other potential conditions or events.

Figure 54:
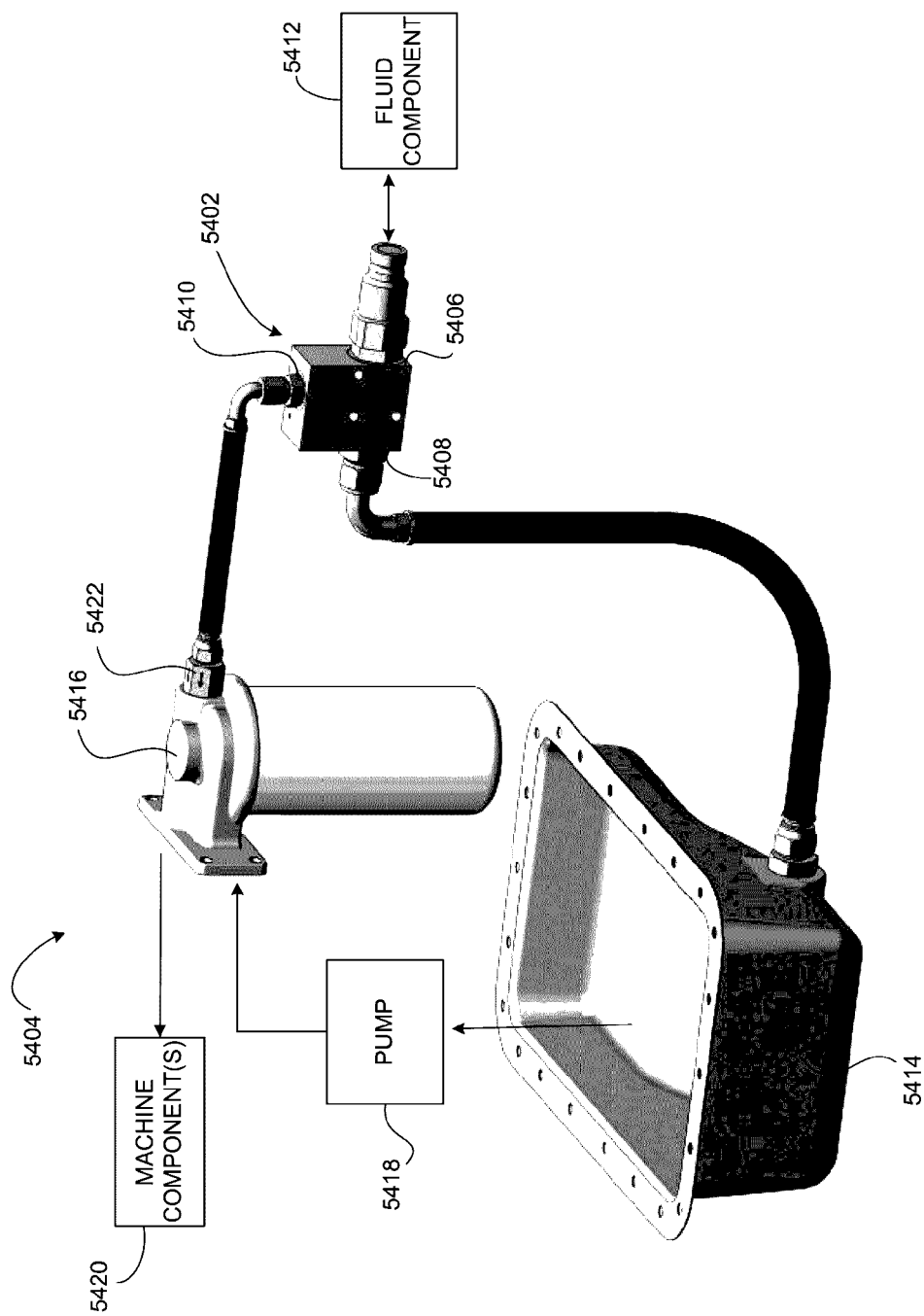
FIG. 54 schematically depicts an example of a valve assembly structured in accordance with various embodiments of the invention in operative connection with a machine fluid system.

FIG. 54 illustrates an example of a valve assembly 5402 installed and connected for operative association with a portion of a fluid system 5404 of machine, which may include the fluid system of an engine, for example. In various embodiments, the valve assembly 5402 may include an inlet/outlet port 5406 structured for fluid communication with a machine fluid reservoir port 5408 or a filter port 5410. The valve assembly 5402 may be structured for establishing fluid communication through the inlet/outlet port 5406 with one or more fluid components 5412. The fluid component 5412 may include one or more of the following fluidic structures, for example and without limitation: a pump that is off-board with respect to the machine; a pump that is on-board with respect to the machine; a flow control means such as a hand-held device, for example; a bracket or evacuation bracket; and/or, a quick-disconnect structure or other coupling. The fluid component 5412 may also be one or more other types of components, devices, or systems suitable for supplying positive and/or negative fluid pressure to one or more fluid inlet ports or fluid outlet ports associated with a machine. For example, the fluid component 5412 may be employed in connection with the valve assembly 5402 to perform one or more types of fluid evacuation processes and/or fluid refill processes (e.g., oil changes or other machine maintenance operations) in association with different fluid reservoirs, for example, of a machine.

The machine reservoir port 5408 may be structured for fluid communication with a machine fluid reservoir 5414, such as the sump of a machine, for example. The filter port 5410 may be structured for fluid communication with one or more types of filters 5416 such as fluid filters, supplemental filter apparatuses, or fine filtration media (see discussion of filters as described herein). In the example shown in FIG. 54, the machine fluid system 5404 may include a pump 5418 operably connected to communicate fluid from the fluid reservoir 5414, through the filter 5416, and further onward to one or more other machine components 5420 (e.g., engine components such as bearings). In certain embodiments, a check valve 5422 may be operatively associated with the filter 5416 to regulate flow from the valve assembly 5402 through the filter 5416, such as during a fluid refill operation.

It can be seen that the valve assembly 5402 may be structured to be connected externally with respect to a normal fluid flow path of the machine fluid system 5404. In other words, the valve assembly 5402 can be structured to be readily retrofitted to the existing fluid system of a machine without significant disruption or interference with components of the machine.

Figure 55:
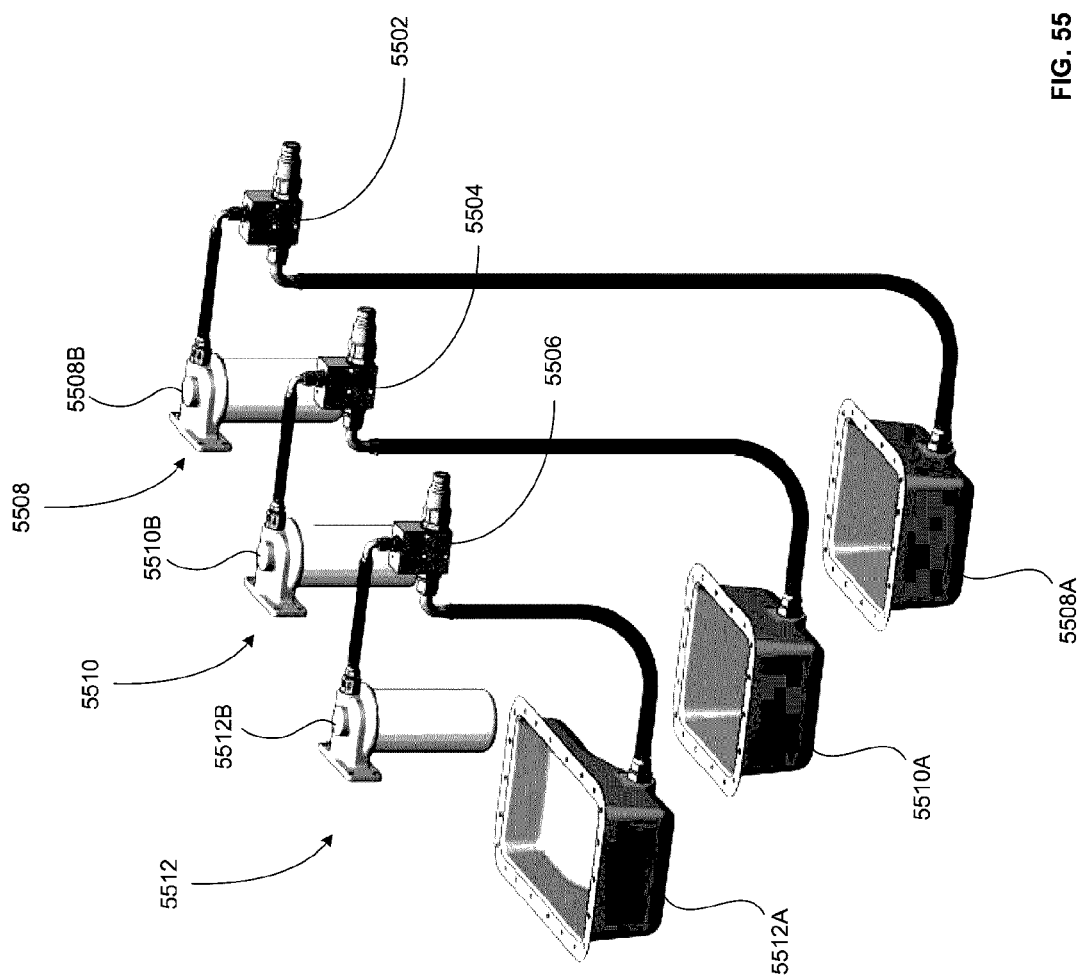
FIG. 55 schematically depicts an example of a valve assembly combination including multiple valve assemblies structured in accordance with various embodiments of the invention in operative connection with a machine fluid system.

FIG. 55 illustrates an example in which multiple valve assemblies 5502, 5504, 5506 can be operably connected to multiple machine fluid systems 5508, 5510, 5512 (respectively). As shown, each machine fluid system 5508, 5510, 5512 may include at least one fluid reservoir 5508A, 5510A, 5512A operatively connected to at least one filter 5508B, 5510B, 5512B. It can be appreciated that the valve assemblies 5502, 5504, 5506, can be combined or ganged together in the manner shown to facilitate performing multiple fluid operations on multiple fluid reservoirs 5508A, 5510A, 5512A. For example, one fluid reservoir 5508A may contain transmission fluid; another reservoir 5510A may include hydraulic fluid; and still another reservoir 5512A may include a variety of other types of machine fluids.

Figure 56A:
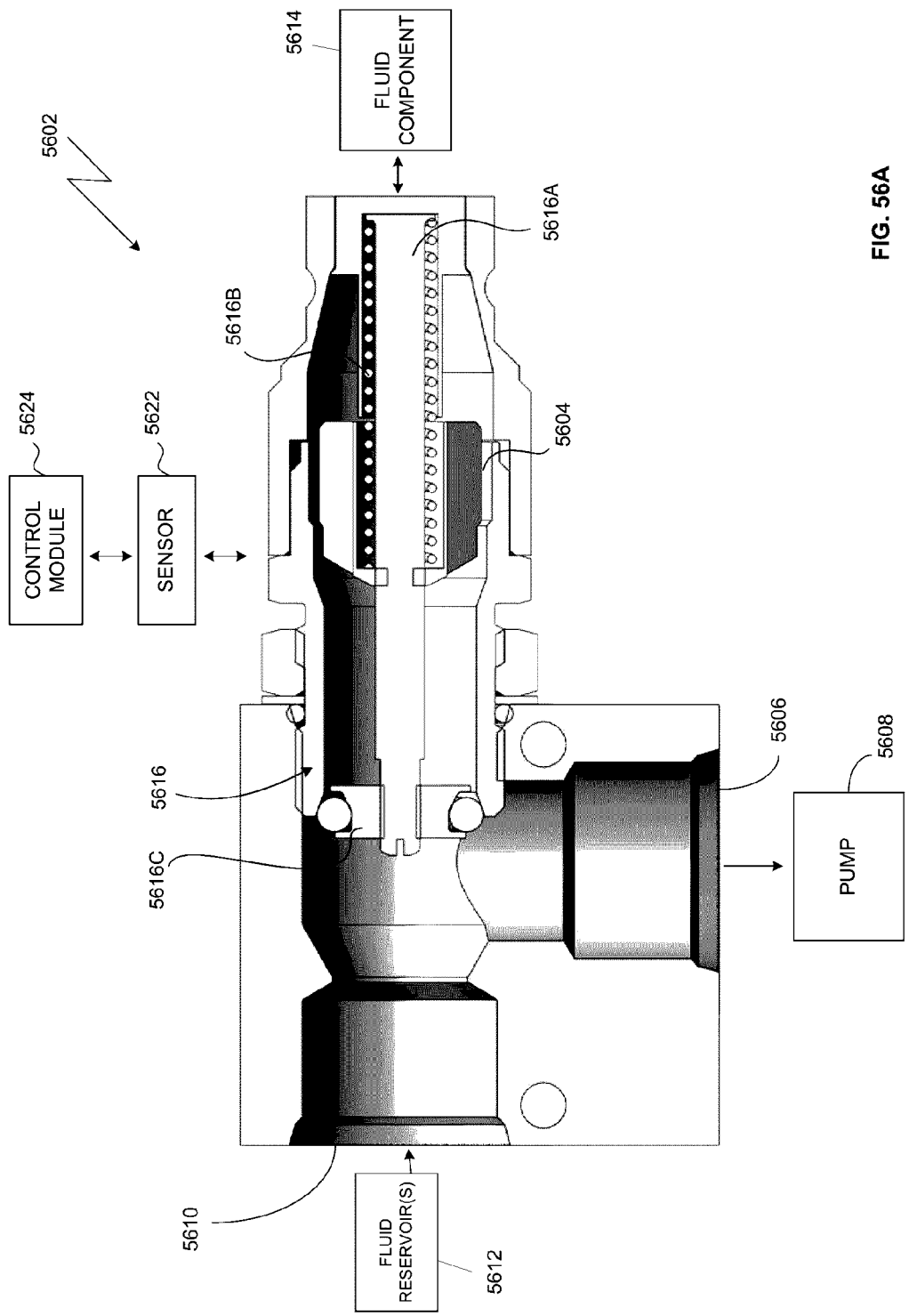
FIG. 56A illustrates a plan view of an example of a valve assembly structured in accordance with various embodiments of the invention in a first mode of operation; and, FIG. 56B illustrates a plan view of the valve assembly of FIG. 56A in a second mode of operation.
Figure 56B:
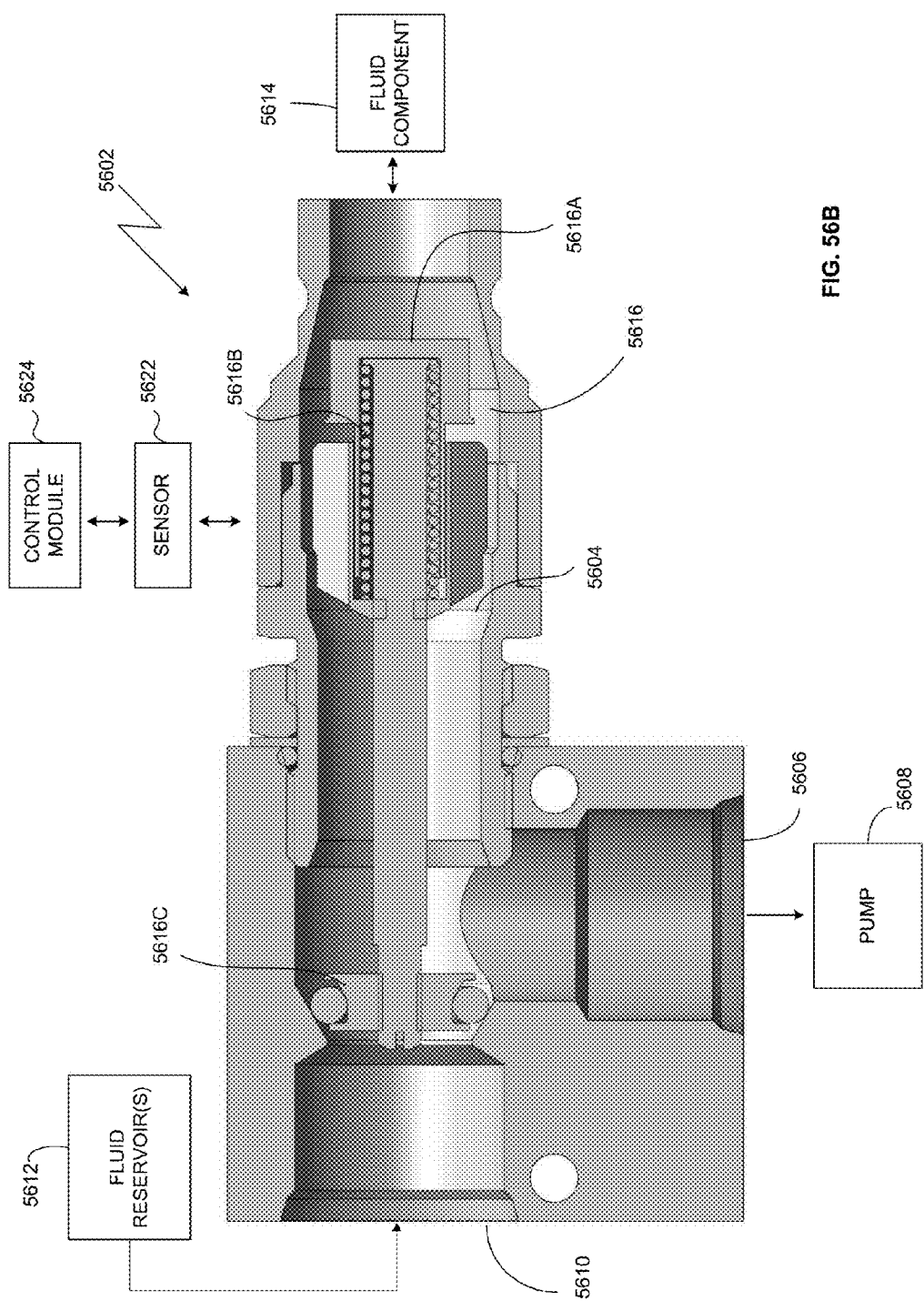

FIGS. 56A and 56B illustrate examples of a valve assembly 5602 that can be structured and employed in cooperative connection with, or in place of, various embodiments of valve assemblies, valve systems, or other fluid systems described herein. In various embodiments, the valve assembly 5602 may include an inlet port 5604 structured for fluid communication with a pump port 5606, such as during a refill fluid operation performed in connection with an onboard machine pump 5608, for example. The pump 5608 may be a main engine pump, a supplemental pump, a pre-lubrication lump, a fluid reservoir pump, and/or a variety of other types of pumps. During a refill fluid operation, the pump 5608 may be activated to cause fluid communicated from the valve assembly 5602 to flow through the pump port 5606. The valve assembly 5602 may also include a machine fluid reservoir port 5610, which can be structured for fluid communication with one or more fluid reservoirs 5612 of a machine, or for fluid communication with the pump port 5608 in a normally closed state of the valve assembly (as shown in FIG. 56A).

The valve assembly 5602 may be structured for fluid communication through the inlet port 5604 in connection with one or more fluid components 5614. The fluid component 5614 may include one or more of the following fluidic structures, for example and without limitation: a pump that is off-board with respect to the machine; a pump that is on-board with respect to the machine; a flow control means such as a hand-held device, for example; a bracket or evacuation bracket; and/or, a quick-disconnect structure or other coupling. The fluid component 5614 may also be one or more other types of components, devices, or systems suitable for supplying positive and/or negative fluid pressure to one or more fluid inlet ports or fluid outlet ports associated with a machine. For example, the fluid component 5614 may be employed in connection with the valve assembly 5602 to perform one or more types of fluid refill processes (e.g., oil changes or other machine maintenance operations) in association with different fluid reservoirs, for example, of a machine.

In various embodiments, an actuating mechanism 5616 may be positioned inside the valve assembly 5602 for actuating the valve assembly 5602 between a normally closed position (as shown in FIG. 56A) and a fluid refill position (as shown in FIG. 56B). The actuating mechanism 5616 (e.g., which may be part of a quick-disconnect coupling) may be structured to include a support 5616A operatively associated with a spring 5616B and a sealing cap 5616C. The actuating mechanism 5014 can be structured to react to mechanical pressure applied at the inlet port 5604. In the normally closed position, the spring 5616B of the actuating mechanism 5616 is in an extended state that provides a pressure seal at the inlet port 5604. Mechanical pressure can be applied at the inlet port 5604, such as by introducing a fluid component 5614 (e.g., an external pump), to compress the spring 5616B and cause the sealing cap 5616C to close the fluid path normally flowing from the fluid reservoir port 5610, and at the same time establish a fluid path from the inlet port 5604 to the pump port 5608. It can be appreciated that the valve assembly 5602 may be useful for performing refill fluid operations for one or more fluid reservoirs 5612 of a machine.

In various embodiments, one or more sensors 5622 may be operatively associated with the actuation of the valve assembly 5602 or other conditions arising from use of the valve assembly 5602 in connection with fluid operations. Signals generated by the sensor 5622 in response to behavior or conditions associated with the valve assembly 5602 can be communicated to a control module 5624 for data collection, data analysis, or other processing. The sensor 5622 and/or control module 5624 can be structured or programmed substantially in accordance with other embodiments of sensors and control modules described herein.

It should be appreciated that all the figures are presented for illustrative purposes and not as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "updater," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor. The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data transmission devices, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While the present methods and systems have been principally described in relation to relatively large-scale diesel engines, it should be recognized that the invention is also useful in a wide variety of other types of internal combustion engines. For example, use of the present methods and systems in automotive applications is contemplated, such as in connection with automotive engines. Thus, whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A valve assembly comprising:
a housing comprising:
an inlet/outlet port structured for fluid communication with at least one fluid component external to the valve assembly;
a machine fluid reservoir port structured for fluid communication with at least one fluid reservoir of a machine;
a filter port structured for fluid communication with at least one filter of the machine; and,
an actuating mechanism operably positioned and structured within the housing; and
wherein the actuating valve mechanism comprises an open position and a closed position, wherein, upon application of negative pressure at the inlet/outlet port, the actuating mechanism is in the open position and the actuating mechanism is configured to establish a first channel within the housing for fluid communication between the inlet/outlet port and the machine fluid reservoir port; and
wherein, upon application of positive pressure at the inlet/outlet port, the actuating mechanism is in the closed position and the actuating mechanism is configured to establish a second channel within the housing for fluid communication between the inlet/outlet port and the filter port.

2. The valve assembly of claim 1, wherein the actuating mechanism is further structured to resist fluid communication between the inlet/outlet port and the filter port upon application of negative pressure at the inlet/outlet port.

3. The valve assembly of claim 1, wherein the actuating mechanism is further structured to resist fluid communication between the inlet/outlet port and the machine fluid reservoir port upon application of positive pressure at the inlet/outlet port.

4. The valve assembly of claim 1, further comprising a fluid component connected to the inlet/outlet port.

5. The valve assembly of claim 4, wherein the fluid component is configured for generating at least one of a positive pressure or a negative pressure at the inlet/outlet port.

6. The valve assembly of claim 4, wherein the fluid component includes at least one of a pump that is off-board with respect to the machine, a flow control means, an evacuation bracket, or a quick-disconnect structure.

7. The valve assembly of claim 1, wherein the machine fluid reservoir port is further structured for fluid communication with a sump of a machine.

8. The valve assembly of claim 1, wherein the filter port is further structured for fluid communication with at least one of a fluid filter, a supplemental filter apparatus, or a fine filtration media.

9. The valve assembly of claim 1, further comprising at least one coupling connected to at least one of the ports.

10. The valve assembly of claim 1, further comprising at least one sensor operatively associated with an interior of the valve assembly.

11. The valve assembly of claim 10, wherein the sensor includes a vacuum switch configured for sensing at least one condition associated with a fluid evacuation operation.

12. The valve assembly of claim 10, wherein the sensor includes a pressure switch configured for sensing at least one condition associated with a fluid refill operation.

13. The valve assembly of claim 10, wherein the sensor includes at least one vacuum switch configured for sensing at least one condition associated with a fluid evacuation operation and at least one pressure switch configured for sensing at least one condition associated with a fluid refill operation.

14. The valve assembly of claim 10, wherein the sensor is configured for communicating a signal indicative of at least one condition or event to a control module.

15. The valve assembly of claim 14, wherein the signal is indicative of data associated with fluid temperature, fluid pressure, fluid operation time, or fluid operation date.

16. The valve assembly of claim 1, wherein the valve assembly is structured for external connection with respect to a normal fluid flow path of a fluid system of the machine.

17. The valve assembly of claim 1, wherein the actuating mechanism comprises a spring.

18. The valve assembly of claim 17, wherein the actuating mechanism comprises a support operatively associated with the spring.

19. A valve assembly combination comprising:
a first valve assembly comprising:
a first housing comprising:
a first inlet/outlet port structured for fluid communication with at least one fluid component external to the first valve assembly;
a first machine fluid reservoir port structured for fluid communication with a first fluid reservoir of a machine;
a first filter port structured for fluid communication with a first filter of the machine; and,
a first actuating mechanism operably positioned within the first housing and wherein the first actuating mechanism comprises an open position and a closed position, wherein, upon application of negative pressure at the first inlet/outlet port, the first actuating mechanism is in the open position and the first actuating mechanism is configured to establish a first channel for fluid communication between the first inlet/outlet port and the first machine fluid reservoir port; and wherein, upon application of positive pressure at the first inlet/outlet port, the first actuating mechanism is in the closed position and the first actuating mechanism is configured to establish a second channel for fluid communication between the first inlet/outlet port and the first filter port; and, at least a second valve assembly comprising:
  a second housing comprising:
    a second inlet/outlet port structured for fluid communication with at least one fluid component external to the second valve assembly;
    a second machine fluid reservoir port structured for fluid communication with a second fluid reservoir of the machine;
    a second filter port structured for fluid communication with a second filter of the machine; and,
    a second actuating mechanism operably positioned within the second housing and wherein the second actuating mechanism comprises an open position and a closed position, wherein, upon application of negative pressure at the second inlet/outlet port, the second actuating mechanism is in the open position and the second actuating mechanism is configured to establish a third channel for fluid communication between the second inlet/outlet port and the second machine fluid reservoir port, and wherein, upon application of positive pressure at the second inlet/outlet port, the second actuating mechanism is in the closed position and the second actuating mechanism is configured to establish a fourth channel for fluid communication between the second inlet/outlet port and the second filter port.

20. The valve assembly combination of claim 19, wherein the first fluid reservoir includes transmission fluid and the second fluid reservoir includes a fluid other than transmission fluid.

21. The valve assembly combination of claim 19, wherein the first fluid reservoir includes hydraulic fluid and the second fluid reservoir includes a fluid other than hydraulic fluid.

* * * * *